(12) United States Patent
Kitamura et al.

(10) Patent No.: US 6,711,891 B2
(45) Date of Patent: Mar. 30, 2004

(54) APPARATUS FOR CONTROLLING AIR-FUEL RATIO OF INTERNAL COMBUSTION ENGINE

(75) Inventors: Toru Kitamura, Wako (JP); Hideki Uedahira, Wako (JP); Mikio Hara, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 124 days.

(21) Appl. No.: 10/142,831

(22) Filed: May 13, 2002

(65) Prior Publication Data

US 2003/0024514 A1 Feb. 6, 2003

(30) Foreign Application Priority Data

May 14, 2001 (JP) ........................................ 2001-143800

(51) Int. Cl.[7] .............................. F01N 3/20; F02D 41/14
(52) U.S. Cl. ........................ 60/276; 60/277; 73/118.1
(58) Field of Search .................... 60/274, 276, 277, 60/285; 73/118.1; 701/109, 114

(56) References Cited

U.S. PATENT DOCUMENTS

| 5,253,630 A | 10/1993 | Akazaki et al. | 123/682 |
|---|---|---|---|
| 5,391,282 A | 2/1995 | Miyashita et al. | 204/401 |
| 5,531,208 A | 7/1996 | Hasegawa et al. | 123/673 |
| 5,540,209 A | 7/1996 | Hasegawa et al. | 123/679 |
| 5,558,075 A | 9/1996 | Maki et al. | 123/680 |
| 5,568,799 A | 10/1996 | Akazaki et al. | 123/480 |
| 5,852,930 A | 12/1998 | Yasui et al. | 60/276 |
| 5,966,930 A * | 10/1999 | Hatano et al. | 60/276 |
| 6,082,099 A | 7/2000 | Yasui et al. | 60/276 |
| 6,112,517 A | 9/2000 | Yasui et al. | 60/274 |
| 6,449,944 B1 * | 9/2002 | Yasui et al. | 60/277 |

FOREIGN PATENT DOCUMENTS

| JP | 04-369471 | 2/1992 |
|---|---|---|
| JP | 05-079374 | 3/1993 |
| JP | 07-083094 | 3/1995 |
| JP | 07-259588 | 10/1995 |
| JP | 07-019033 | 12/1995 |
| JP | 08-021273 | 1/1996 |
| JP | 08-105345 | 4/1996 |
| JP | 2526640 | 6/1996 |
| JP | 09-324681 | 12/1997 |
| JP | 11-093741 | 4/1999 |
| JP | 11-153051 | 6/1999 |

* cited by examiner

Primary Examiner—Tony M. Argenbright
(74) Attorney, Agent, or Firm—Arent Fox Kintner Plotkin & Kahn, PLLC

(57) ABSTRACT

The air-fuel ratio of an air-fuel mixture to be combusted in an internal combustion engine 1 is manipulated to converge an output VO2/out of an $O_2$ sensor 6 which is disposed downstream of a catalytic converter 3 to a target value VO2/TARGET depending on an operating state of the internal combustion engine 1, while at the same time a deterioration evaluating parameter is determined from time-series data of the output VO2/out of the $O_2$ sensor 6. The value of the deterioration evaluating parameter is corrected depending on an average value of the output VO2/out of the $O_2$ sensor 6 or the target value VO2/TARGET, and the deteriorated state of the catalytic converter 3 is evaluated based on the corrected value of the deterioration evaluating parameter.

8 Claims, 21 Drawing Sheets

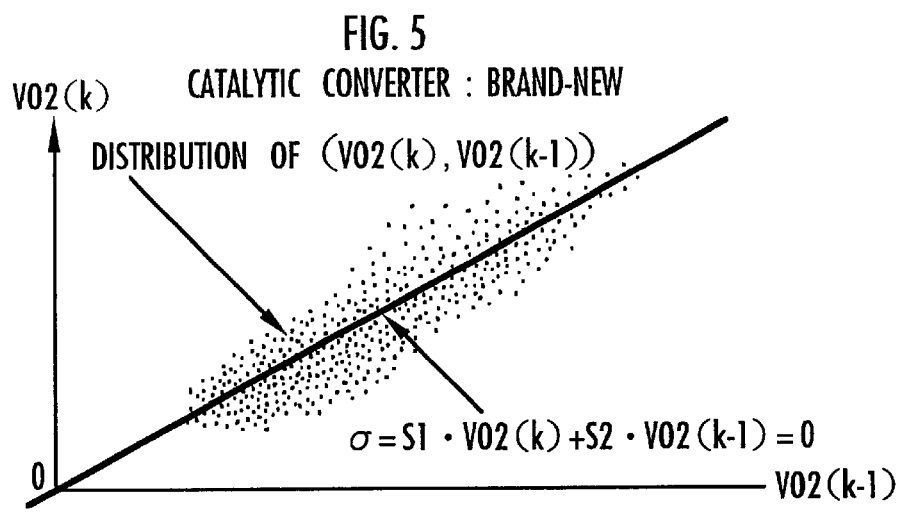
FIG. 5 CATALYTIC CONVERTER : BRAND-NEW
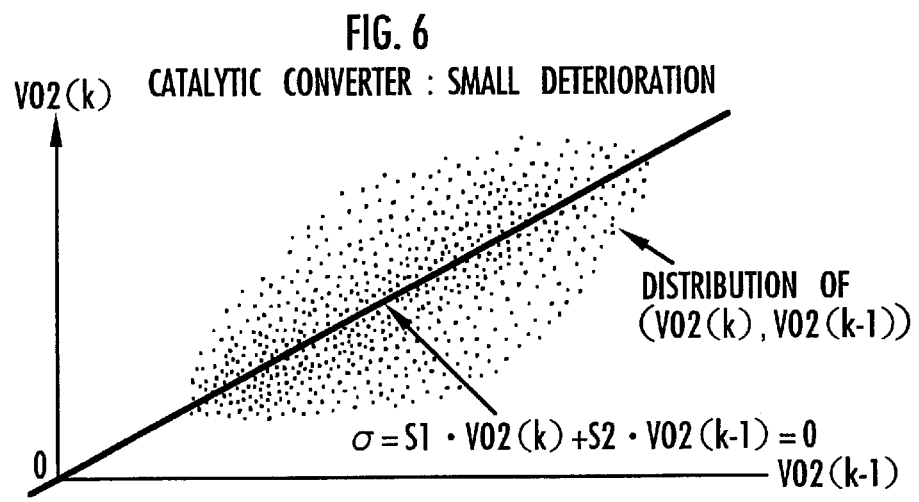
FIG. 6 CATALYTIC CONVERTER : SMALL DETERIORATION
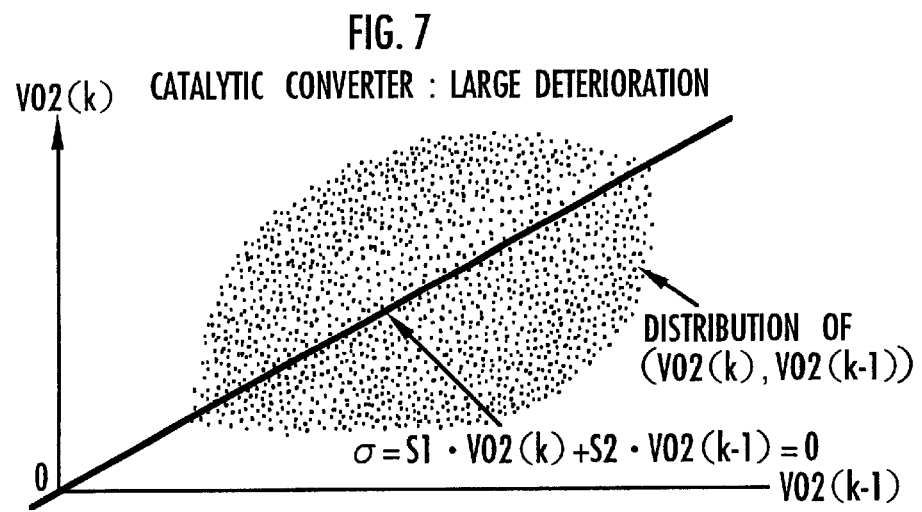
FIG. 7 CATALYTIC CONVERTER : LARGE DETERIORATION

APPARATUS FOR CONTROLLING AIR-FUEL RATIO OF INTERNAL COMBUSTION ENGINE

BACKGROUND OF THE INVENTION

1. Field of the Invention

The present invention relates to an apparatus for controlling the air-fuel ratio of an internal combustion engine, and more particularly to an air-fuel ratio control apparatus which is capable of evaluating a deteriorated state of a catalytic converter for purifying an exhaust gas.

2. Description of the Related Art

There have been known various techniques for controlling the air-fuel ratio of an air-fuel mixture to be combusted by an internal combustion engine in order to achieve an appropriate purifying capability of a catalytic converter for purifying exhaust gases, such as a three-way catalytic converter, disposed in the exhaust passage of the internal combustion engine. See, for example, Japanese laid-open patent publication No. 9-324681 or U.S. Pat. No. 5,852,930, and Japanese laid-open patent publication No. 11-153051 or U.S. Pat. No. 6,112,517. According to the disclosed systems, an $O_2$ sensor (oxygen concentration sensor) is disposed downstream of the catalytic converter, and the air-fuel ratio of an air-fuel mixture is controlled according to a feedback control process (specifically, a sliding mode control process) in order to converge the output of the $O_2$ sensor to a predetermined target value (constant value).

The catalytic converter is progressively deteriorated and its purifying capability is lowered as the internal combustion engine is used over a long period of time. Therefore, the catalytic converter needs to be replaced with a brand-new catalytic converter when it has been deteriorated to a certain extent. It has thus been desired in the art to be able to adequately evaluate a deteriorated state of a catalytic converter which is combined with an internal combustion engine. Known systems for evaluating a deteriorated state of a catalytic converter are disclosed in Japanese patent No. 2526640 and Japanese laid-open patent publication No. 7-19033, for example. According to these disclosed evaluating systems, when the air-fuel ratio of an air-fuel mixture to be combusted by an internal combustion engine is changed from a leaner value to a richer value or from a richer value to a leaner value, the time required until the output of an $O_2$ sensor that is positioned downstream of the catalytic converter is inverted and the period in which the output of the $O_2$ sensor is inserted are measured. The deteriorated state of the catalytic converter is evaluated based on the evaluated values.

The disclosed systems, however, make it difficult to achieve an appropriate purifying capability of the catalytic converter at the time its deteriorated state is evaluated because it is necessary to positively change the air-fuel ratio in order to evaluate the deteriorated state of the catalytic converter. Stated otherwise, it is difficult for the disclosed system to evaluate the deteriorated state of the catalytic converter while at the same time maintaining an appropriate purifying capability of the catalytic converter.

The applicant of the present application has made an effort to develop an apparatus capable of evaluating a deteriorated state of a catalytic converter while controlling an air-fuel ratio to converge the output of an $O_2$ sensor that is positioned downstream of the catalytic converter to a given target value, i.e., maintaining a good purifying capability of the catalytic converter. For example, reference should be made to Japanese patent application No. 2000-139860 (Japanese laid-open patent publication No. 2000-241349). The disclosed system is based on the fact that the value of a certain parameter which is determined from the data of the output of an $O_2$ sensor that is positioned downstream of the catalytic converter exhibits characteristic properties as the deterioration of the catalytic converter progresses, and evaluates the deteriorated state of the catalytic converter based on the value of the parameter. The system thus arranged makes it possible to evaluate the deteriorated state of the catalytic converter while maintaining a good purifying capability of the catalytic converter.

In the above arrangements for controlling the air-fuel ratio to converge the output of the $O_2$ sensor that is positioned downstream of the catalytic converter to a given target value (see Japanese laid-open patent publication No. 9-324681 or U.S. Pat. No. 5,852,930, and Japanese laid-open patent publication No. 11-153051 or U.S. Pat. No. 6,112,517), the target value for the output of the $O_2$ sensor positioned downstream of the catalytic converter is basically a certain constant value. However, depending on the type of the catalytic converter, it may occasionally preferable to make variable the target value for the output of the $O_2$ sensor depending on the operating state of the internal combustion engine for the purpose of enabling the catalytic converter to achieve an appropriate purifying capability.

However, a control system for controlling the air-fuel ratio according to the variable target value for the output of the $O_2$ sensor positioned downstream of the catalytic converter tends to suffer certain drawbacks, given below, with respect to the reliability of the evaluation of the deteriorate state of the catalytic converter at the time of evaluating the deteriorate state of the catalytic converter while at the same time controlling the air-fuel ratio.

Since the output of the $O_2$ sensor is nonlinear with respect to the oxygen concentration (see the solid-line curve a in FIG. 2 of the accompanying drawings), if the target value for the output of the $O_2$ sensor changes, then the output of the $O_2$ sensor changes differently when it is converged to the target value. As a result, the value of the parameter that is uniquely determined from the data of the output of the $O_2$ sensor is affected by a factor other than the deteriorate state of the catalytic converter, and the deteriorate state of the catalytic converter which is evaluated based on the value of the parameter tends to become less reliable than expected.

SUMMARY OF THE INVENTION

It is therefore an object of the present invention to provide an apparatus for controlling the air-fuel ratio of an internal combustion engine to converge the output of an $O_2$ sensor that is positioned downstream of a catalytic converter to a target value which is variably established depending on the operating state of the internal combustion engine, the apparatus being capable of appropriately evaluating the deteriorated state of the catalytic converter while compensating for adverse effects which are produced by making the target value variable.

To achieve the above object, there is provided in accordance with a first aspect of the present invention an apparatus for controlling the air-fuel ratio of an internal combustion engine, comprising an oxygen concentration sensor disposed downstream of a catalytic converter which is disposed in an exhaust passage of an internal combustion engine, air-fuel ratio manipulating means for manipulating the air-fuel ratio of an air-fuel mixture to be combusted in the internal combustion engine to converge an output of the oxygen concentration sensor to a target value established depending on an operating state of the internal combustion engine, parameter generating means for generating a deterioration evaluating parameter for evaluating a deteriorated state of the catalytic converter according to an algorithm predetermined from data of the output of the oxygen concentration sensor while the air-fuel ratio manipulating means is manipulating the air-fuel ratio of the air-fuel mixture, and deteriorated state evaluating means for correcting the deterioration evaluating parameter depending on an average value of the target value or the output of the oxygen concentration sensor, and evaluating the deteriorated state of the catalytic converter based on the corrected deterioration evaluating parameter.

According to a second aspect of the present invention, there is also provided an apparatus for controlling the air-fuel ratio of an internal combustion engine, comprising an oxygen concentration sensor disposed downstream of a catalytic converter which is disposed in an exhaust passage of an internal combustion engine, air-fuel ratio manipulating means for manipulating the air-fuel ratio of an air-fuel mixture to be combusted in the internal combustion engine to converge an output of the oxygen concentration sensor to a target value established depending on an operating state of the internal combustion engine, parameter generating means for generating a deterioration evaluating parameter for evaluating a deteriorated state of the catalytic converter according to an algorithm predetermined from data of the output of the oxygen concentration sensor while the air-fuel ratio manipulating means is manipulating the air-fuel ratio of the air-fuel mixture, and deteriorated state evaluating means for evaluating the deteriorated state of the catalytic converter by comparing the deterioration evaluating parameter with a predetermined decision value, the deteriorated state evaluating means comprising means for establishing the decision value depending on an average value of the target value or the output of the oxygen concentration sensor, and means for evaluating the deteriorated state of the catalytic converter by comparing the established decision value with the deterioration evaluating parameter.

With the above arrangement, the deterioration evaluating parameter generated from the data of the output of the oxygen concentration sensor is corrected according to the first aspect or the decision value to be compared with the deterioration evaluating parameter is established according to the second aspect, depending on the average value of the target value or the output of the oxygen concentration sensor, or stated otherwise depending on what level the output of the oxygen concentration sensor is controlled at by the air-fuel ratio manipulating means. In this manner, even if the target value for the output of the oxygen concentration sensor is established variably depending on the operating state of the internal combustion engine, the deteriorated state of the catalytic converter can be evaluated irrespectively of the target value.

Specifically, according to the first aspect of the present invention, the deterioration evaluating parameter is corrected depending on the average value of the target value or the output of the oxygen concentration sensor, so that the corrected deterioration evaluating parameter varies depending on only the deteriorated state of the catalytic converter, not the target value for the output of the oxygen concentration sensor. As a result, the deteriorated state of the catalytic converter can be evaluated appropriately based on the corrected deterioration evaluating parameter. According to the second aspect of the present invention, though the deterioration evaluating parameter is affected by the target value for the output of the oxygen concentration sensor, the decision value to be compared with the deterioration evaluating parameter is established depending on the average value of the target value or the output of the oxygen concentration sensor for thereby providing the same advantages as those of the first aspect. According to the present invention, because the deterioration evaluating parameter is generated from the data of the output of the oxygen concentration sensor while the air-fuel ratio manipulating means is manipulating the air-fuel ratio of the air-fuel mixture, i.e., the output of the oxygen concentration sensor is being converged to the target value, the deteriorated state of the catalytic converter can be evaluated highly reliably while the desired purifying performance of the catalytic converter is well maintained.

In the above apparatus, the deterioration evaluating parameter preferably comprises data representing a variation of a deterioration evaluating linear function whose variable components are represented by time-series data of the output of the oxygen concentration sensor.

Specifically, while the output of the oxygen concentration sensor is being converged to the target value, when the value of a suitable linear function, i.e., a function represented by a linear combination of time-series data of the output of the oxygen concentration sensor, whose variable components are represented by time-series data of the output of the oxygen concentration sensor, is determined from the time-series data of the output of the oxygen concentration sensor, the value of the linear function tends to be characteristically correlated to the degree of process of the deterioration of the catalytic converter. For example, when the catalytic converter is substantially brand-new, the value of the linear function is collected in the vicinity of a certain value. As the deterioration of the catalytic converter progresses, the value of the linear function tends to be spaced from the certain value. Therefore, the value of the linear function varies more greatly as the deterioration of the catalytic converter progresses.

By generating data representing the variation of the value of the linear function as the deterioration evaluating parameter, the correlation between the value of the deterioration evaluating parameter and the deteriorated state of the catalytic converter is increased, and hence the reliability of the evaluation of the deteriorated state of the catalytic converter is increased.

Though the deterioration evaluating parameter may be represented by the square of the difference between the value of the deterioration evaluating function and a certain value or the absolute value of the difference, the parameter generating means preferably comprises means for generating the deterioration evaluating parameter by effecting low-pass filtering on the square value or absolute value of the difference between values of the time-series data of the output of the oxygen concentration sensor and a predetermined value as a central value of the deterioration evaluating linear function.

The deterioration evaluating parameter determined by effecting low-pass filtering on the square value or absolute value of the difference is of an appropriate value representing the variation of the value of the deterioration evaluating linear function, and increases monotonously as the deterioration of the catalytic converter progresses. Therefore, the deteriorated state of the catalytic converter can be evaluated highly reliably based on the value of the deterioration evaluating parameter.

With the deterioration evaluating linear function being used to determine the deterioration evaluating parameter, the air-fuel ratio manipulating means preferably comprises means for sequentially generating a manipulated variable for manipulating the air-fuel ratio according to a sliding mode control process to converge the output of the oxygen concentration sensor to the target value, and manipulating the air-fuel ratio depending on the manipulated variable, the deterioration evaluating linear function comprising a linear function determined depending on a switching function used in the sliding mode control process.

Specifically, the above tendency of the value of the deterioration evaluating linear function depending on the deteriorated state of the catalytic converter is likely to manifest itself when the manipulated variable (e.g., a target air-fuel ratio) for manipulating the air-fuel ratio with the air-fuel ratio manipulating means is generated according to a sliding mode control process which is a feedback control process. In the case where the air-fuel ratio is manipulated according to the sliding mode control process, the deterioration evaluating linear function highly correlated to the deteriorated state of the catalytic converter is closely related to a switching function used in the sliding mode control process, and it is preferable to use a linear function determined depending on the switching function as the deterioration evaluating linear function.

More specifically, in the sliding mode control process, the linear function whose variable components are represented by time-series data of the difference between the output of the oxygen concentration sensor and the target value is used as the switching function. In the case where this switching function is used in the sliding mode control process, the deterioration evaluating linear function should preferably comprise a linear function where coefficient values of its variable components are identical to coefficient values of variable components of the switching function. The linear function may be the switching function itself which is used in the sliding mode control process.

By thus using the linear function determined depending on the switching function for the sliding mode control process as the deterioration evaluating linear function, the correlation between the value of the deterioration evaluating linear function and the deteriorated state of the catalytic converter manifests itself, allowing the deteriorated state of the catalytic converter to be evaluated properly based on the value of the deterioration evaluating linear function.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 5 is a diagram illustrative of a process of evaluating the deteriorated state of a catalytic converter employed by the apparatus shown in FIG. 1;

FIG. 6 is a diagram illustrative of the process of evaluating the deteriorated state of the catalytic converter employed by the apparatus shown in FIG. 1;

FIG. 7 is a diagram illustrative of the process of evaluating the deteriorated state of the catalytic converter employed by the apparatus shown in FIG. 1;

DETAILED DESCRIPTION OF THE PREFERRED EMBODIMENTS

An apparatus for controlling the air-fuel ratio of an internal combustion engine according to a first embodiment of the present invention will be described below with reference to FIGS. 1 through 20.

Figure 1:
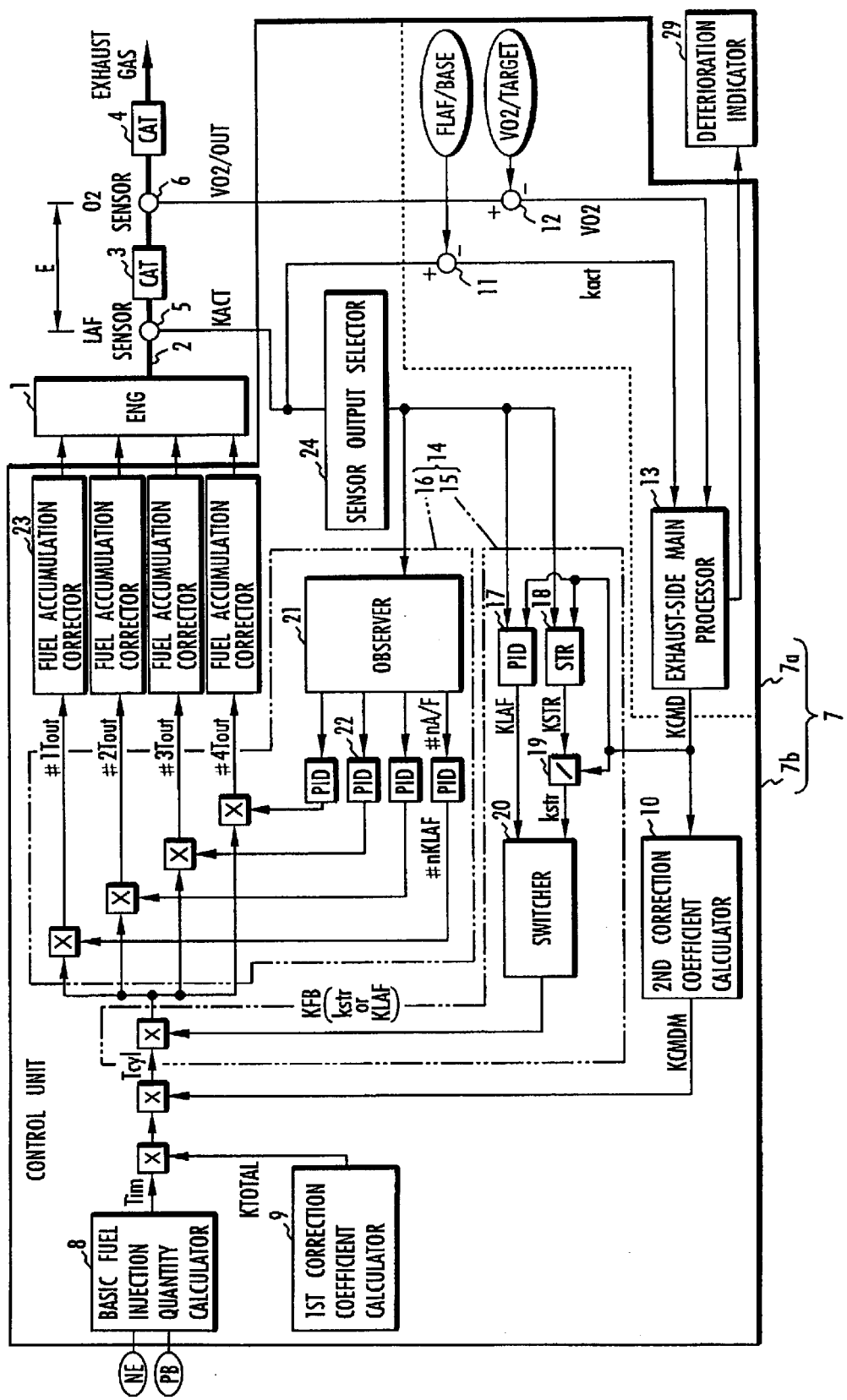
FIG. 1 is a block diagram of an overall system arrangement of an apparatus for controlling the air-fuel ratio of an internal combustion engine according to a first embodiment of the present invention.
Figure 2:
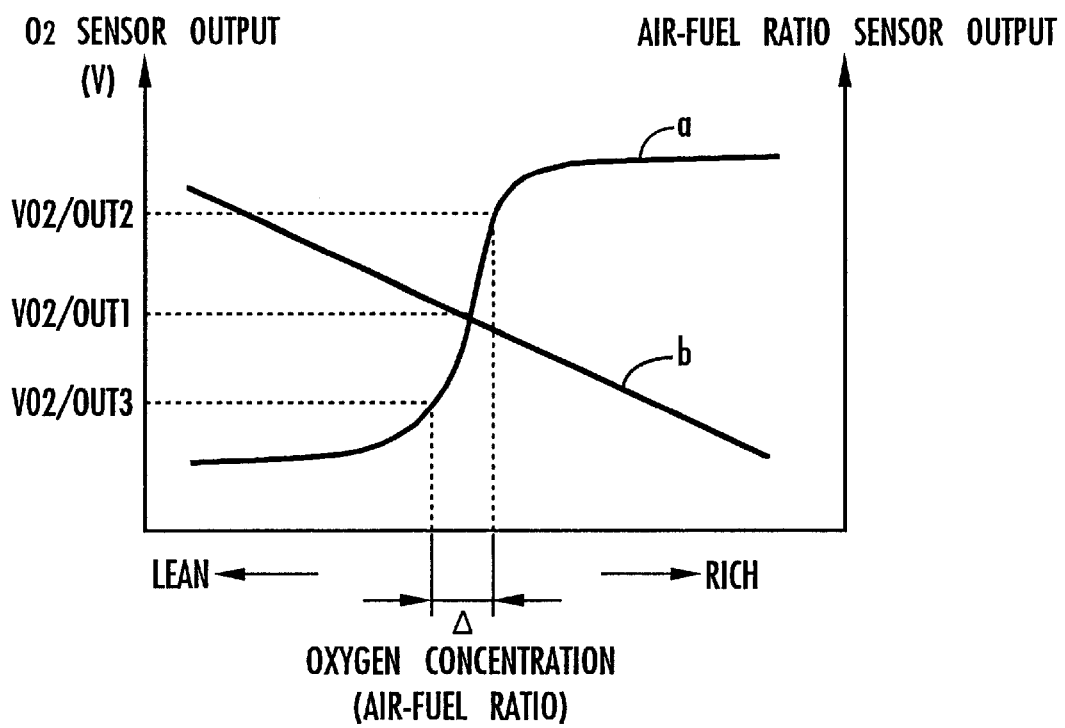
FIG. 2 is a diagram showing output characteristics of an $O_2$ sensor and an air-fuel ratio sensor used in the apparatus shown in FIG. 1.

FIG. 1 shows in block form the apparatus for controlling the air-fuel ratio of an internal combustion engine according to the first embodiment of the present invention. As shown in FIG. 1, an internal combustion engine 1 such as a four-cylinder internal combustion engine is mounted as a propulsion source on an automobile or a hybrid vehicle, for example. When a mixture of fuel and air is combusted in each cylinder of the internal combustion engine 1, an exhaust gas is generated and emitted from each cylinder into a common exhaust pipe (exhaust passage) 2 positioned near the internal combustion engine 1, from which the exhaust gas is discharged into the atmosphere. Two catalytic converters 3, 4, each comprising a three-way catalytic converter, are mounted in the common exhaust pipe 2 at successively downstream locations thereon.

The upstream catalytic converter 3 is evaluated for its deteriorated state according to the present embodiment. The downstream catalytic converter 4 may be dispensed with.

The apparatus basically serves to control the air-fuel ratio of an air-fuel mixture combusted by the internal combustion engine 1, in order to achieve an optimum purifying capability of the catalytic converter 3. While controlling the air-fuel ratio, the apparatus also evaluates the deteriorated state of the catalytic converter 3.

In order to perform the above processing, the apparatus has an air-fuel ratio sensor 5 mounted on the exhaust pipe 2 upstream of the catalytic converter 3, or more precisely at a position where exhaust gases from the cylinders of the internal combustion engine 1 are put together, an $O_2$ sensor (oxygen concentration sensor) 6 mounted on the exhaust pipe 2 downstream of the catalytic converter 3 and upstream of the catalytic converter 4, and a control unit 7 for carrying out a control process (described later on) and evaluating the deteriorated state of the catalytic converter 3 based on detected outputs from the sensors 5, 6.

The control unit 7 is supplied with detected outputs from the sensors 5, 6 and also detected outputs from various other sensors (not shown) for detecting an operating state of the internal combustion engine 1, including a engine speed sensor, an intake pressure sensor, a coolant temperature sensor, etc.

The $O_2$ sensor 6 comprises an ordinary $O_2$ sensor for generating an output VO2/OUT having a level depending on the oxygen concentration in the exhaust gas that has passed through the catalytic converter 3, i.e., an output VO2/OUT representing a detected value of the oxygen concentration of the exhaust gas. The oxygen concentration in the exhaust gas is commensurate with the air-fuel ratio of an air-fuel mixture which, when combusted, produces the exhaust gas. The output VO2/OUT from the $O_2$ sensor 6 will change with high sensitivity in proportion to the oxygen concentration in the exhaust gas, with the air-fuel ratio corresponding to the oxygen concentration in the exhaust gas being in a range Δ close to a stoichiometric air-fuel ratio, as indicated by the solid-line curve a in FIG. 2. At oxygen concentrations corresponding to air-fuel ratios outside of the range Δ, the output VO2/OUT from the $O_2$ sensor 6 is saturated and is of a substantially constant level. The sensitivity of the output VO2/OUT from the $O_2$ sensor 6 with respect to the oxygen concentration, i.e., the rate of change of the output VO2/OUT with respect to a change of the oxygen concentration, is maximum in the vicinity of a central level VO2/OUT1 intermediate between upper and lower limit levels of the output VO2/OUT, and is slightly lower at levels of the output VO2/OUT which are higher and lower than the central level VO2/OUT1, e.g., at a level VO2/OUT2 and a level VO2/OUT3.

The air-fuel ratio sensor 5 generates an output KACT representing a detected value of the air-fuel ratio (which may hereinafter referred to simply as "air-fuel ratio of the internal combustion engine 1") which is recognized from the concentration of oxygen in the exhaust gas that enters the catalytic converter 3. The air-fuel ratio sensor 5 comprises a wide-range air-fuel ration sensor disclosed in detail in Japanese laid-open patent publication No. 4-369471, which corresponds to U.S. Pat. No. 5,391,282. As indicated by the solid-line curve b in FIG. 2, the air-fuel ratio sensor 5 generates an output whose level is proportional to the concentration of oxygen in the exhaust gas in a wider range than the $O_2$ sensor 6. Stated otherwise, the air-fuel ratio sensor 5 (hereinafter referred to as "LAF sensor 5") generates an output whose level corresponds to the concentration of oxygen in the exhaust gas in a wide range of air-fuel ratios.

The control unit 7 comprises a control unit 7a (hereinafter referred to as an "exhaust-side control unit 7a") for performing a process of calculating a target air-fuel ratio KCMD as a manipulated variable for determining the air-fuel ratio of the internal combustion engine 1, or specifically a target value for the air-fuel ratio detected by the LAF sensor 5, and a process of evaluating the deteriorated state of the catalytic converter 3, and a control unit 7b (hereinafter referred to as an "engine-side control unit 7b") for carryout out a process of controlling the air-fuel ratio of the air-fuel mixture combusted by the internal combustion engine 1 by adjusting the amount of fuel injected into (the amount of fuel supplied to) the internal combustion engine 1 depending on the target air-fuel ratio KCMD.

The control units 7a, 7b comprise a microcomputer, and perform their respective control processes in given control cycles. In the present embodiment, each of the control cycles in which the exhaust-side control unit 7a performs its processes of generating the target air-fuel ratio KCMD and evaluating the deteriorated state of the catalytic converter 3 has a predetermined period (e.g., ranging from 30 to 100 ms) in view of the dead time (described later on) present in the catalytic converter 3, calculating loads, etc.

The process of adjusting the fuel injection quantity, which is carried out by the engine-side control unit 7b, needs to be in synchronism with the rotational speed of the internal combustion engine 1, or more specifically combustion cycles of the internal combustion engine 1. Therefore, each of the control cycles in which the engine-side control unit 7b performs its process has a period in synchronism with the crankshaft angle period (so-called TDC) of the internal combustion engine 1.

The constant period of the control cycles of the exhaust-side control unit 7a is longer than the crankshaft angle period (so-called TDC) of the internal combustion engine 1.

The engine-side control unit 7b will further be described below with reference to FIG. 1. The engine-side control unit 7b has, as its main functions, a basic fuel injection quantity calculator 8 for determining a basic fuel injection quantity Tim to be injected into the internal combustion engine 1, a first correction coefficient calculator 9 for determining a first correction coefficient KTOTAL to correct the basic fuel injection quantity Tim, and a second correction coefficient calculator 10 for determining a second correction coefficient KCMDM to correct the basic fuel injection quantity Tim.

The basic fuel injection quantity calculator 8 determines a reference fuel injection quantity (fuel supply quantity) from the rotational speed NE and intake pressure PB of the internal combustion engine 1 using a predetermined map, and corrects the determined reference fuel injection quantity depending on the effective opening area of a throttle valve (not shown) of the internal combustion engine 1, thereby calculating a basic fuel injection quantity Tim.

The first correction coefficient KTOTAL determined by the first correction coefficient calculator 9 serves to correct the basic fuel injection quantity Tim in view of an exhaust gas recirculation ratio of the internal combustion engine 1, i.e., the proportion of an exhaust gas contained in an air-fuel mixture introduced into the internal combustion engine 1, an amount of purged fuel supplied to the internal combustion engine 1 when a canister (not shown) is purged, a coolant temperature, an intake temperature, etc.

The second correction coefficient KCMDM determined by the second correction coefficient calculator 10 serves to correct the basic fuel injection quantity Tim in view of the charging efficiency of an air-fuel mixture due to the cooling effect of fuel flowing into the internal combustion engine 1 depending on a target air-fuel ratio KCMD determined by the exhaust-side control unit 7a, as described later on.

The engine-side control unit 7b corrects the basic fuel injection quantity Tim with the first correction coefficient KTOTAL and the second correction coefficient KCMDM by multiplying the basic fuel injection quantity Tim by the first correction coefficient KTOTAL and the second correction coefficient KCMDM, thus producing a demand fuel injection quantity Tcyl for the internal combustion engine 1.

Specific details of processes for calculating the basic fuel injection quantity Tim, the first correction coefficient KTOTAL, and the second correction coefficient KCMDM are disclosed in detail in Japanese laid-open patent publication No. 5-79374 and U.S. Pat. No. 5,253,630, and will not be described below.

The engine-side control unit 7b also has, in addition to the above functions, a feedback controller 14 for feedback-controlling the air-fuel ratio of the air-fuel mixture to be combusted in the internal combustion engine 1 by adjusting a fuel injection quantity of the internal combustion engine 1 so as to converge the output KACT of the LAF sensor 5 (the detected air-fuel ratio of the internal combustion engine 1) toward the target air-fuel ratio KCMD which is calculated by the exhaust-side control unit 7a.

The feedback controller 14 comprises a general feedback controller 15 for feedback-controlling a total fuel injection quantity for all the cylinders of the internal combustion engine 1 and a local feedback controller 16 for feedback-controlling a fuel injection quantity for each of the cylinders of the internal combustion engine 1.

The general feedback controller 15 sequentially determines a feedback correction coefficient KFB to correct the demand fuel injection quantity Tcyl (by multiplying the demand fuel injection quantity Tcyl) so as to converge the output KACT from the LAF sensor 5 toward the target air-fuel ratio KCMD.

The general feedback controller 15 comprises a PID controller 17 for generating a feedback manipulated variable KLAF as the feedback correction coefficient KFB depending on the difference between the output KACT from the LAF sensor 5 and the target air-fuel ratio KCMD according to a known PID control process, and an adaptive controller 18 (indicated by "STR" in FIG. 1) for adaptively determining a feedback manipulated variable KSTR for determining the feed-back correction coefficient KFB in view of changes in operating state of the internal combustion engine 1 or characteristic changes thereof from the output KACT from the LAF sensor 5 and the target air-fuel ratio KCMD.

In the present embodiment, the feedback manipulated variable KLAF generated by the PID controller 17 is of "1" and can be used directly as the feedback correction coefficient KFB when the output KACT (the detected air-fuel ratio) from the LAF sensor 5 is equal to the target air-fuel ratio KCMD. The feedback manipulated variable KSTR generated by the adaptive controller 18 becomes the target air-fuel ratio KCMD when the output KACT from the LAF sensor 5 is equal to the target air-fuel ratio KCMD. A feedback manipulated variable kstr (=KSTR/KCMD) which is produced by dividing the feedback manipulated variable KSTR by the target air-fuel ratio KCMD with a divider 19 can be used as the feedback correction coefficient KFB.

The feedback manipulated variable KLAF generated by the PID controller 17 and the feedback manipulated variable kstr which is produced by dividing the feedback manipulated variable KSTR from the adaptive controller 18 by the target air-fuel ratio KCMD are selected one at a time by a switcher 20. A selected one of the feedback manipulated variable KLAF and the feedback manipulated variable KSTR is used as the feedback correction coefficient KFB. The demand fuel injection quantity Tcyl is corrected by being multiplied by the feedback correction coefficient KFB. Details of the general feedback controller 15 (particularly, the adaptive controller 18) will be described later on.

The local feedback controller 16 comprises an observer 21 for estimating real air-fuel ratios #nA/F (n=1, 2, 3, 4) of the respective cylinders from the output KACT from the LAF sensor 5, and a plurality of PID controllers 22 (as many as the number of the cylinders) for determining respective feedback correction coefficients #nKLAF for fuel injection quantities for the cylinders from the respective real air-fuel ratios #nA/F estimated by the observer 21 according to a PID control process so as to eliminate variations of the air-fuel ratios of the cylinders.

Briefly stated, the observer 21 estimates a real air-fuel ratio #nA/F of each of the cylinders as follows: A system from the internal combustion engine 1 to the LAF sensor 5 (where the exhaust gases from the cylinders are combined) is considered to be a system for generating an air-fuel ratio detected by the LAF sensor 5 from a real air-fuel ratio #nA/F of each of the cylinders, and is modeled in view of a detection response delay (e.g., a time lag of first order) of the LAF sensor 5 and a chronological contribution of the air-fuel ratio of each of the cylinders to the air-fuel ratio detected by the LAF sensor 5. Based on the modeled system, a real air-fuel ratio #nA/F of each of the cylinders is estimated from the output KACT from the LAF sensor 5.

Details of the observer 21 are disclosed in Japanese laid-open patent publication No. 7-83094 and U.S. Pat. No. 5,531,208, and will not be described below.

Each of the PID controllers 22 of the local feedback controller 16 divides the output signal KACT from the LAF sensor 5 by an average value of the feedback correction coefficients #nKLAF determined by the respective PID controllers 22 in a preceding control cycle to produce a quotient value, and uses the quotient value as a target air-fuel ratio for the corresponding cylinder. Each of the PID controllers 22 then determines a feedback correction coefficient #nKLAF in a present control cycle so as to eliminate any difference between the target air-fuel ratio and the corresponding real air-fuel ratio #nA/F determined by the observer 21.

The local feedback controller 16 multiplies a value, which has been produced by multiplying the demand fuel injection quantity Tcyl by the selected feedback correction coefficient KFB produced by the general feedback controller 15, by the feedback correction coefficient #nKLAF for each of the cylinders, thereby determining an output fuel injection quantity #nTout (n=1, 2, 3, 4) for each of the cylinders.

The output fuel injection quantity #nTout thus determined for each of the cylinders is corrected for accumulated fuel particles on intake pipe walls of the internal combustion engine 1 by a fuel accumulation corrector 23 in the engine-side control unit 7b. The corrected output fuel injection quantity #nTout is applied to each of fuel injectors (not shown) of the internal combustion engine 1, which injects fuel into each of the cylinders with the corrected output fuel injection quantity #nTout.

The correction of the output fuel injection quantity in view of accumulated fuel particles on intake pipe walls is disclosed in detail in Japanese laid-open patent publication No. 8-21273 and U.S. Pat. No. 5,568,799, and will not be described in detail below.

A sensor output selector 24 shown in FIG. 1 serves to select the output KACT from the LAF sensor 5, which is suitable for the estimation of a real air-fuel ratio #nA/F of each cylinder with the observer 21, depending on the operating state of the internal combustion engine 1. Details of the sensor output selector 24 are disclosed in detail in Japanese laid-open patent publication No. 7-259588 and U.S. Pat. No. 5,540,209, and will not be described in detail below.

The exhaust-side control unit 7a has a subtractor 11 for determining a difference kact (=KACT−FLAF/BASE) between the output KACT from the LAF sensor 5 and a predetermined reference value FLAF/BASE and a subtractor 12 for determining a difference $VO_2$(=VO2/OUT−VO2/TARGET) between the output VO2/OUT from the $O_2$ sensor 6 and a target value VO2/TARGET therefor.

The target value VO2/TARGET for the output VO2/OUT from the $O_2$ sensor 6 is sequentially determined by the exhaust-side control unit 7a depending on the operating state of the internal combustion engine 1 as an output value of the $O_2$ sensor 6 in order to achieve an optimum purifying capability of the catalytic converter 3. In the present embodiment, the exhaust-side control unit 7a determines the target value VO2/TARGET in each control cycle from the rotational speed NE and intake pressure PB of the internal combustion engine 1 using a predetermined map. The target value VO2/TARGET is a value between the output values VO2/OUT2, VO2/OUT3 shown in FIG. 2, for example.

In the present embodiment, the reference value FLAF/BASE with respect to the output KACT from the LAF sensor 5 is set to a "stoichiometric air-fuel ratio". The differences kact, $VO_2$ determined respectively by the subtractors 11, 12 are referred to as a differential output kact of the LAF sensor 5 and a differential output VO2 of the $O_2$ sensor 6, respectively.

The exhaust-side control unit 7a also has an exhaust-side main processor 13 which is supplied with the data of the differential outputs kact, VO2 as the data of the output from the LAF sensor 5 and the output of the $O_2$ sensor 6.

Figure 3:
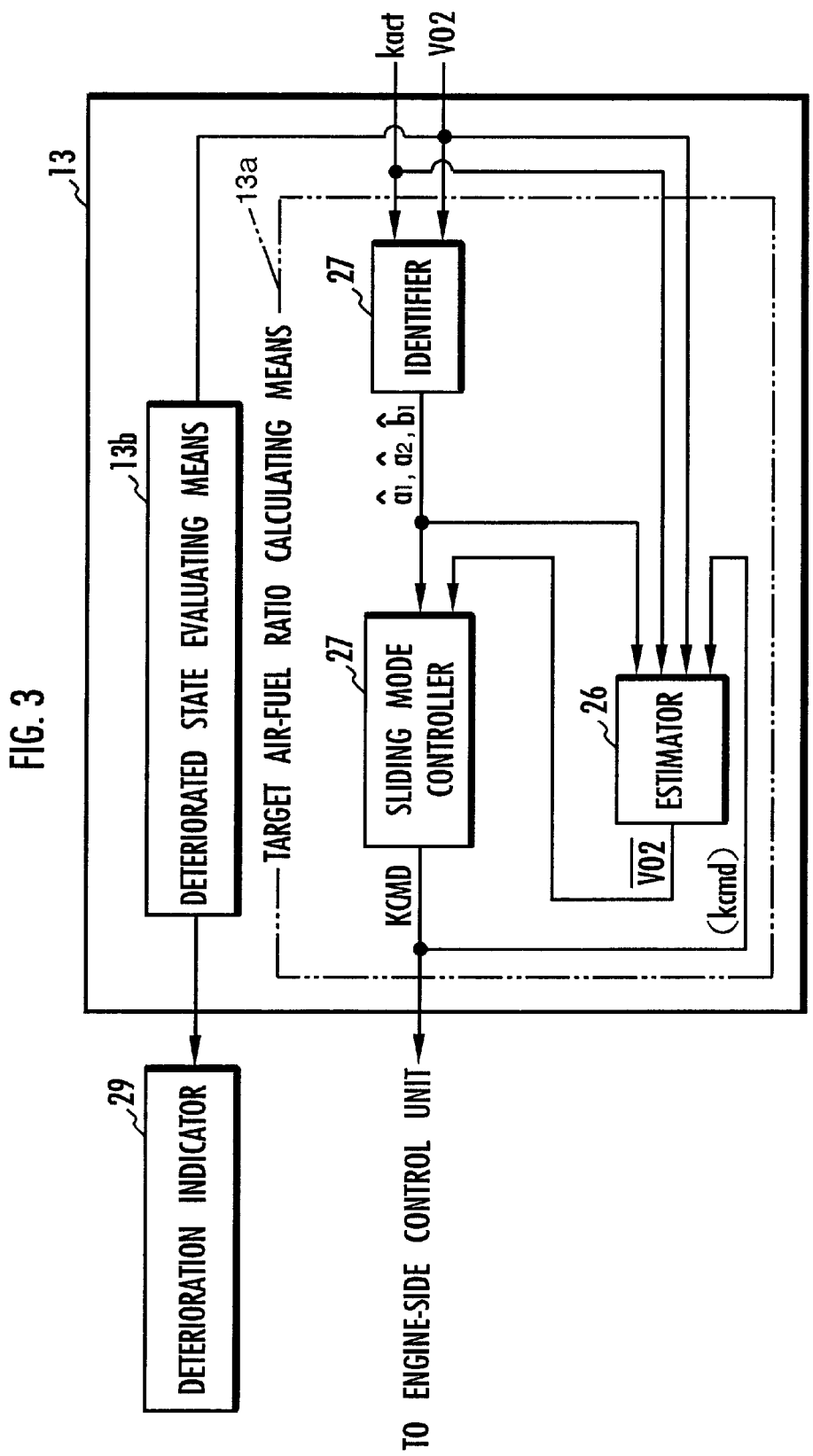
FIG. 3 is a block diagram showing a basic arrangement of a major component of the apparatus shown in FIG. 1.

As shown in FIG. 3, the exhaust-side main processor 13 comprises, as its functions, a target air-fuel ratio calculating means 13a for sequentially determining a target air-fuel ratio KCMD for the internal combustion engine 1 based on the data of the differential outputs kact, VO2, and a deteriorated state evaluating means 13b for evaluating the deteriorated state of the catalytic converter 3 based on the data of the differential output VO2 of the $O_2$ sensor 6.

The target air-fuel ratio calculating means 13a serves to control an object exhaust system (denoted by E in FIG. 1) including the catalytic converter 3, which ranges from the LAF sensor 5 to the $O_2$ sensor 6 along the exhaust pipe 2. The target air-fuel ratio calculating means 13a sequentially determines the target air-fuel ratio KCMD for the internal combustion engine 1 so as to converge the output VO2/OUT of the $O_2$ sensor 6 to the target value VO2/TARGET therefor according to a sliding mode control process, or specifically an adaptive sliding mode control process, in view of a dead time present in the object exhaust system E to be controlled, a dead time present in the internal combustion engine 1 and the engine-side control unit 7b, and behavioral changes of the object exhaust system E.

The deteriorated state evaluating means 13b serves to evaluate the deteriorated state of the catalytic converter 3 based on the value of a deterioration evaluating linear function, described later on, which is determined from time-series data of the differential output VO2 of the $O_2$ sensor 6, and control the operation of a deterioration indicator 29 (see FIG. 1) connected to the apparatus according to the present embodiment depending on the evaluation of the deteriorated state of the catalytic converter 3. The deterioration indicator 29 may comprise a lamp, a buzzer, or a display unit for displaying characters, a graphic image, etc. to indicate the deteriorated state of the catalytic converter 3.

The target air-fuel ratio calculating means 13a combined with the engine-side control unit 7b corresponds to an air-fuel ratio manipulating means according to the present invention. The deteriorated state evaluating means 13b includes the function of a parameter generating means according to the present invention.

The target air-fuel ratio calculating means 13a and the deteriorated state evaluating means 13b will further be described below.

In order to carry out the process of the target air-fuel ratio calculating means 13a, according to present embodiment, the object exhaust system E is regarded as a system for generating the output VO2/OUT of the $O_2$ sensor 6 (the detected value of the oxygen concentration of the exhaust gas having passed through the catalytic converter 3) from the output KACT of the LAF sensor 5 (the detected value of the air-fuel ratio of the internal combustion engine 1) via a dead time element and a response delay element, and the behavior of the system is modeled as a discrete time system.

In addition, the system comprising the internal combustion engine 1 and the engine-side control unit 7b is regarded as a system (hereinafter referred to as "air-fuel ratio manipulating system") for generating the output KACT of the LAF sensor 5 from the target air-fuel ratio KCMD via a dead time element, and the behavior of this system is modeled as a discrete time system.

In the present embodiment, the model (hereinafter referred to as "exhaust system model") in which the behavior of the object exhaust system E is expressed as a discrete time system is expressed, using the differential output kact (=KACT−FLAF/BASE) from the LAF sensor 5 and the differential output VO2 (=VO2/OUT−VO2/TARGET) from the $O_2$ sensor 6, instead of the output KACT of the LAF sensor 5 and the output VO2/OUT of the $O_2$ sensor 6, according to the following equation (1):

$$VO2(k+1)=a1 \cdot VO2(k)+a2 \cdot VO2(k-1)+b1 \cdot kact(k-d1) \tag{1}$$

According to the equation (1), the object exhaust system E is regarded as a system for generating the differential output VO2 from the $O_2$ sensor 6 from the differential output kact from the LAF sensor 5 via a dead time element and a response delay element, and expresses the behavior of the object exhaust system E with the model of a discrete time system (more specifically, an autoregressive model having a dead time in the differential output kact as an input to the exhaust system In the equation (1), "k" represents the ordinal number of a discrete-time control cycle of the exhaust-side control unit 7a, and "d1" the dead time (more specifically, the dead time required until the air-fuel ratio detected at each point of time by the LAF sensor 5 is reflected in the output VO2/OUT of the $O_2$ sensor 6) of the object exhaust system E as represented by the number of control cycles. The dead time of the object exhaust system E is generally equal to the time of 3–10 control cycles (d1=3–10) if the period (constant in the present embodiment) of control cycles of the exhaust-side control unit 7a ranges from 30 to 100 ms. In the present embodiment, a preset constant value (d1=7, for example) which is equal to or slightly longer than the actual dead time of the object exhaust system E is used as the dead time d1 in the exhaust system model as represented by the equation (1).

The first and second terms of the right side of the equation (1) correspond to a response delay element of the object exhaust system E, the first term being a primary autoregressive term and the second term being a secondary autoregressive term. In the first and second terms, "a1", "a2" represent respective gain coefficients of the primary autoregressive term and the secondary autoregressive term. Stated otherwise, these gain coefficients a1, a2 are relative to the differential output VO2 of the $O_2$ sensor 6 as an output of the object exhaust system E.

The third term of the right side of the equation (1) represents the differential output kact of the LAF sensor 5 as an input to the object exhaust system E, including the dead time d1 of the object exhaust system E. In the third term, "b1" represents a gain coefficient relative to the input to the object exhaust system E, i.e., the differential output kact of the LAF sensor 5. These gain coefficients "a1", "a2", "b1" are parameters which define the behavior of the exhaust system model, and are sequentially identified by an identifier which will be described later on.

The model (hereinafter referred to as "air-fuel ratio manipulating system model") of the discrete time system of the air-fuel ratio manipulating system which comprises the internal combustion engine 1 and the engine-side control unit 7b is expressed, using the differential output kact (=KACT−FLAF/BASE) from the LAF sensor 5 instead of the output KACT from the LAF sensor 5 and also using a difference kcmd (=KCMD−FLAF/BASE, which corresponds to a target value for the differential output kact of the LAF sensor 5, and will be referred to as "target differential air-fuel ratio kcmd") between the target air-fuel ratio KCMD and the reference value FLAF/BASE instead of the target air-fuel ratio KCMD, according to the following equation (2):

$$kact(k)=kcmd(k-d2) \qquad (2)$$

The equation (2) expresses the air-fuel ratio manipulating system as the model of a discrete time system, regarding the air-fuel ratio manipulating system as a system for generating the differential output kact from the LAF sensor 5 from the target differential air-fuel ratio kcmd via a dead time element, i.e., a system in which the differential output kact in each control cycle is equal to the target differential air-fuel ratio kcmd prior to the dead time.

In the equation (2), "d2" represents the dead time of the air-fuel ratio manipulating system (more specifically, the time required until the target air-fuel ratio KCMD at each point of time is reflected in the output signal KACT of the LAF sensor 5) in terms of the number of control cycles of the exhaust-side control unit 7a. The dead time of the air-fuel ratio manipulating system varies with the rotational speed NE of the internal combustion engine 1, and is longer as the rotational speed NE of the internal combustion engine 1 is lower. In the present embodiment, in view of the above characteristics of the dead time of the air-fuel ratio manipulating system, a preset constant value (for example, d2=3) which is equal to or slightly longer than the actual dead time of the air-fuel ratio manipulating system at an idling rotational speed of the internal combustion engine 1, which is a rotational speed in a low speed range of the internal combustion engine 1 (the actual dead time is a maximum dead time which can be taken by the air-fuel ratio manipulating system at an arbitrary rotational speed of the internal combustion engine 1), is used as the value of the dead time d2 in the air-fuel ratio manipulating system model expressed by the equation (2).

The air-fuel ratio manipulating system actually includes a dead time element and a response delay element of the internal combustion engine 1. Since a response delay of the output KACT of the LAF sensor 5 with respect to the target air-fuel ratio KCMD is basically compensated for by the feedback controller 14 (particularly the adaptive controller 18) of the engine-side control unit 7b, there will arise no problem if a response delay element of the internal combustion engine 1 is not taken into account in the air-fuel ratio manipulating system as viewed from the exhaust-side control unit 7a.

The target air-fuel ratio calculating means 13a of the exhaust-side main processor 13 carries out the process for calculating the target air-fuel ratio KCMD based on the exhaust system model and the air-fuel ratio manipulating system model expressed respectively by the equations (1), (2) in control cycles of the exhaust-side control unit 7a. In order to carry out the above process, the target air-fuel ratio calculating means 13a has its functions as shown in FIG. 3.

As shown in FIG. 3, the target air-fuel ratio calculating means 13a comprises an identifier 25 for sequentially determining in each control cycle identified values a1 hat, a2 hat, b1 hat of the gain coefficients a1, a2, b1 (hereinafter referred to as "identified gain coefficients a1 hat, a2 hat, b1 hat") that are parameters to be established for the exhaust system model (the equation (1)), an estimator 26 for sequentially determining in each control cycle an estimated value VO2 bar of the differential output VO2 from the $O_2$ sensor 6 (hereinafter referred to as "estimated differential output VO2 bar") after the total dead time d (=d1+d2) which is the sum of the dead time d1 of the object exhaust system E and the dead time d2 of the air-fuel ratio manipulating system, and a sliding mode controller 27 for sequentially determining in each control cycle a target air-fuel ratio KCMD according to an adaptive slide mode control process.

The algorithm of a processing operation to be carried out by the identifier 25, the estimator 26, and the sliding mode controller 27 is constructed as follows:

The identifier 25 serves to identify the gain coefficients a1, a2, b1 sequentially on a real-time basis for the purpose of minimizing a modeling error of the actual object exhaust system E of the exhaust system model expressed by the equation (1). The identifier 25 carries out its identifying process as follows:

In each control cycle of the exhaust-side control unit 7a, the identifier 25 determines an identified value VO2(k) hat of the differential output VO2 (the output of the exhaust system model) from the $O_2$ sensor 6 (hereinafter referred to as "identified differential output VO2(k) hat") on the exhaust system model, using the identified gain coefficients a1 hat, a2 hat, b1 hat of the presently established exhaust system model, i.e., identified gain coefficients a1(k−1) hat, a2(k−1) hat, b1(k−1) hat determined in a preceding control cycle, and past data kact(k−d1−1), VO2(k−1), VO2(k−2) of the differential output kact from the LAF sensor 5 and the differential output VO2 from the $O_2$ sensor 6, according to the following equation (3):

$$V\hat{O}2(k) = \hat{a}1(k-1)\cdot VO2(k-1) + \hat{a}2(k-1)\cdot VO2(k-2) + \hat{b}1(k-1)\cdot kact(k-d1-1) \qquad (3)$$

The equation (3) corresponds to the equation (1) which is shifted into the past by one control cycle with the gain coefficients a1, a2, b1 being replaced with the respective identified gain coefficients a1(k−1) hat, a2(k−1) hat, b1(k−1) hat. The constant value (d1=7) established as described above is used as the value of the dead time d1 of the object exhaust system E in the third term of the equation (3).

If vectors $\Theta$, $\xi$ defined by the following equations (4), (5) are introduced (the letter T in the equations (4), (5) represents a transposition), then the equation (3) is expressed by the equation (6):

$$\Theta^T(k) = [\hat{a}1(k)\hat{a}2(k)\hat{b}1(k)] \quad (4)$$

$$\xi^T(k)=[VO2(k-1)VO2(k-2)kact(k-d1-1)] \quad (5)$$

$$V\hat{O}2(k)=\Theta^T(k-1)\cdot\xi(k) \quad (6)$$

The identifier 25 also determines a difference id/e(k) between the identified differential output VO2(k) hat from the $O_2$ sensor 6 which is determined by the equation (3) or (6) and the present differential output VO2(k) from the $O_2$ sensor 6, as representing a modeling error of the exhaust system model with respect to the actual object exhaust system E (hereinafter the difference id/e will be referred to as "identified error id/e"), according to the following equation (7):

$$id/e(k)=VO2(k)-V\hat{O}2(k) \quad (7)$$

The identifier 25 further determines new identified gain coefficients a1(k) hat, a2(k) hat, b1(k) hat, stated otherwise, a new vector $\Theta(k)$ having these identified gain coefficients as elements (hereinafter the new vector $\Theta(k)$ will be referred to as "identified gain coefficient vector $\Theta$"), in order to minimize the identified error id/e, according to the equation (8) given below. That is, the identifier 25 varies the identified gain coefficients a1 hat (k−1), a2 hat (k−1), b1 hat (k−1) determined in the preceding control cycle by a quantity proportional to the identified error id/e for thereby determining the new identified gain coefficients a1(k) hat, a2(k) hat, b1(k) hat.

$$\Theta(k)=\Theta(k-1)+K\theta(k)\cdot id/e(k) \quad (8)$$

where $K\theta$ represents a cubic vector determined by the following equation (9), i.e., a gain coefficient vector for determining a change depending on the identified error id/e of the identified gain coefficients a1 hat, a2 hat, b1 hat):

$$K\theta(k) = \frac{P(k-1)\cdot\xi(k)}{1+\xi^T(k)\cdot P(k-1)\cdot\xi(k)} \quad (9)$$

where P represents a cubic square matrix determined by a recursive formula expressed by the following equation (10):

$$P(k) = \frac{1}{\lambda_1(k)}\cdot\left[I - \frac{\lambda_2(k)\cdot P(k-1)\cdot\xi(k)\cdot\xi^T(k)}{\lambda_1(k)+\lambda_2(k)\cdot\xi^T(k)\cdot P(k-1)\cdot\xi(k)}\right]\cdot P(k-1) \quad (10)$$

where I represents a unit matrix.

In the equation (10), $\lambda_1$, $\lambda_2$ are established to satisfy the conditions $0<\lambda_1\leq 1$ and $0\leq\lambda_2<2$, and an initial value P(0) of P represents a diagonal matrix whose diagonal components are positive numbers.

Depending on how $\lambda_1$, $\lambda_2$ in the equation (10) are established, any one of various specific algorithms including a fixed gain method, a degressive gain method, a method of weighted least squares, a method of least squares, a fixed tracing method, etc. may be employed. According to the present embodiment, a method of least squares ($\lambda_1=\lambda_2=1$), for example, is employed.

Basically, the identifier 25 sequentially determines in each control cycle the identified gain coefficients a1 hat, a2 hat, b1 hat of the exhaust system model in order to minimize the identified error id/e according to the above algorithm (calculating operation). Through this operation, it is possible to sequentially obtain the identified gain coefficients a1 hat, a2 hat, b1 hat which match the actual object exhaust system E.

The algorithm described above is the basic algorithm that is carried out by the identifier 25.

The estimator 26 sequentially determines in each control cycle the estimated differential output VO2 bar which is an estimated value of the differential output VO2 from the $O_2$ sensor 6 after the total dead time d (=d1+d2) in order to compensate for the effect of the dead time d1 of the object exhaust system E and the effect of the dead time d2 of the air-fuel ratio manipulating system for the calculation of the target air-fuel ratio KCMD with the sliding mode controller 27 as described in detail later on. The algorithm for the estimator 26 to determine the estimated differential output VO2 bar is constructed as follows:

If the equation (2) expressing the model of the air-fuel ratio manipulating system is applied to the equation (1) expressing the model of the object exhaust system E, then the equation (1) can be rewritten as the following equation (11):

$$VO2(k+1) = a1\cdot VO2(k) + a2\cdot VO2(k-1) + \quad (11)$$
$$b1\cdot kcmd(k-d1-d2)$$
$$= a1\cdot VO2(k) + a2\cdot VO2(k-1) + b1\cdot kcmd(k-d)$$

The equation (11) expresses the behavior of a system which is a combination of the object exhaust system E and the air-fuel manipulating system as the model of a discrete time system, regarding such a system as a system for generating the differential output VO2 from the $O_2$ sensor 6 from the target differential air-fuel ratio kcmd via dead time elements of the object exhaust system E and the air-fuel manipulating system and a response delay element of the object exhaust system E.

By using the equation (11), the estimated differential output VO2(k+d) bar which is an estimated value of the differential output VO2(k+d) of the $O_2$ sensor 6 after the total dead time d in each control cycle can be expressed using time-series data VO2(k), VO2(k−1) of present and past values of the differential output VO2 of the $O_2$ sensor 6 and time-series data kcmd(k−j) (j=1, 2, ..., d) of the past values of the target differential air-fuel ratio kcmd (=KCMD−FLAF/BASE) which corresponds to the target air-fuel ratio KCMD determined by the sliding mode controller 27 (its specific process of determining the target air-fuel ratio KCMD will be described later on), according to the following equation (12):

$$\overline{VO2}(k+d) = \alpha 1\cdot VO2(k) + \alpha 2\cdot VO2(k-1) + \quad (12)$$
$$\sum_{j=1}^{d}\beta j\cdot kcmd(k-j)$$

where
 $\alpha 1$=the first-row, first-column element of $A^d$,
 $\alpha 2$=the first-row, second-column element of $A^d$,
 $\beta j$=the first-row elements of $A^{j-1}\cdot B$ $$A = \begin{bmatrix} a1 & a2 \\ 1 & 0 \end{bmatrix}$$

$$B = \begin{bmatrix} b1 \\ 0 \end{bmatrix}$$

$$B = \begin{bmatrix} b1 \\ 0 \end{bmatrix}$$

In the equation (12), "α1", "α2" represent the first-row, first-column element and the first-row, second-column element, respectively, of the dth power $A^d$ (d: total dead time) of the matrix A defined as described above with respect to the equation (12), and "βj" (j=1, 2, . . . , d) represents the first-row elements of the product $A^{j-1}$·B of the (j−1)th power $A^{j-1}$ (j=1, 2, . . . , d) of the matrix A and the vector B defined as described above with respect to the equation (12).

Of the time-series data of the past values of the target combined differential air-fuel ratio kcmd according to the equation (12), the time-series data kcmd(k−d2), kcmd(k−d2−1), . . . , kcmd(k−d) from the present prior to the dead time d2 of the air-fuel manipulating system can be replaced respectively with data kact(k), kact(k−1), . . . , kact(k−d+d2) obtained prior to the present time of the differential output kact of the LAF sensor 5 according the above equation (2). When the time-series data are thus replaced, the following equation (13) is obtained:

$$\overline{VO2L}(k+d) = a1 \cdot VO2(k) + a2 \cdot VO2(k-1) + \qquad (13)$$
$$\sum_{j=1}^{d2-1} \beta j \cdot kcmd(k-j) + \sum_{i=0}^{d-d2} \beta i + d2 \cdot kact(k-i)$$
$$= a1 \cdot VO2(k) + a2 \cdot VO2(k-1) +$$
$$\sum_{j=1}^{d2-1} \beta j \cdot kcmd(k-j) + \sum_{i=0}^{d1} \beta i + d2 \cdot kact(k-i)$$

The equation (13) is a basic formula for the estimator 26 to determine the estimated differential output VO2(k+d) bar. Stated otherwise, the estimator 26 determines, in each control cycle, the estimated differential output VO2(k+d) bar of the $O_2$ sensor 6 according to the equation (13), using the time-series data VO2(k), VO2(k−1) of the differential output VO2 of the $O_2$ sensor 6, the time-series data kcmd(k−j) (j=1, . . . , d2−1) of the past values of the target differential air-fuel ratio kcmd which represents the target air-fuel ratio KCMD determined in the past by the sliding mode controller 27, and the time-series data kact(k−i) (i=0, . . . , d1) of the present and past values of the differential output kact of the LAF sensor 5.

In the present embodiment, the values of the coefficients α1, α2, βj (j=1, 2, . . . , d) required to calculate the estimated differential output VO2(k+d) bar according to the equation (13) are basically calculated using the identified gain coefficients a1 hat, a2 hat, b1 hat which are the identified values of the gain coefficients a1, a2, b1 (which are elements of the vectors A, B defined with respect to the equation (12)). The values of the dead times d1, d2 required in the equation (13) comprise the preset values as described above.

The estimated differential output VO2(k+d) bar may be determined according to the equation (12) without using the data of the differential output kact of the LAF sensor 5. For increasing the reliability of the estimated differential output VO2(k+d) bar, however, it is preferable to determine the estimated differential output VO2(k+d) bar according to the equation (13) using the data of the differential output kact of the LAF sensor 5 which reflects the actual behavior of the internal combustion engine 1. If the dead time d2 of the air-fuel ratio manipulating system can be set to "1", all the time-series data kcmd(k−j) (j=1, 2, . . . , d) of the past values of the target differential air-fuel ratio kcmd in the equation (12) may be replaced with the time-series data kact(k), kact(k−1), . . . , kact(k−d+d2), respectively, prior to the present time, of the differential output kact of the LAF sensor 5. In this case, the estimated differential output VO2(k+d) bar can be determined according to the following equation (14) which does not include the data of the target differential air-fuel ratio kcmd:

$$\overline{VO2L}(k+d) = a1 \cdot VO2(k) + a2 \cdot VO2(k-1) + \qquad (14)$$
$$\sum_{j=0}^{d-1} \beta j + 1 \cdot kact(k-j)$$

The sliding mode controller 27 will be described in detail below.

The sliding mode controller 27 determines an input quantity to be given to the object exhaust system E (which is specifically a target value for the difference between the output KACT of the LAF sensor 5 (the detected value of the air-fuel ratio) and the reference value FLAF/BASE, which target value is equal to the target differential air-fuel ratio kcmd, the input quantity will be referred to as "SLD manipulating input Usl") in order to cause the output VO2/OUT of the $O_2$ sensor 6 to settle on the target value VO2/TARGET, i.e., to converge the differential output VO2 of the $O_2$ sensor 6 to "0" according to an adaptive sliding mode control process which incorporates an adaptive control law for minimizing the effect of a disturbance, in a normal sliding mode control process, and determines the target air-fuel ratio KCMD from the determined SLD manipulating input Usl. An algorithm for carrying out the adaptive sliding mode control process is constructed as follows:

A switching function required for the algorithm of the adaptive sliding mode control process carried out by the sliding mode controller 27 and a hyperplane defined by the switching function (also referred to as a slip plane) will first be described below.

According to a basic concept of the sliding mode control process, the differential output VO2(k) of the $O_2$ sensor 6 obtained in each control cycle and the differential output VO2(k−1) obtained in a preceding control cycle are used as a state quantity to be controlled (controlled quantity), and a switching function σ for the sliding mode control process is defined as a linear function whose variable components are represented by the differential outputs VO2(k), VO2(k−1) according to the following equation (15):

$$\sigma(k) = s1 \cdot VO2(k) + s2 \cdot VO2(k-1) = S \cdot X \qquad (15)$$

where $$S = [s1 \ s2],$$

$$X = \begin{bmatrix} VO2(k) \\ VO2(k-1) \end{bmatrix}$$

A vector X defined above with respect to the equation (15) as a vector whose elements are represented by the differential outputs VO2(k), VO2(k−1) will hereinafter be referred to as a state quantity X.

The coefficients s1, s2 of the switching function σ are set in order to meet the condition of the following equation (16):

$$-1 < \frac{s2}{s1} < 1 \tag{16}$$

(when s1=1, −1<s2<1)

In the present embodiment, for the sake of brevity, the coefficient s1 is set to s1=1 (s2/s1=s2), and the coefficient s2 is established to satisfy the condition: −1<s2<1.

Figure 4:
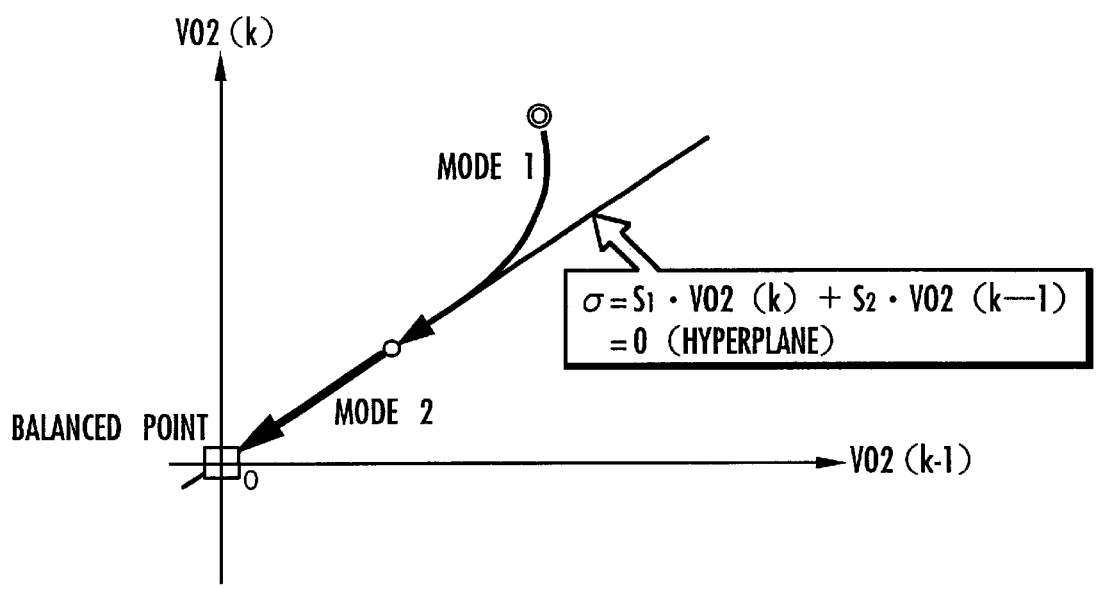
FIG. 4 is a diagram illustrative of a sliding mode control process carried out in the apparatus shown in FIG. 1.

With the switching function σ thus defined, the hyperplane for the sliding mode control process is defined by the equation σ=0. Since the state quantity X is of the second degree, the hyperplane σ=0 is represented by a straight line as shown in FIG. 4. At this time, the hyperplane is called a switching line or a switching plane depending on the degree of a topological space.

In the present embodiment, the time-series data of the estimated differential output VO2 bar determined by the estimator 26 is used as the variable components of the switching function for the sliding mode control process, as described later on.

The adaptive sliding mode control process serves to converge the state quantity X onto the hyperplane σ=0 according to a reaching control law which is a control law for converging the state quantity X (=VO2(k), VO2(k−1)) onto the hyperplane σ=0, and an adaptive control law (adaptive algorithm) which is a control law for compensating for the effect of a disturbance in converging the state quantity X onto the hyperplane σ=0 (mode 1 in FIG. 4). While holding the state quantity X onto the hyperplane σ=0 according to an equivalent control input, the state quantity X is converged to a balanced point on the hyperplane σ=0 where VO2(k)=VO2(k−1)=0, i.e., a point where time-series data VO2/OUT(k), VO2/OUT(k−1) of the output VO2/OUT of the O$_2$ sensor 6 are equal to the target value VO2/TARGET (mode 2 in FIG. 4).

The SLD manipulating input Usl (=the target differential air-fuel ratio kcmd) to be generated by the sliding mode controller 27 for converging the state quantity X toward the balanced point on the hyperplane σ=0 is expressed as the sum of an equivalent control input Ueq to be applied to the object exhaust system E according to the control law for converging the state quantity X onto the hyperplane σ=0, an input Urch (hereinafter referred to as "reaching control law input Urch") to be applied to the object exhaust system E according to the reaching control law, and an input Uadp (hereinafter referred to as "adaptive control law Uadp") to be applied to the object exhaust system E according to the adaptive control law (see the following equation (17)).

$$Usl = Ueq + Urch + Uadp \tag{17}$$

The equivalent control input Ueq, the reaching control law input Urch, and the adaptive control law input Uadp are determined on the basis of the model of the discrete time system expressed by the equation (11), i.e., the model in which the differential output kact(k−d1) of the LAF sensor 5 in the equation (11) is replaced with the target differential air-fuel ratio kcmd(k−d) using the total dead time d, as follows:

The equivalent control input Ueq which is an input component to be applied to the object exhaust system E for converging the state quantity X onto the hyperplane σ=0 is the target differential air-fuel ratio kcmd which satisfies the condition: σ(k+1)=σ(k)=0. Using the equations (11), (15), the equivalent control input Ueq which satisfies the above condition is given by the following equation (18):

$$Ueq(k) = -(S \cdot B)^{-1} \cdot \{S \cdot (A-1)\} \cdot X(k+d) \tag{18}$$

$$= \frac{-1}{s1 \cdot b1} \cdot \{[s1 \cdot (a1-1) + s2] \cdot VO2(k+d) +$$

$$(s1 \cdot a2 - s2) \cdot VO2(k+d-1)\}$$

The equation (18) is a basic formula for determining the equivalent control law input Ueq(k) in each control cycle.

According to the present embodiment, the reaching control law input Urch is basically determined according to the following equation (19):

$$Urch(k) = -(S \cdot B)^{-1} \cdot F \cdot \sigma(k+d) \tag{19}$$

$$= \frac{-1}{s1 \cdot b1} \cdot F \cdot \sigma(k+d)$$

Specifically, the reaching control law input Urch is determined in proportion to the value σ(k+d) of the switching function σ after the total dead time d, in view of the effect of the total dead time d.

The coefficient F in the equation (19) which determines the gain of the reaching control law is established to satisfy the condition expressed by the following equation (20):

$$0 < F < 2 \tag{20}$$

The value of the switching function σ may possibly vary in an oscillating fashion (so-called chattering) with respect to the hyperplane σ=0. In order to suppress such chattering, it is preferable that the coefficient F relative to the reaching control law input Urch be established to further satisfy the condition of the following equation (21):

$$0 < F < 1 \tag{21}$$

The adaptive control law input Uadp is basically determined according to the following equation (22) (ΔT in the equation (22) represents the period of the control cycles of the exhaust-side control unit 7a):

$$Uadp(k) = -(S \cdot B)^{-1} \cdot G \cdot \sum_{i=0}^{k+d} (\sigma(i) \cdot \Delta T) \tag{22}$$

$$= \frac{-1}{s1 \cdot b1} \cdot G \cdot \sum_{i=0}^{k+d} (\sigma(i) \cdot \Delta T)$$

The adaptive control law input Uadp is determined in proportion to an integrated value (which corresponds to an integral of the values of the switching function σ) over control cycles of the product of values of the switching function σ and the period ΔT of the exhaust-side control unit 7a until after the total dead time d, in view of the effect of the total dead time d.

The coefficient G (which determines the gain of the adaptive control law) in the equation (22) is established to satisfy the condition of the following equation (23):

$$G = J \cdot \frac{2-F}{\Delta T} \tag{23}$$

$$(0 < J < 2)$$

A specific process of deriving conditions for establishing the equations (16), (20), (21), (23) is described in detail in Japanese patent application No. 11-93741 and U.S. Pat. No. 6,082,099, and will not be described in detail below.

In the present embodiment, the sliding mode controller 27 determines the sum (Ueq+Urch+Uadp) of the equivalent control input Ueq, the reaching control law input Urch, and the adaptive control law Uadp determined according to the respective equations (18), (19), (22) as the SLD manipulating input Usl to be applied to the object exhaust system E. However, the differential outputs VO2(K+d), VO2($k+d-1$) of the O$_2$ sensor 6 and the value σ(k+d) of the switching function σ, etc. used in the equations (18), (19), (22) cannot directly be obtained as they are values in the future.

According to the present embodiment, therefore, the sliding mode controller 27 actually uses the estimated differential outputs VO2($k+d$) bar, VO2($k+d-1$) bar determined by the estimator 26, instead of the differential outputs VO2(K+d), VO2($k+d-1$) from the O$_2$ sensor 6 for determining the equivalent control input Ueq according to the equation (18), and calculates the equivalent control input Ueq in each control cycle according to the following equation (24):

$$Ueq(k) = \frac{-1}{s1 \cdot b1}\{[s1 \cdot (a1-1) + s2] \cdot \overline{VO2}(k+d) + (s1 \cdot a2 - s2) \cdot \overline{VO2}(k+d-1)\} \quad (24)$$

According to the present embodiment, furthermore, the sliding mode controller 27 actually uses time-series data of the estimated differential output VO2 bar sequentially determined by the estimator 26 as described as a state quantity to be controlled, and defines a switching function σ bar according to the following equation (25) (the switching function σ bar corresponds to time-series data of the differential output VO2 in the equation (15) which is replaced with time-series data of the estimated differential output VO2 bar), in place of the switching function σ established according to the equation (15):

$$\overline{\sigma(k)} = s1 \cdot \overline{VO2}(k) + s2 \cdot \overline{VO2}(k-1) \quad (25)$$

The sliding mode controller 27 calculates the reaching control law input Urch in each control cycle according to the following equation (26), using the switching function σ bar represented by the equation (25), rather than the value of the switching function σ for determining the reaching control law input Urch according to the equation (19):

$$Urch(k) = \frac{-1}{s1 \cdot b1} \cdot F \cdot \overline{\sigma}(k+d) \quad (26)$$

Similarly, the sliding mode controller 27 calculates the adaptive control law input Uadp in each control cycle according to the following equation (27), using the value of the switching function σ bar represented by the equation (25), rather than the value of the switching function σ for determining the adaptive control law input Uadp according to the equation (22):

$$Uadp(k) = \frac{-1}{s1 \cdot b1} \cdot G \cdot \sum_{i=0}^{k+d}(\overline{\sigma}(i) \cdot \Delta T) \quad (27)$$

The latest identified gain coefficients a1(k) hat, a2(k) hat, b1(k) hat which have been determined by the identifier 25 are basically used as the gain coefficients a1, a1, b1 that are required to calculate the equivalent control input Ueq, the reaching control law input Urch, and the adaptive control law input Uadp according to the equations (24), (26), (27).

The sliding mode controller 27 determines the sum of the equivalent control input Ueq, the reaching control law input Urch, and the adaptive control law input Uadp determined according to the equations (24), (26), (27), as the SLD manipulating input Usl to be applied to the object exhaust system E (see the equation (17)). The conditions for establishing the coefficients s1, s2, F, G used in the equations (24), (26), (27) are as described above.

The above process is a basic algorithm for determining the SLD manipulating input Usl (=target differential air-fuel ratio kcmd) to be applied to the object exhaust system E with the sliding mode controller 27. According to the above algorithm, the SLD manipulating input Usl is determined to converge the estimated differential output VO2 bar from the O$_2$ sensor 6 toward "0", and as a result, to convert the output VO2/OUT from the O$_2$ sensor 6 toward the target value VO2/TARGET.

The sliding mode controller 27 eventually sequentially determines the target air-fuel ratio KCMD in each control cycle. The SLD manipulating input Usl determined as described above signifies a target value for the difference between the air-fuel ratio of the exhaust gas detected by the LAF sensor 5 and the reference value FLAF/BASE, i.e., the target differential air-fuel ratio kcmd. Consequently, the sliding mode controller 27 eventually determines the target air-fuel ratio KCMD by adding the reference value FLAF/BASE to the determined SLD manipulating input Usl in each control cycle according to the following equation (28):

$$KCMD(k) = Usl(k) + FLAF/BASE \quad (28)$$
$$= Ueq(k) + Urch(k) + Uadp(k) + FLAF/BASE$$

The above process is a basic algorithm for determining the target air-fuel ratio KCMD with the sliding mode controller 27 according to the present embodiment.

In the present embodiment, the stability of the adaptive sliding mode control process carried out by the sliding mode controller 27 is checked for limiting the value of the SLD manipulating input Usl. Details of such a checking process will be described later on.

A process carried out by the deteriorated state evaluating means 13b will be described below.

When the target air-fuel ratio KCMD is sequentially determined by the sliding mode controller 27 and the fuel injection quantity of the internal combustion engine 1 is adjusted by the engine-side control unit 7b is adjusted in order converge the output KACT (the detected value of the air-fuel ratio of the internal combustion engine 1) of the LAF sensor to the target air-fuel ratio KCMD, the time-series data of the output VO2/OUT of the O$_2$ sensor 6 exhibits characteristic changes depending on the deteriorated state of the catalytic converter 3 with respect to the hyperplane σ=0.

Such characteristic changes will be described below with reference to FIGS. 5 through 7. FIGS. 5 through 7 show sampled data, represented by stippled dots, of the set of the time-series data VO2(k), VO2(k−1) of the differential output VO2 of the O$_2$ sensor 6, i.e., the state quantity X, which are obtained in respective control cycles of the exhaust-side control unit 7a when the fuel injection quantity of the internal combustion engine 1 is adjusted depending on the target air-fuel ratio KCMD, with respect to a brand-new catalytic converter 3, a catalytic converter 3 that has been deteriorated to a relatively small degree, and a catalytic converter 3 that has been deteriorated to a relatively large degree. In each of FIGS. 5 through 7, the straight line represents the hyperplane σ=0.

As shown in FIG. 5, when the catalytic converter 3 is brand-new, the state quantities X tend to concentrate in the vicinity of the hyperplane σ=0. As the deterioration of the catalytic converter 3 progresses, as shown in FIGS. 6 and 7, the state quantities X tend to be distributed away from the hyperplane σ=0, i.e., vary in a larger range around the hyperplane σ=0. The state quantities X tend to be distributed more widely as the catalytic converter 3 is deteriorated to a larger degree, i.e., as the deterioration of the catalytic converter 3 progresses more greatly. Stated otherwise, as the deterioration of the catalytic converter 3 progresses, the switching function σ determined according to the equation (15) is likely to have a value more remote from "0", and hence vary more widely from "0". This appears to be due to the fact that as the deterioration of the catalytic converter 3 progresses, the exhaust system model according to the equation (1) tends to suffer an error, and hence the ability of the state quantity X to converge to the hyperplane σ=0 is lowered.

The above tendency also is also exhibited by the value of the switching function σ bar determined by the equation (25) where the estimated differential output VO2 bar determined by the estimator 26 is used as a variable component, i.e., the switching function used actually as the switching function for the sliding mode control process, if the target value VO2/TARGET for the output VO2/OUT of the $O_2$ sensor 6 is constant. Whereas the switching function σ bar employs the estimated value of the differential output VO2 of the $O_2$ sensor 6, the switching function according to the equation (15) employs the actual differential output VO2 of the $O_2$ sensor 6. Therefore, the latter appears to better reflect the actual deteriorated state of the catalytic converter 3.

For the above reason, according to the present embodiment, a deterioration evaluating parameter for evaluating the deteriorated state of the catalytic converter 3 is generated, as described later on, using the value of the switching function σ according to the equation (15), and the deteriorated state of the catalytic converter 3 is evaluated based on the value of the deterioration evaluating parameter. As described above, the actual switching function for the sliding mode control process is the switching function σ bar defined according to the equation (25) where the estimated differential output VO2 bar determined by the estimator 26 is used as a variable component. Strictly, the switching function σ according to the equation (15) is not the switching function for the sliding mode control process according to the present embodiment. The switching function σ according to the equation (15) will hereinafter be referred to as "deterioration evaluating linear function σ".

An algorithm for evaluating the deteriorated state of the catalytic converter 3 based on the deterioration evaluating linear function σ with the deteriorated state evaluating means 13b is constructed as follows:

In view of the above tendency of the deterioration evaluating linear function σ to change as the deterioration of the catalytic converter 3 progresses, the deteriorated state evaluating means 13b sequentially determines the square $\sigma^2$ of the value of the deterioration evaluating linear function σ in each control cycle.

Then, the deteriorated state evaluating means 13b effects a low-pass filtering process on the square $\sigma^2$ to determine a central value of the square $\sigma^2$ (hereinafter represented by $LS\sigma^2$) as a basic deterioration evaluating parameter.

The above filtering process to determine the deterioration evaluating parameter $LS\sigma^2$ comprises a sequential statistic processing algorithm, and is represented by the following equation (29):

$$LS\sigma^2(k) = LS\sigma^2(k-1) + \frac{BP(k-1)}{1+BP(k-1)} \cdot (\sigma^2(k) - LS\sigma^2(k-1)) \quad (29)$$

Thus, the deterioration evaluating parameter $LS\sigma^2$ is determined while being sequentially updated, in each control cycle of the exhaust-side control unit 7a, from a previous value $LS\sigma^2(k-1)$ of the deterioration evaluating parameter $LS\sigma^2$, a present value $\sigma^2 k$ of the square $\sigma^2$, and a gain parameter BP updated in each control cycle by a recursive formula expressed by the following equation (30):

$$BP(k) = \frac{1}{\eta 1} \cdot \left(1 - \frac{\eta 2 \cdot BP(k-1)}{\eta 1 + \eta 2 \cdot BP(k-1)}\right) \cdot BP(k-1) \quad (30)$$

In the equation (30), η1, η2 are set to values that satisfy the conditions: 0<η1≦1 and 0≦η2<1. Depending on how the values of η1, η2 are set, various specific algorithms including a fixed gain method, a degression method, a method of weighted least squares, a method of least squares, a fixed tracing method, etc. are constructed. According to the present embodiment, η1 is set to a given positive value smaller than "1" (0<η1<1), and η2=1, and the algorithm of the method of weighted least squares is employed.

Figure 8:
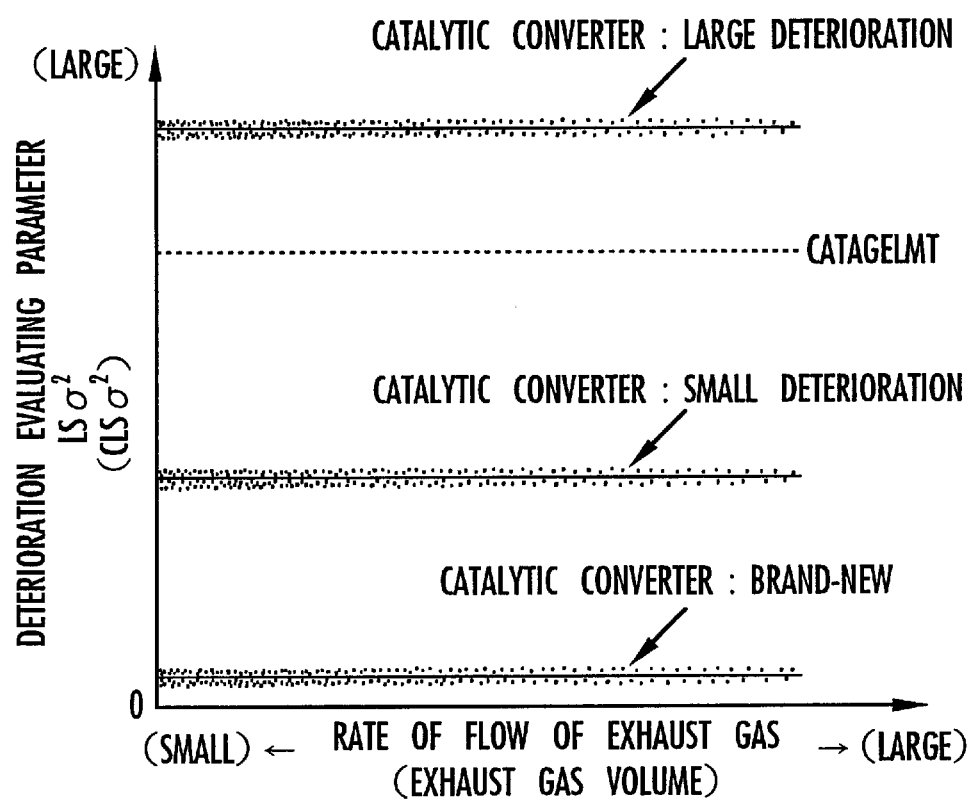
FIG. 8 is a diagram illustrative of the process of evaluating the deteriorated state of the catalytic converter employed by the apparatus shown in FIG. 1.

When the deterioration evaluating parameter $LS\sigma^2$ as the central value (the central value of the minimum square in the present embodiment) of the square $\sigma^2$ of the deterioration evaluating linear function σ is determined, the value of the deterioration evaluating parameter $LS\sigma^2$ exhibits a tendency shown in FIG. 8 with respect to the deteriorated state of the catalytic converter 3 (it is assumed that the target value VO2/TARGET for the output VO2/OUT of the $O_2$ sensor 6 is constant). FIG. 8 shows the relationship between the deterioration evaluating parameter $LS\sigma^2$ determined as described above and the rate of flow of the exhaust gas through the catalytic converter 3 (hereinafter referred to as "exhaust gas volume") at the respective deteriorated states of the catalytic converters 3 shown in FIGS. 5 through 7.

As shown in FIG. 8, the deterioration evaluating parameter $LS\sigma^2$ remains substantially constant irrespective of the exhaust gas volume at each of the deteriorated states of the catalytic converters 3, and increases its value as the deterioration of the catalytic converters 3 progresses. Therefore, the deterioration evaluating parameter $LS\sigma^2$ represents the degree to which the catalytic converter 3 is deteriorated.

In the present embodiment, the deteriorated state of the catalytic converter 3 is evaluated to judge whether the catalytic converter 3 is in a state where it has been deteriorated to the extent that it needs to be replaced immediately or soon (such a deteriorated state will hereinafter be referred to as "deterioration-in-progress state", or not (a state of the catalytic converter 3 which is not in the deterioration-in-progress state will hereinafter be referred to as "non-deteriorated state"). The deterioration-in-progress state is indicated by the deterioration indicator 29.

As indicated by the broken line in FIG. 8, a threshold CATAGELMT is preset with respect to the deterioration evaluating parameter $LS\sigma^2$. If the deterioration evaluating parameter $LS\sigma^2$ is equal to or greater than the threshold CATAGELMT, then the catalytic converter 3 is judged as being in the deterioration-in-progress state. If the deterioration evaluating parameter $LS\sigma^2$ is smaller than the threshold CATAGELMT, then the catalytic converter 3 is judged as being in the non-deteriorated state.

In the above description of the algorithm of the deteriorated state evaluating means 13b, it has been described that the target value VO2/TARGET for the output VO2/OUT of the $O_2$ sensor 6 is constant. In the present embodiment, the target value VO2/TARGET is sequentially variably determined depending on the operating state, specifically, the rotational speed NE and the intake pressure PB, of the internal combustion engine 1. Since the output of the $O_2$ sensor 6 is non linear (see FIG. 2), the variation of the value of the deterioration evaluating linear function σ with respect to "0" while the control process is being carried out to converge the output of the $O_2$ sensor 6 to the target value VO2/TARGET is affected by not only the deteriorated state of the catalytic converter 3, but also the target value VO2/TARGET. For example, the sensitivity of the output of the $O_2$ sensor 6 is higher when the target value VO2/TARGET is VO2/TARGET=VO2/OUT1 than when the target value VO2/TARGET is VO2/TARGET=VO2/OUT2, and hence the output of the $O_2$ sensor 6 is likely to vary more with respect to the target value VO2/TARGET when the target value VO2/TARGET is VO2/TARGET=VO2/OUT1. As a result, even if the deteriorated state of the catalytic converter 3 remains the same, the value of the deterioration evaluating linear function σ tends to vary to a greater extent when the target value VO2/TARGET is VO2/TARGET=VO2/OUT1 than when the target value VO2/TARGET is VO2/TARGET=VO2/OUT2, resulting in a greater value of the deterioration evaluating parameter $LS\sigma^2$.

According to the present embodiment, the deteriorated state evaluating means 13b calculates an average value VO2/OUTAVE of the output VO2/OUT of the $O_2$ sensor 6 while sequentially updating same, concurrent with calculating the deterioration evaluating parameter $LS\sigma_2$ according to the equation (29). For determining the deteriorated state of the catalytic converter 3, the deteriorated state evaluating means 13b actually corrects the deterioration evaluating parameter $LS\sigma^2$ finally determined according to the equation (29) depending on the average value VO2/OUTAVE (latest value) of the output VO2/OUT of the $O_2$ sensor 6, and compares the corrected deterioration evaluating parameter with the threshold CATAGELMT to determine whether the catalytic converter 3 is in the deterioration-in-progress state or the non-deteriorated state. In the description that follows, the deterioration evaluating parameter $LS\sigma^2$ before it is corrected will be referred to as "basic deterioration evaluating parameter $LS\sigma^2$", and the deterioration evaluating parameter after it is corrected will be referred to as "corrected deterioration evaluating parameter $CLS\sigma^2$".

Figure 9:
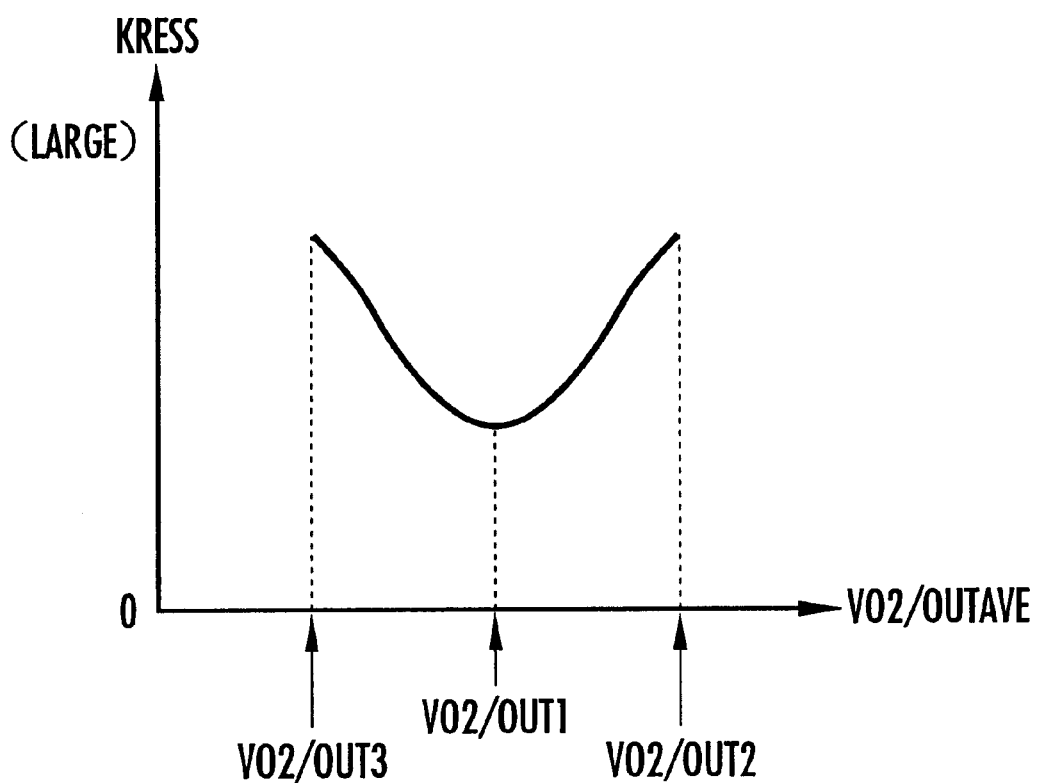
FIG. 9 is a diagram illustrative of the process of evaluating the deteriorated state of the catalytic converter employed by the apparatus shown in FIG. 1.

For example, the deterioration evaluating parameter $LS\sigma^2$ is corrected as follows: The deteriorated state evaluating means 13b determines a corrective coefficient KRESS (>0) for correcting the basic deterioration evaluating parameter $LS\sigma^2$ based on a predetermined data table shown in FIG. 9, and multiplies the basic deterioration evaluating parameter $LS\sigma^2$ by the determined corrective coefficient KRESS, thereby determining a corrected deterioration evaluating parameter $CLS\sigma^2$. The data table shown in FIG. 9 is established such that the corrective coefficient KRESS is of a minimum value when the average value VO2/OUTAVE of the output VO2/OUT of the $O_2$ sensor 6 is a value maximizing the sensitivity of the output VO2/OUT of the $O_2$ sensor 6, i.e., the level VO2/OUT1 shown in FIG. 2 (which is equivalent to the average value of the target value VO2/TARGET being in the vicinity of the level VO2/OUT1), and is progressively greater as the difference |VO2/OUTAVE−VO2OUT1| between the average value VO2/OUTAVE and the level VO2/OUT1 is greater.

The corrected deterioration evaluating parameter $CLS\sigma^2$ which is produced by multiplying the basic deterioration evaluating parameter $LS\sigma^2$ by the corrective coefficient KRESS basically varies depending on only the deteriorated state of the catalytic converter 3, rather than the target value VO2/TARGET for the output VO2/OUT of the $O^2$ sensor 6.

The algorithm described above is a basic algorithm for evaluating the deteriorated state of the catalytic converter 3 with the deteriorated state evaluating means 13b. The deteriorated state evaluating means 13b also performs an additional process of recognizing how the exhaust gas volume changes upon evaluating the deteriorated state of the catalytic converter 3. Such an additional process of recognizing how the exhaust gas volume changes will be described later on.

The general feedback controller 15 of the engine-side control unit 7b, particularly, the adaptive controller 18, will further be described below.

In FIG. 1, the general feedback controller 15 effects a feedback control process to converge the output KACT (the detected value of the air-fuel ratio) from the LAF sensor 5 toward the target air-fuel ratio KCMD as described above. If such a feedback control process were carried out under the known PID control only, it would be difficult to keep stable controllability against dynamic behavioral changes including changes in the operating state of the internal combustion engine 1, characteristic changes due to aging of the internal combustion engine 1, etc.

Figure 10:
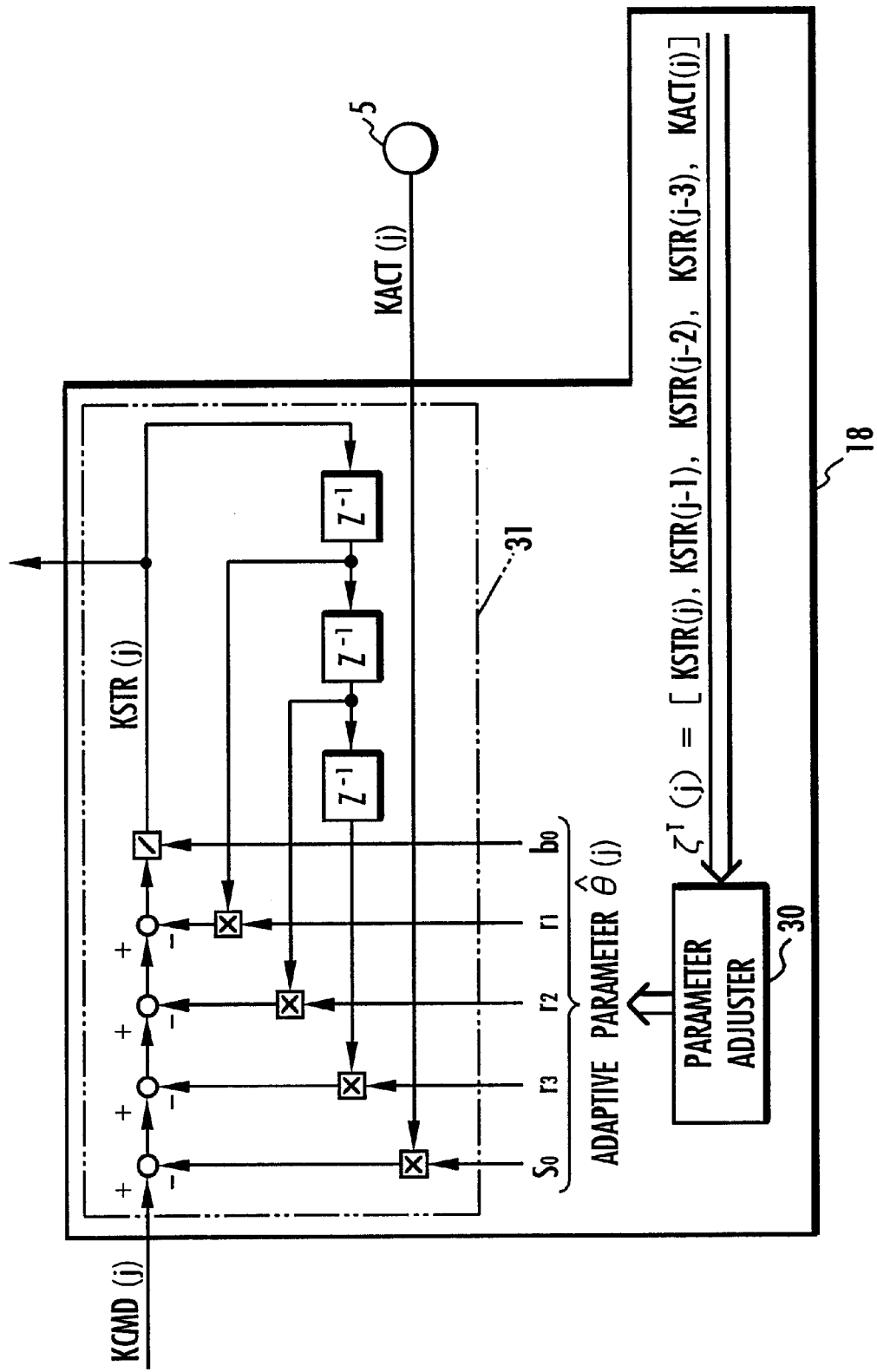
FIG. 10 is a block diagram of an adaptive controller employed in the apparatus shown in FIG. 1.

The adaptive controller 18 is a recursive-type controller which makes it possible to carry out a feedback control process while compensating for dynamic behavioral changes of the internal combustion engine 1. As shown in FIG. 10, the adaptive controller 18 comprises a parameter adjuster 30 for establishing a plurality of adaptive parameters using the parameter adjusting law proposed by I. D. Landau, et al., and a manipulated variable calculator 31 for calculating the feedback manipulated variable KSTR using the established adaptive parameters.

The parameter adjuster 30 will be described below. According to the parameter adjusting law proposed by I. D. Landau, et al., when polynomials of the denominator and the numerator of a transfer function $B(Z^{-1})/A(Z^{-1})$ of a discrete-system object to be controlled are generally expressed respectively by equations (31), (32), given below, an adaptive parameter θ hat (j) (j indicates the ordinal number of a control cycle) established by the parameter adjuster 30 is represented by a vector (transposed vector) according to the equation (33) given below. An input ζ(j) to the parameter adjuster 30 is expressed by the equation (34) given below. In the present embodiment, it is assumed that the internal combustion engine 1, which is an object to be controlled by the general feedback controller 15, is considered to be a plant of a first-order system having a dead time dp corresponding to the time of three combustion cycles of the internal combustion engine 1, and m=n=1, dp=3 in the equations (31)–(34), and five adaptive parameters s0, r1, r2, r3, b0 are established (see FIG. 10). In the upper and middle expressions of the equation (34), us, ys generally represent an input (manipulated variable) to the object to be controlled and an output (controlled variable) from the object to be controlled. In the present embodiment, the input is the feedback manipulated variable KSTR and the output from the object (the internal combustion engine 1) is the output KACT (detected air-fuel ratio) from the LAF sensor 4, and the input $\zeta(j)$ to the parameter adjuster 30 is expressed by the lower expression of the equation (34) (see FIG. 10).

$$A(Z^{-1})=1+a1Z^{-1}+\ldots+anZ^{-n} \quad (31)$$

$$B(Z^{-1})=b0+b1Z^{-1}+\ldots+bmZ^{-m} \quad (32)$$

$$\hat{\theta}^T(j) = [\hat{b}0(j), \hat{B}R(Z^{-1}, j)\hat{S}(Z^{-1}, j)] \quad (33)$$
$$= [b0(j), r1(j), \cdots, rm+dp-1(j), s0(j), \cdots, sn-1(j)]$$
$$= [b0(j), r1(j), r2(j), r3(j), s0(j)]$$

$$\zeta^T(j) = [us(j), \cdots, us(j-m-dp+1), ys(j), \cdots, \quad (34)$$
$$ys(j-n+1)]$$
$$= [us(j), us(j-1), us(j-2), us(j-3), ys(j)]$$
$$= [KSTR(j), KSTR(j-1), KSTR(j-2),$$
$$KSTR(j-3), KACT(j)]$$

The adaptive parameter θ hat expressed by the equation (33) is made up of a scalar quantity element b0 hat (j) for determining the gain of the adaptive controller 18, a control element BR hat $(Z^{-1},j)$ expressed using a manipulated variable, and a control element S $(Z^{-1},j)$ expressed using a controlled variable, which are expressed respectively by the following equations (35)~(37) (see the block of the manipulated variable calculator 31 shown in FIG. 10):

$$\hat{b}0^{-1}(j) = \frac{1}{b0} \quad (35)$$

$$\hat{B}R(Z^{-1}, j) = r1Z^{-1} + r2Z^{-2} + \ldots + rm+dp-1Z^{-(n+dp-1)} \quad (36)$$
$$= r1Z^{-1} + r2Z^{-2} + r3Z^{-3}$$

$$\hat{S}(Z^{-1}, j) = s0 + s1Z^{-1} + \ldots + sn-1Z^{-(n-1)} \quad (37)$$
$$= s0$$

The parameter adjuster 30 establishes coefficients of the scalar quantity element and the control elements, described above, and supplies them as the adaptive parameter θ hat expressed by the equation (33) to the manipulated variable calculator 31. The parameter adjuster 30 calculates the adaptive parameter θ hat so that the output KACT from the LAF sensor 5 will agree with the target air-fuel ratio KCMD, using time-series data of the feedback manipulated variable KSTR from the present to the past and the output KACT from the LAF sensor 5.

Specifically, the parameter adjuster 30 calculates the adaptive parameter θ hat according to the following equation (38):

$$\hat{\theta}(j)=\hat{\theta}(j-1)+\Gamma(j-1)\cdot\zeta(j-dp)\cdot e^*(j) \quad (38)$$

where Γ(j) represents a gain matrix (whose degree is indicated by m+n+dp) for determining a rate of establishing the adaptive parameter θ hat, and e*(j) an estimated error of the adaptive parameter θ hat. Γ(j) and e*(j) are expressed respectively by the following recursive formulas (39), (40):

$$\Gamma(j) = \quad (39)$$
$$\frac{1}{\lambda1(j)}\cdot\left[\Gamma(j-1) - \frac{\lambda2(j)\cdot\Gamma(j-1)\cdot\zeta(j-dp)\cdot\zeta^T(j-dp)\cdot\Gamma(j-1)}{\lambda1(j)+\lambda2(j)\cdot\zeta^T(j-dp)\cdot\Gamma(j-1)\cdot\zeta(j-dp)}\right]$$

where $0<\lambda1(j)\leq1$, $0\leq\lambda2(j)<2$, $\Gamma(0)>0$.

$$e*(j) = \frac{D(Z^{-1})\cdot KACT(j) - \hat{\theta}^T(j-1)\cdot\zeta(j-dp)}{1+\zeta^T(j-dp)\cdot\Gamma(j-1)\cdot\zeta(j-dp)} \quad (40)$$

where $D(Z^{-1})$ represents an asymptotically stable polynomial for adjusting the convergence. In the present embodiment, $D(Z^{-1})=1$.

Various specific algorithms including the degressive gain algorithm, the variable gain algorithm, the fixed tracing algorithm, and the fixed gain algorithm are obtained depending on how $\lambda1(j)$, $\lambda2(j)$ in the equation (39) are selected. For a time-dependent plant such as a fuel injection process, an air-fuel ratio, or the like of the internal combustion engine 1, either one of the degressive gain algorithm, the variable gain algorithm, the fixed gain algorithm, and the fixed tracing algorithm is suitable.

Using the adaptive parameter θ hat (s0, r1, r2, r3, b0) established by the parameter adjuster 30 and the target air-fuel ratio KCMD determined by the deteriorated state evaluating means 13b of the exhaust-side main processor 13, the manipulated variable calculator 31 determines the feedback manipulated variable KSTR according to a recursive formula expressed by the following equation (41):

$$KSTR(j) = \frac{1}{b0}\cdot[KCMD(j) - s0\cdot KACT(j) - \quad (41)$$
$$r1\cdot KSTR(j-1) - r2\cdot KSTR(j-2) - r3\cdot KSTR(j-3)]$$

The manipulated variable calculator 31 shown in FIG. 10 represents a block diagram of the calculations according to the equation (41).

The feedback manipulated variable KSTR determined according to the equation (41) becomes the target air-fuel ratio KCMD insofar as the output KACT of the LAF sensor 4 agrees with the target air-fuel ratio KCMD. Therefore, the feedback manipulated variable KSTR is divided by the target air-fuel ratio KCMD by the divider 19 for thereby determining the feedback manipulated variable kstr that can be used as the feedback correction coefficient KFB.

As is apparent from the foregoing description, the adaptive controller 18 thus constructed is a recursive-type controller taking into account dynamic behavioral changes of the engine 1 which is an object to be controlled. Stated otherwise, the adaptive controller 18 is a controller described in a recursive form to compensate for dynamic behavioral changes of the engine 1, and more particularly a controller having a recursive-type adaptive parameter adjusting mechanism.

A recursive-type controller of this type may be constructed using an optimum regulator. In such a case, however, it generally has no parameter adjusting mechanism. The adaptive controller 18 constructed as described above is suitable for compensating for dynamic behavioral changes of the internal combustion engine 1.

The details of the adaptive controller 18 have been described above.

The PID controller 17, which is provided together with the adaptive controller 18 in the general feedback controller 15, calculates a proportional term (P term), an integral term (I term), and a derivative term (D term) from the difference between the output KACT of the LAF sensor 5 and the target air-fuel ratio KCMD, and calculates the total of those terms as the feedback manipulated variable KLAF, as is the case with the general PID control process. In the present embodiment, the feedback manipulated variable KLAF is set to "1" when the output KACT of the LAF sensor 5 agrees with the target air-fuel ratio KCMD by setting an initial value of the integral term (I term) to "1", so that the feedback manipulated variable KLAF can be used as the feedback correction coefficient KFB for directly correcting the fuel injection quantity. The gains of the proportional term, the integral term, and the derivative term are determined from the rotational speed and intake pressure of the internal combustion engine 1 using a predetermined map.

The switcher 20 of the general feedback controller 15 outputs the feedback manipulated variable KLAF determined by the PID controller 17 as the feedback correction coefficient KFB for correcting the fuel injection quantity if the combustion in the internal combustion engine 1 tends to be unstable as when the temperature of the coolant of the internal combustion engine 1 is low, the internal combustion engine 1 rotates at high speeds, or the intake pressure is low, or if the output KACT of the LAF sensor 5 is not reliable due to a response delay of the LAF sensor 5 as when the target air-fuel ratio KCMD changes largely or immediately after the air-fuel ratio feedback control process has started, or if the internal combustion engine 1 operates highly stably as when it is idling and hence no high-gain control process by the adaptive controller 18 is required. Otherwise, the switcher 20 outputs the feedback manipulated variable kstr which is produced by dividing the feedback manipulated variable KSTR determined by the adaptive controller 18 by the target air-fuel ration KCMD, as the feedback correction coefficient KFB for correcting the fuel injection quantity. This is because the adaptive controller 18 effects a high-gain control process and functions to converge the output KACT of the LAF sensor 5 quickly toward the target air-fuel ratio KCMD, and if the feedback manipulated variable KSTR determined by the adaptive controller 18 is used when the combustion in the internal combustion engine 1 is unstable or the output KACT of the LAF sensor 5 is not reliable, then the air-fuel ratio control process tends to be unstable.

Such operation of the switcher 20 is disclosed in detail in Japanese laid-open patent publication No. 8-105345 or U.S. Pat. No. 5,558,075, and will not be described in detail below.

Operation of the apparatus according to the present embodiment will be described below.

Figure 11:
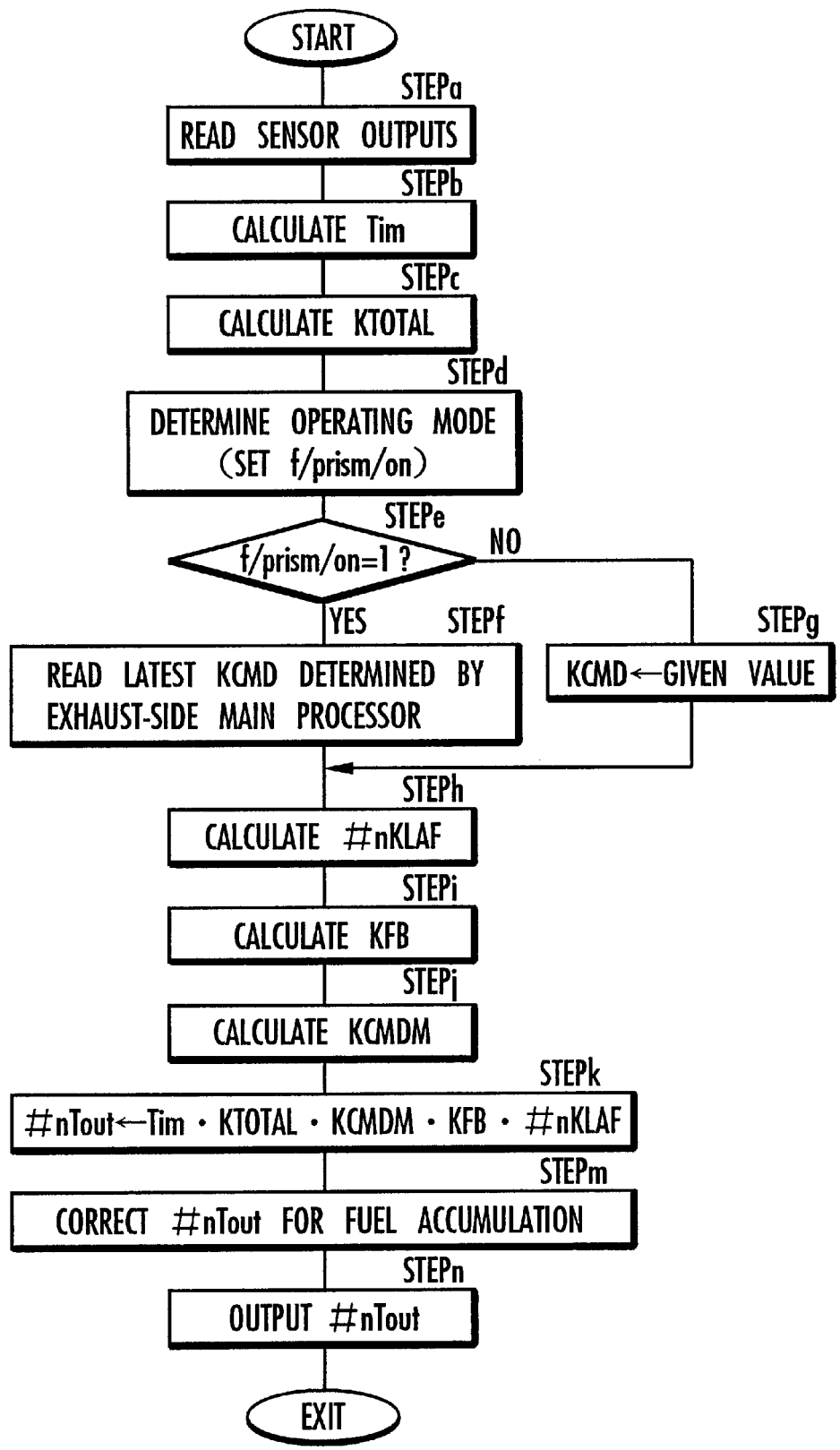
FIG. 11 is a flowchart of a main routine of an engine-side control unit of the apparatus shown in FIG. 1.

First, a process, carried out by the engine-side control unit 7b, of calculating an output fuel injection quantity #nTout (n=1, 2, 3, 4) for each of the cylinders of the internal combustion engine 1 for controlling the air-fuel ratio of the internal combustion engine 1 will be described below with reference to FIG. 11. The engine-side control unit 7b calculates an output fuel injection quantity #nTout (n=1, 2, 3, 4) for each of the cylinders in synchronism with a crankshaft angle period (TDC) of the internal combustion engine 1 as follows:

In FIG. 11, the engine-side control unit 7b reads outputs from various sensors including the LAF sensor 5 and the $O_2$ sensor 6 in STEPa. At this time, the output KACT of the LAF sensor 5 and the output VO2/OUT of the $O_2$ sensor 6, including data obtained in the past, are stored in a time-series fashion in a memory (not shown).

Then, the basic fuel injection quantity calculator 8 corrects a fuel injection quantity corresponding to the rotational speed NE and intake pressure PB of the internal combustion engine 1 depending on the effective opening area of the throttle valve, thereby calculating a basic fuel injection quantity Tim in STEPb. The first correction coefficient calculator 9 calculates a first correction coefficient KTOTAL depending on the coolant temperature and the amount by which the canister is purged in STEPc.

The engine-side control unit 7b decides whether the operation mode of the internal combustion engine 1 is an operation mode (hereinafter referred to as "normal operation mode") in which the fuel injection quantity is adjusted using the target air-fuel ratio KCMD generated by the target air-fuel ratio calculating means 13b, and sets a value of a flag f/prism/on in STEPd. When the value of the flag f/prism/on is "1", it means that the operation mode of the internal combustion engine 1 is the normal operation mode, and when the value of the flag f/prism/on is "0", it means that the operation mode of the internal combustion engine 1 is not the normal operation mode.

Figure 12:
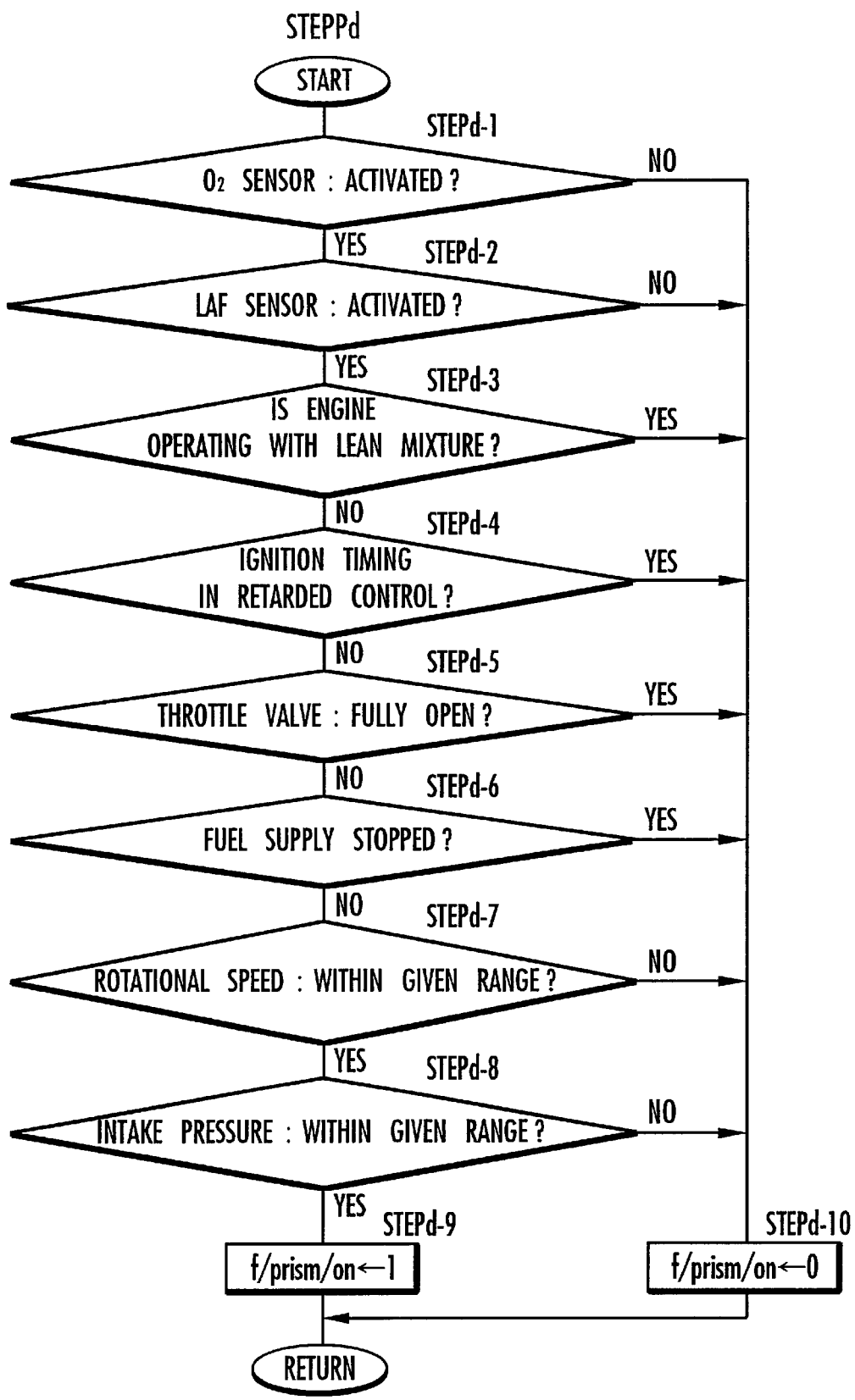
FIG. 12 is a flowchart of a subroutine of the main routine shown in FIG. 11.

The deciding subroutine of STEPd is shown in detail in FIG. 12. As shown in FIG. 12, the engine-side control unit 7b decides whether the $O_2$ sensor 6 and the LAF sensor 5 are activated or not respectively in STEPd-1, STEPd-2. If neither one of the $O_2$ sensor 6 and the LAF sensor 5 is activated, since detected data from the $O_2$ sensor 6 and the LAF sensor 5 for use by the exhaust-side main processor 13 are not accurate enough, the operation mode of the internal combustion engine 1 is not the normal operation mode, and the value of the flag f/prism/on is set to "0" in STEPd-10.

Then, the engine-side control unit 7b decides whether the internal combustion engine 1 is operating with a lean air-fuel mixture or not in STEPd-3. The engine-side control unit 7b decides whether the ignition timing of the internal combustion engine 1 is retarded for early activation of the catalytic converter 3 immediately after the start of the internal combustion engine 1 or not in STEPd-4. The engine-side control unit 7b decides whether the throttle valve of the internal combustion engine 1 is substantially fully open or not in STEPd-5. The engine-side control unit 7b decides whether the supply of fuel to the internal combustion engine 1 is being stopped or not in STEPd-6. If either one of the conditions of these steps is satisfied, then since it is not preferable or not possible to control the supply of fuel to the internal combustion engine 1 using the target air-fuel ratio KCMD generated by the exhaust-side main processor 13, the operation mode of the internal combustion engine 1 is not the normal operation mode, and the value of the flag f/prism/on is set to "0" in STEPd-10.

The engine-side control unit 7b then decides whether the rotational speed NE and the intake pressure PB of the internal combustion engine 1 fall within respective given ranges or not respectively in STEPd-7, STEPd-8. If either one of the rotational speed NE and the intake pressure PB does not fall within its given range, then since it is not preferable to control the supply of fuel to the internal combustion engine 1 using the target air-fuel ratio KCMD generated by the exhaust-side main processor 13, the operation mode of the internal combustion engine 1 is not the normal operation mode, and the value of the flag f/prism/on is set to "0" in STEPd-10.

If the conditions of STEPd-1, STEPd-2, STEPd-7, STEPd-8 are satisfied, and the conditions of STEPd-3, STEPd-4, STEPd-5, STEPd-6 are not satisfied (at this time, the internal combustion engine 1 is in the normal operation mode), then the operation mode of the internal combustion engine 1 is judged as the normal operation mode, and the value of the flag f/prism/on is set to "1" in STEPd-9.

In FIG. 11, after the value of the flag f/prism/on has been set, the engine-side control unit 7b determines the value of the flag f/prism/on in STEPe. If f/prism/on=1, then the engine-side control unit 7b reads the target air-fuel ratio KCMD generated by the exhaust-side main processor 13 in STEPf. If f/prism/on=0, then the engine-side control unit 7b sets the target air-fuel ratio KCMD to a predetermined value in STEPg. The predetermined value to be established as the target air-fuel ratio KCMD is determined from the rotational speed NE and intake pressure PB of the internal combustion engine 1 using a predetermined map, for example.

In the local feedback controller 16, the PID controllers 22 calculates respective feedback correction coefficients #nKLAF in order to eliminate variations between the cylinders, based on actual air-fuel ratios #nA/F (n=1, 2, 3, 4) of the respective cylinders which have been estimated from the output KACT of the LAF sensor 5 by the observer 21, in STEPh. Then, the general feedback controller 15 calculates a feedback correction coefficient KFB in STEPi.

Depending on the operating state of the internal combustion engine 1, the switcher 20 selects either the feedback manipulated variable KLAF determined by the PID controller 17 or the feedback manipulated variable kstr which has been produced by dividing the feedback manipulated variable KSTR determined by the adaptive controller 18 by the target air-fuel ratio KCMD (normally, the switcher 20 selects the feedback manipulated variable kstr). The switcher 20 then outputs the selected feedback manipulated variable KLAF or kstr as a feedback correction coefficient KFB.

When switching the feedback correction coefficient KFB from the feedback manipulated variable KLAF from the PID controller 17 to the feedback manipulated variable kstr from the adaptive controller 18, the adaptive controller 18 determines a feedback manipulated variable KSTR in a manner to hold the correction coefficient KFB to the preceding correction coefficient KFB (=KLAF) as long as in the cycle time for the switching. When switching the feedback correction coefficient KFB from the feedback manipulated variable kstr from the adaptive controller 18 to the feedback manipulated variable KLAF from the PID controller 17, the PID controller 17 calculates a present correction coefficient KLAF in a manner to regard the feedback manipulated variable KLAF determined by itself in the preceding cycle time as the preceding correction coefficient KFB (=kstr).

After the feedback correction coefficient KFB has been calculated, the second correction coefficient calculator 10 calculates in STEPj a second correction coefficient KCMDM depending on the target air-fuel ratio KCMD determined in STEPf or STEPg.

Then, the engine-side control unit 7b multiplies the basic fuel injection quantity Tim determined as described above, by the first correction coefficient KTOTAL, the second correction coefficient KCMDM, the feedback correction coefficient KFB, and the feedback correction coefficients #nKLAF of the respective cylinders, determining output fuel injection quantities #nTout of the respective cylinders in STEPk. The output fuel injection quantities #nTout are then corrected for accumulated fuel particles on intake pipe walls of the internal combustion engine 1 by the fuel accumulation corrector 23 in STEPm. The corrected output fuel injection quantities #nTout are applied to the non-illustrated fuel injectors of the internal combustion engine 1 in STEPn.

In the internal combustion engine 1, the fuel injectors inject fuel into the respective cylinders according to the respective output fuel injection quantities #nTout.

The above calculation of the output fuel injection quantities #nTout and the fuel injection of the internal combustion engine 1 are carried out in successive cycle times synchronous with the crankshaft angle period of the internal combustion engine 1 for controlling the air-fuel ratio of the internal combustion engine 1 in order to converge the output KACT of the LAF sensor 5 (the detected air-fuel ratio) toward the target air-fuel ratio KCMD. While the feedback manipulated variable kstr from the adaptive controller 18 is being used as the feedback correction coefficient KFB, the output KACT of the LAF sensor 5 is quickly converged toward the target air-fuel ratio KCMD with high stability against behavioral changes such as changes in the operating state of the internal combustion engine 1 or characteristic changes thereof. A response delay of the internal combustion engine 1 is also appropriately compensated for.

Figure 13:
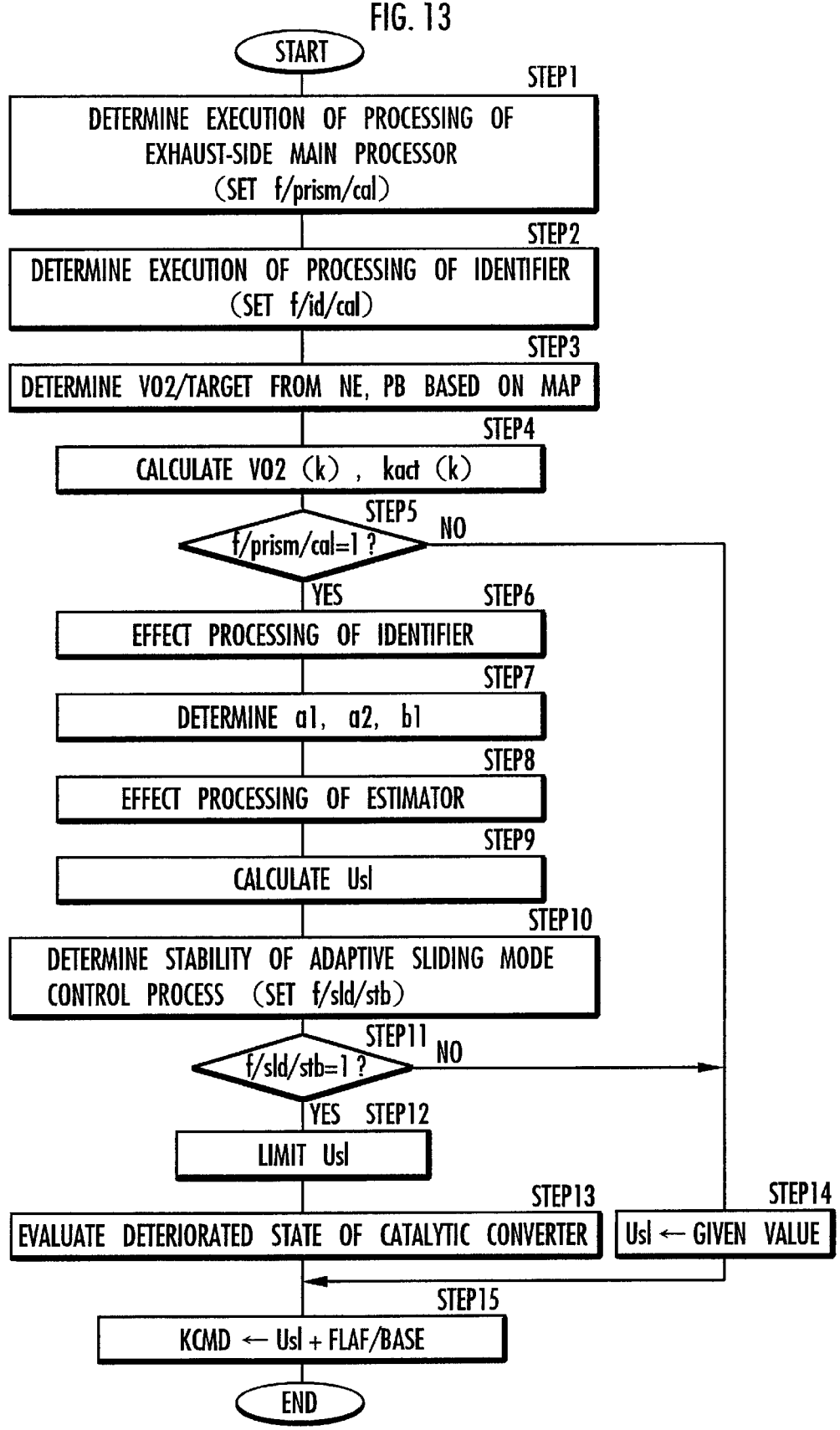
FIG. 13 is a flowchart of a main routine of an exhaust-side control unit of the apparatus shown in FIG. 1.

Concurrent with the above fuel control for the internal combustion engine 1, the exhaust-side control unit 7a executes a main routine shown in FIG. 13 in control cycles of a constant period.

As shown in FIG. 13, the exhaust-side control unit 7a decides whether the processing of the exhaust-side main processor 13 is to be executed or not, and sets a value of a flag f/prim/cal indicative of whether the processing is to be executed or not in STEP1. When the value of the flag f/prim/cal is "0", it means that the processing of the exhaust-side main processor 13 is not to be executed, and when the value of the flag f/prim/cal is "1", it means that the processing of the exhaust-side main processor 13 is to be executed.

Figure 14:
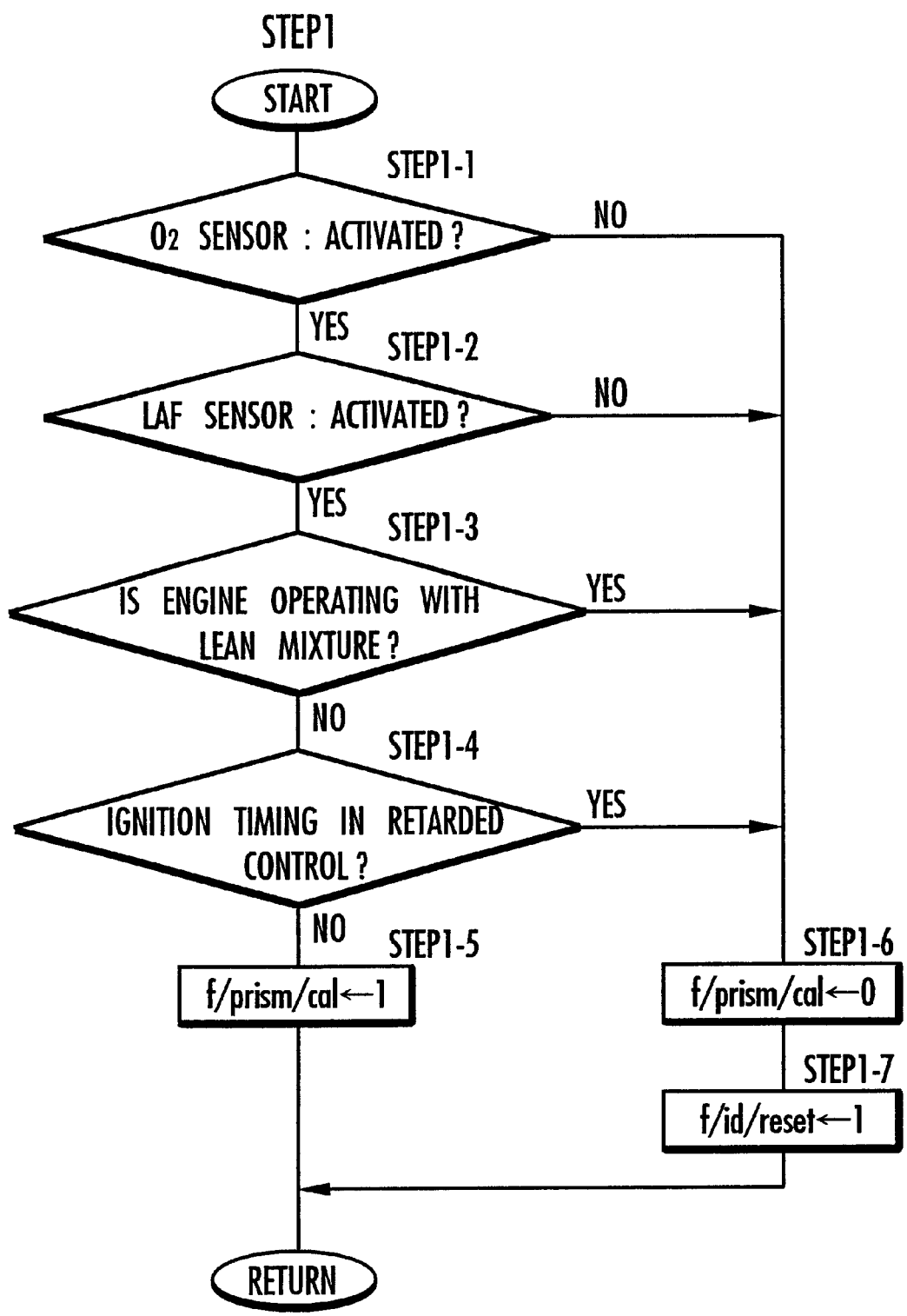
FIG. 14 is a flowchart of a subroutine of the main routine shown in FIG. 13.

The deciding subroutine in STEP1 is shown in detail in FIG. 14. As shown in FIG. 14, the exhaust-side control unit 7a decides whether the $O_2$ sensor 6 and the LAF sensor 5 are activated or not respectively in STEP1-1, STEP1-2. If neither one of the $O_2$ sensor 6 and the LAF sensor 5 is activated, since detected data from the $O_2$ sensor 6 and the LAF sensor 5 for use by the exhaust-side main processor 13 are not accurate enough, the value of the flag f/prism/cal is set to "0" in STEP1-6. Then, in order to initialize the identifier 25 as described later on, the value of a flag f/id/reset indicative of whether the identifier 25 is to be initialized or not is set to "1" in STEP1-7. When the value of the flag f/id/reset is "1", it means that the identifier 25 is to be initialized, and when the value of the flag f/id/reset is "0", it means that the identifier 25 is not to be initialized.

The exhaust-side control unit 7a decides whether the internal combustion engine 1 is operating with a lean air-fuel mixture or not in STEP1-3. The exhaust-side control unit 7a decides whether the ignition timing of the internal combustion engine 1 is retarded for early activation of the catalytic converter 3 immediately after the start of the internal combustion engine 1 or not in STEP1-4. If the conditions of these steps are satisfied, then since the target air-fuel ratio KCMD calculated to adjust the output VO2/OUT of the $O_2$ sensor 6 to the target value VO2/TARGET is not used for the fuel control for the internal combustion engine 1, the value of the flag f/id/cal is set to "0" in STEP1-6, and the value of the flag f/id/reset is set to "1"in order to initialize the identifier 25 in STEP1-7.

In FIG. 13, after the above deciding subroutine, the exhaust-side control unit 7a decides whether a process of identifying (updating) the gain coefficients a1, a1, b1 with the identifier 25 is to be executed or not, and sets a value of a flag f/id/cal indicative of whether the process of identifying (updating) the gain coefficients a1, a1, b1 is to be executed or not in STEP2. When the value of the flag f/id/cal is "0", it means that the process of identifying (updating) the gain coefficients a1, a1, b1 is not to be executed, and when the value of the flag f/id/cal is "1", it means that the process of identifying (updating) the gain coefficients a1, a1, b1 is to be executed.

In the deciding process of STEP2, the exhaust-side control unit 7a decides whether the throttle valve of the internal combustion engine 1 is substantially fully open or not, and also decides whether the supply of fuel to the internal combustion engine 1 is being stopped or not. If either one of these conditions is satisfied, then since it is difficult to adjust the gain coefficients a1, a1, b1 appropriately, the value of the flag f/id/cal is set to "0". If neither one of these conditions is satisfied, then the value of the flag f/id/cal is set to "1" to identify (update) the gain coefficients a1, a1, b1 with the identifier 25.

The exhaust-side control unit 7a determines a present value of the target value VO2/TARGET for the output VO2/OUT of the $O_2$ sensor 6 from the present rotational speed NE and intake pressure PB of the internal combustion engine 1 according to a predetermined map in STEP3. Thereafter, the exhaust-side control unit 7a calculates the latest differential outputs kact(k) (=KACT−FLAF/BASE), VO2(k) (=VO2/OUT−VO2/TARGET) respectively with the subtractors 11, 12 in STEP4. Specifically, the subtractors 11, 12 select latest ones of the time-series data read and stored in the non-illustrated memory in STEPa shown in FIG. 11, and calculate the differential outputs kact(k), VO2(k). For calculating the differential output VO2(k), the exhaust-side control unit 7a uses the target value VO2/TARGET determined in STEP3 in the present control cycle. The differential outputs kact(k), VO2(k), as well as data given in the past, are stored in a time-series manner in a memory (not shown) in the exhaust-side control unit 7a.

Then, in STEP5, the exhaust-side control unit 7a determines the value of the flag f/prism/cal set in STEP1. If the value of the flag f/prism/cal is "0", i.e., if the processing of the exhaust-side main processor 13 is not to be executed, then the exhaust-side control unit 7a forcibly sets the SLD manipulating input Usl (the target differential air-fuel ratio kcmd) to be determined by the sliding mode controller 27, to a predetermined value in STEP14. The predetermined value may be a fixed value (e.g., "0") or the value of the SLD manipulating input Usl determined in a preceding control cycle.

After the SLD manipulating input Usl is set to the predetermined value in STEP12, the exhaust-side control unit 7a adds the reference value FLAF/BASE to the SLD manipulating input Usl for thereby determining a target air-fuel ratio KCMD in the present control cycle in STEP 15. Then, the processing in the present control cycle is finished.

If the value of the flag f/prism/cal is "1" in STEP5, i.e., if the processing of the exhaust-side main processor 13 is to be executed, then the exhaust-side control unit 7a effects the processing of the identifier 25 in STEP6.

Figure 15:
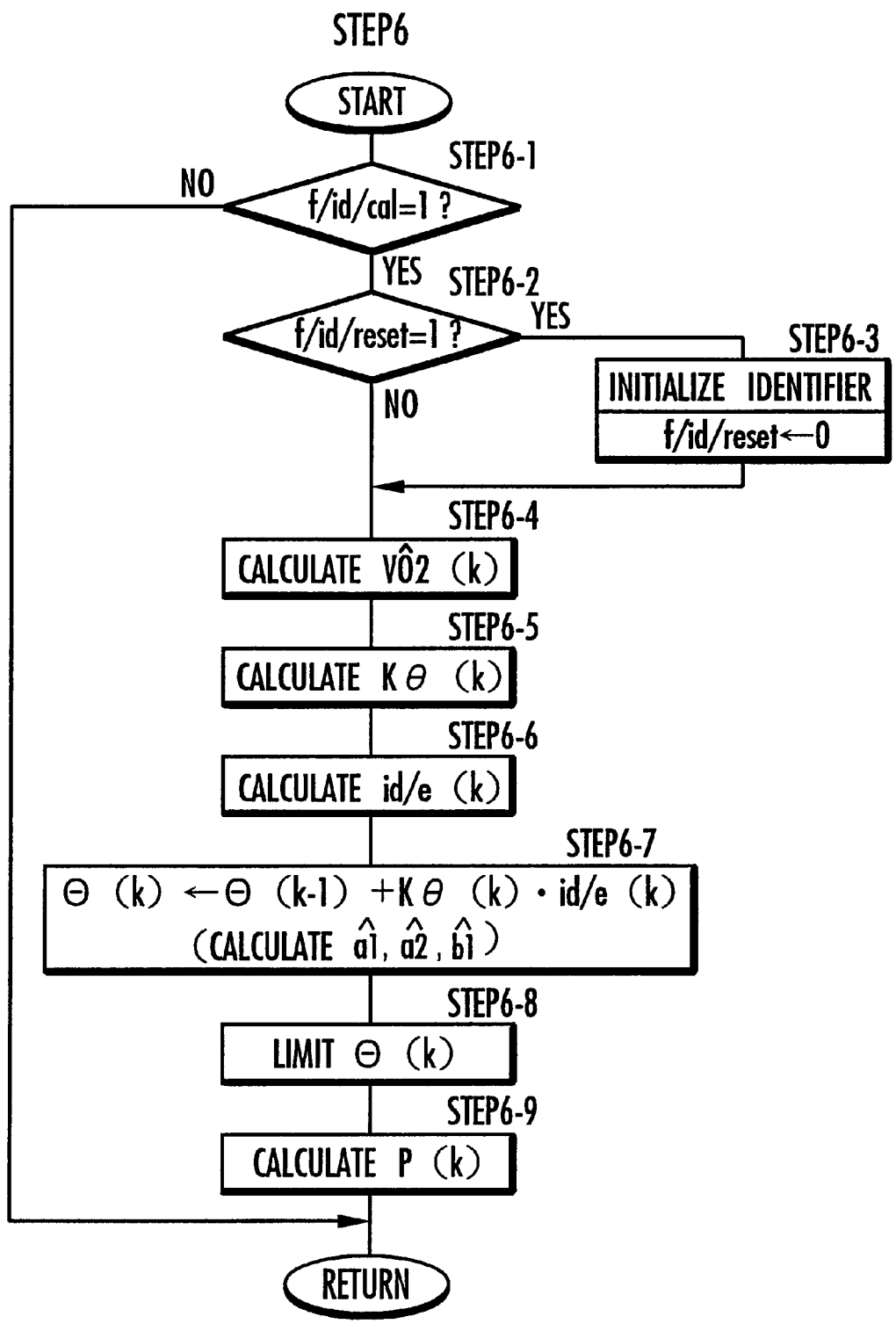
FIG. 15 is a flowchart of a subroutine of the main routine shown in FIG. 13.

The processing subroutine of STEP6 is shown in detail in FIG. 15.

The identifier 25 determines the value of the flag f/id/cal set in STEP2 in STEP6-1. If the value of the flag f/id/cal is "0", then since the process of identifying the gain coefficients a1, a1, b1 with the identifier 25 is not carried out, control immediately goes back to the main routine shown in FIG. 13.

If the value of the flag f/id/cal is "1", then the identifier 25 determines the value of the flag f/id/reset set in STEP1 with respect to the initialization of the identifier 25 in STEP6-2. If the value of the flag f/id/reset is "1", the identifier 25 is initialized in STEP6-3. When the identifier 25 is initialized, the identified gain coefficients a1 hat, a2 hat, b1 hat are set to predetermined initial values (the identified gain coefficient vector Θ according to the equation (4) is initialized), and the elements of the matrix P (diagonal matrix) according to the equation (9) are set to predetermined initial values. The value of the flag f/id/reset is reset to "0".

Then, the identifier 25 calculates the identified differential output VO2(k) hat using the present identified gain coefficients a1(k−1) hat, a2(k−1) hat, b1(k−1) hat and the past data VO2(k−1), VO2(k−2), kact(k−d−1) of the differential outputs VO2, kact calculated in each control cycle in STEP3, according to the equation (3) in STEP6-4.

The identifier 25 then calculates the vector Kθ(k) to be used in determining the new identified gain coefficients a1 hat, a2 hat, b1 hat according to the equation (9) in STEP6-5. Thereafter, the identifier 25 calculates the identified error id/e(k), i.e., the difference between the identified differential output VO2 hat and the actual differential output VO2 (see the equation (7)), in STEP6-6.

The identified error id/e obtained in STEP6-6 may basically be calculated according to the equation (7). In the present embodiment, however, a value (=VO2(k)−VO2(k) hat) calculated according to the equation (7) from the differential output VO2 acquired in each control cycle in STEP4 (see FIG. 13), and the identified differential output VO2 hat calculated in each control cycle in STEP6-4 is filtered with low-pass characteristics to calculate the identified error id/e(k).

This is because since the object exhaust system E including the catalytic converter 3 generally has low-pass characteristics, it is preferable to attach importance to the low-frequency behavior of the object exhaust system E in appropriately identifying the gain coefficients a1, a2, b1 of the exhaust system model.

Both the differential output VO2 and the identified differential output VO2 hat may be filtered with the same low-pass characteristics. For example, after the differential output VO2 and the identified differential output VO2 hat have separately been filtered, the equation (7) may be calculated to determine the identified error id/e(k). The above filtering is carried out by a moving average process which is a digital filtering process.

Thereafter, the identifier 25 calculates a new identified gain coefficient vector Θ(k), i.e., new identified gain coefficients a1(k) hat, a2(k) hat, b1(k) hat, according to the equation (8) using the identified error id/e(k) determined in STEP6-6 and Kθ calculated in SETP5-5 in STEP6-7.

After having calculated the new identified gain coefficients a1(k) hat, a2(k) hat, b1(k) hat, the identifier 25 further limits the values of the gain coefficients a1 hat, a2 hat, b1 hat (elements of the identified gain coefficient vector Θ) to meet predetermined conditions in STEP6-8. Then, the identifier 25 updates the matrix P(k) according to the equation (10) for the processing of a next control cycle in STEP6-9, after which control returns to the main routine shown in FIG. 13.

The process of limiting the identified gain coefficients a1 hat, a2 hat, b1 hat in STEP6-8 comprises a process of limiting the values of the identified gain coefficients a1 hat, a2 hat, b1 hat to a certain combination, i.e., a process of limiting a point (a1 hat, a2 hat) to a given region on a coordinate plane which has the identified gain coefficients a1 hat, a2 hat as its component, and a process of limiting the value of the identified gain coefficient b1 hat within a given range. According to the former process, if a point (a1(k) hat, a2(k) hat) on the coordinate plane which is determined by the identified gain coefficients a1(k) hat, a2(k) hat calculated in STEP6-7 deviates from the given region on the coordinate plane, then the values of the identified gain coefficients a1(k) hat, a2(k) hat are forcibly limited to the values of the point in the given region. According to the latter process, if the value of the identified gain coefficient b1 hat calculated in STEP6-7 exceeds the upper or lower limit of the given range, then the value of the identified gain coefficient b1 hat is forcibly limited to the upper or lower limit of the given range.

The above process of limiting the identified gain coefficients a1 hat, a2 hat, b1 hat serves to maintain stability of the SLD manipulating input Usl (the target differential air-fuel ratio kcmd) calculated by the sliding mode controller 27, and hence the target air-fuel ratio KCMD.

Specific details of the process of limiting the identified gain coefficients a1 hat, a2 hat, b1 hat are described in Japanese laid-open patent publication No. 11-153051 and U.S. Pat. No. 6,112,517, and will not be described herein.

The preceding values a1(k−1) hat, a2(k−1) hat, b1(k−1) hat of the identified gain coefficients used to determine the new identified gain coefficients a1(k) hat, a2(k) hat, b1(k) hat in STEP6-7 are the values of the identified gain coefficients after which have been limited in STEP6-8 in the preceding control cycle.

Details of the processing of the identifier 25 in STEP6 shown in FIG. 13 have been described above.

In FIG. 13, after the processing of the identifier 25 has been carried out, the exhaust-side control unit 7a determines the values of the gain coefficients a1, a2, b1 in STEP7. Specifically, if the value of the flag f/id/cal set in STEP2 is "1", i.e., if the gain coefficients a1, a2, b1 have been identified by the identifier 25, then the gain coefficients a1, a2, b1 are set to the latest identified gain coefficients a1(k) hat, a2(k) hat, b1(k) hat determined by the identifier 25 in STEP6 (limited in STEP6-8). If the value of the flag f/id/cal is "0", i.e., if the gain coefficients a1, a2, b1 have not been identified by the identifier 25, then the gain coefficients a1, a2, b1 are set to predetermined values, respectively.

Then, the exhaust-side control unit 7a effects a processing operation of the estimator 26, i.e., calculates the estimated differential output VO2 bar, in STEP8.

The estimator 26 calculates the coefficients $\alpha 1$, $\alpha 2$, $\beta j$ (j=1, 2, . . . , d) to be used in the equation (13), using the gain coefficients a1, a2, b1 determined in STEP6 (these values are basically the identified gain coefficients a1 hat, a2 hat, b1 hat) according to the equation (12).

Then, the estimator 26 calculates the estimated differential output VO2(k+d) bar (estimated value of the differential output VO2 after the total dead time d from the time of the present control cycle) according to the equation (13), using the time-series data VO2(k), VO2(k−1), from before the present control cycle, of the differential output VO2 of the $O_2$ sensor calculated in each control cycle in STEP4, the time-series data kact(k−j) (j=0, . . . , d1), from before the present control cycle, of the differential output kact of the LAF sensor 5, the time-series data kcmd(k−j) (=Usl(k−j), j=1, . . . , d2−1), from before the preceding control cycle, of the target differential air-fuel ratio kcmd (=the SLD manipulating input Usl) given in each control cycle from the sliding mode controller 27, and the coefficients $\alpha 1$, $\alpha 2$, $\beta j$ calculated as described above.

Then, the exhaust-side control unit 7a calculates the SLD manipulating input Usl (=the target differential air-fuel ratio kcmd) with the sliding mode controller 27 in STEP9.

Specifically, the sliding mode controller 27 calculates a value $\sigma$(k+d) bar (corresponding to an estimated value, after the total dead time d, of the linear function $\sigma$ defined according to the equation (15)), after the total dead time d from the present control cycle, of the switching function $\sigma$ bar defined according to the equation (25), using the time-series data VO2(k+d) bar, VO2(k+d−1) bar of the estimated differential output VO2 bar determined by the estimator 26 in STEP8.

At this time, the sliding mode controller 27 keeps the value of the switching function $\sigma$ bar within a predetermined allowable range. If the value $\sigma$(k+d) bar determined as described above exceeds the upper or lower limit of the allowable range, then the sliding mode controller 27 forcibly limits the value $\sigma$(k+d) bar to the upper or lower limit of the allowable range. This is because if the value of the switching function $\sigma$ bar were excessive, the reaching control law input Urch would be excessive, and the adaptive control law Uadp would change abruptly, tending to impair the stability of the process of converging the output VO2/OUT of the $O_2$ sensor 6 to the target value VO2/TARGET.

Then, the sliding mode controller 27 accumulatively adds values $\sigma$((k+d) bar·ΔT, produced by multiplying the value $\sigma$((k+d) bar of the switching function $\sigma$ bar by the period ΔT (constant period) of the control cycles of the exhaust-side control unit 7a. That is, the sliding mode controller 27 adds the product $\sigma$((k+d) bar·ΔT of the value $\sigma$((k+d) bar and the period ΔT calculated in the present control cycle to the sum determined in the preceding control cycle, thus calculating an integrated value $\sigma$ bar (hereinafter represented by "$\Sigma \sigma$ bar") which is the calculated result of the term $\Sigma(\sigma$ bar·T) of the equation (27).

In the present embodiment, the sliding mode controller 27 keeps the integrated value $\Sigma \sigma$ bar in a predetermined allowable range. If the integrated value $\Sigma \sigma$ bar exceeds the upper or lower limit of the allowable range, then the sliding mode controller 27 forcibly limits the integrated value $\Sigma \sigma$ bar to the upper or lower limit of the allowable range. This is because if the integrated value $\Sigma \sigma$ bar were excessive, the adaptive control law Uadp determined according to the equation (27) would be excessive, tending to impair the stability of the process of converging the output VO2/OUT of the $O_2$ sensor 6 to the target value VO2/TARGET.

Then, the sliding mode controller 27 calculates the equivalent control input Ueq, the reaching control law input Urch, and the adaptive control law Uadp according to the respective equations (24), (26), (27), using the time-series data VO2(k+d)bar, VO2(k+d−1) bar of the present and past values of the estimated differential output VO2 bar determined by the estimator 26 in STEP8, the value $\sigma$(k+d) bar of the switching function $\sigma$ and its integrated value $\Sigma \sigma$ bar which are determined as described above, and the gain coefficients a1, a1, b1 determined in STEP 6 (which are basically the gain coefficients a1(k) hat, a2(k) hat, b1(k) hat).

The sliding mode controller 27 then adds the equivalent control input Ueq, the reaching control law input Urch, and the adaptive control law Uadp to calculate the SLD manipulating input Usl, i.e., the input (=the target differential air-fuel ratio kcmd) to be applied to the object exhaust system E for converging the output signal VO2/OUT of the $O_2$ sensor 6 toward the target value VO2/TARGET.

After the SLD manipulating input Usl has been calculated, the exhaust-side control unit 7a determines the stability of the adaptive sliding mode control process carried out by the sliding mode controller 27, or more specifically, the ability of the controlled state of the output VO2/OUT of the $O_2$ sensor 6 based on the adaptive sliding mode control process (hereinafter referred to as "SLD controlled state"), and sets a value of a flag f/sld/stb indicative of whether the SLD controlled state is stable or not in STEP10.

Figure 16:
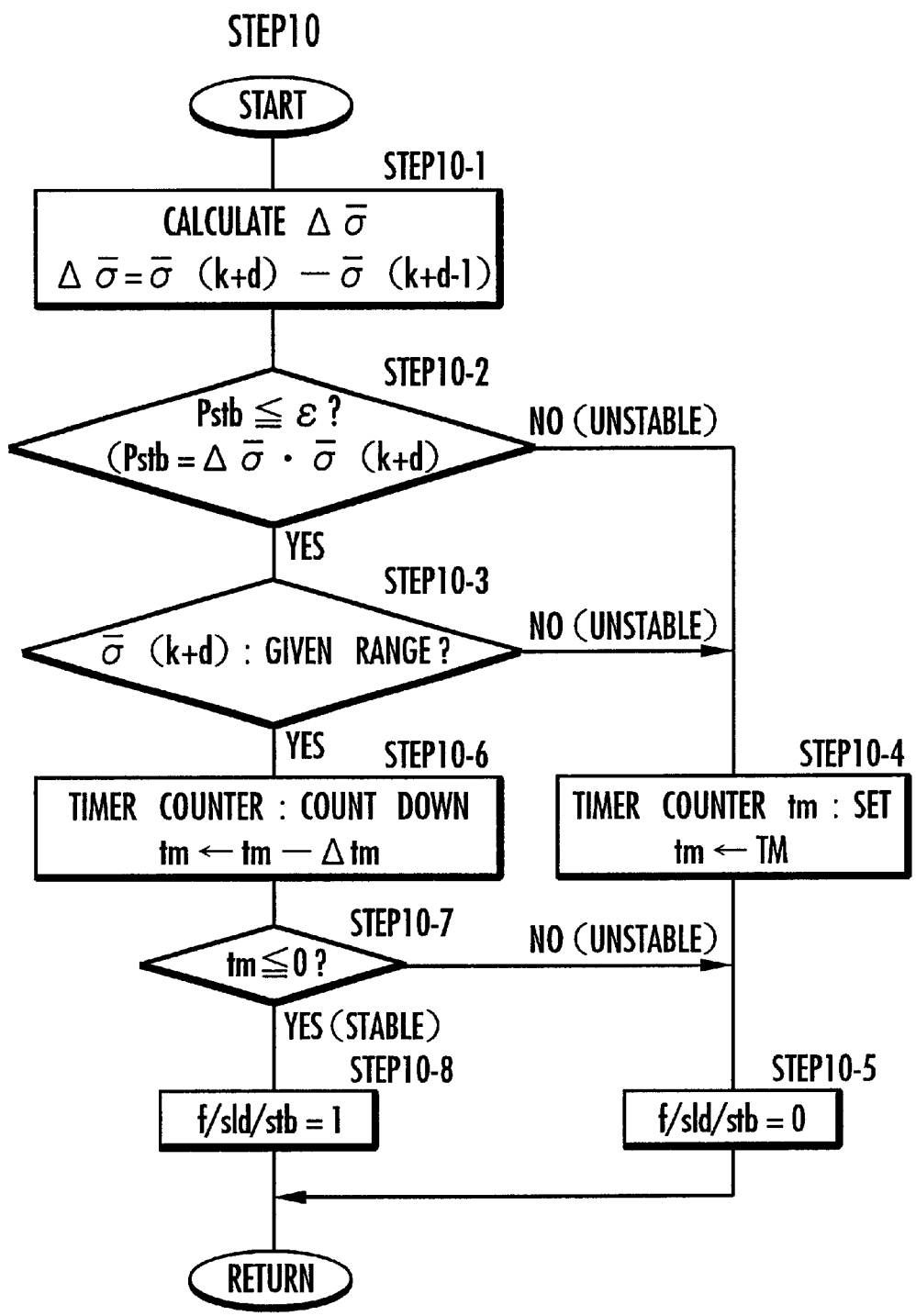
FIG. 16 is a flowchart of a subroutine of the main routine shown in FIG. 13.

The determining subroutine of STEP10 is shown in detail in FIG. 16.

As shown in FIG. 16, the exhaust-side control unit 7a calculates a difference $\Delta \sigma$ bar (corresponding to a rate of change of the switching function $\sigma$ bar) between the present value $\sigma$(k+d) bar of the switching function $\sigma$ bar calculated in STEP8 and a preceding value $\sigma$(k+d−1) bar thereof in STEP10-1.

Then, the exhaust-side control unit 7a decides whether or not a product $\Delta \sigma \cdot \sigma$(k+d) bar (corresponding to the time-differentiated function of a Lyapunov function $\sigma$ bar$^2$/2 relative to the $\sigma$ bar) of the difference $\Delta \sigma$ bar and the present value $\sigma$(k+d) bar is equal to or smaller than a predetermined value $\epsilon$ ($\leq 0$) in STEP10-2.

The difference $\Delta \sigma \cdot \sigma$(k+d) bar (hereinafter referred to as "stability determining parameter Pstb") will be described below. If the stability determining parameter Pstb is greater than 0 (Pstb>0), then the value of the switching function $\sigma$ bar is basically changing away from "0". If the stability determining parameter Pstb is equal to or smaller than 0

(Pstb≦0), then the value of the switching function σ bar is basically converged or converging to "0". Generally, in order to converge a controlled variable to its target value according to the sliding mode control process, it is necessary that the value of the switching function be stably converged to "0". Basically, therefore, it is possible to determine whether the SLD controlled state is stable or unstable depending on whether or not the value of the stability determining parameter Pstb is equal to or smaller than 0.

If, however, the stability of the SLD controlled state is determined by comparing the value of the stability determining parameter Pstb with "0", then the determined result of the stability is affected even by slight noise contained in the value of the switching function σ bar. According to the present embodiment, therefore, the predetermined value ε with which the stability determining parameter Pstb is to be compared in STEP10-2 is of a positive value slightly greater than "0".

If Pstb>ε in STEP10-2, then the SLD controlled state is judged as being unstable, and the value of a timer counter tm (count-down timer) is set to a predetermined initial value $T_M$ (the timer counter tm is started) in order to inhibit the determination of the target air-fuel ratio KCMD using the SLD manipulating input Usl calculated in STEP8 for a predetermined time in STEP10-4. Thereafter, the value of the flag f/sld/stb is set to "0" in STEP10-5, after which control returns to the main routine shown in FIG. 13.

If Pstb≦ε in STEP10-2, then the exhaust-side control unit 7a decides whether the present value σ((k+d) bar of the switching function σ bar falls within a predetermined range or not in STEP10-3.

If the present value σ(k+d) bar of the switching function σ bar does not fall within the predetermined range, then since the present value σ((k+d) bar i spaced widely apart from "0", the SLD controlled state is considered to be unstable. Therefore, if the present value σ((k+d) bar of the switching function σ bar does not fall within the predetermined range in STEP10-3, then the SLD controlled state is judged as being unstable, and the processing of STEP10-4 through STEP10-5 is executed to start the timer counter tm and set the value of the flag f/sld/stb to "0".

In the present embodiment, since the value of the switching function σ bar is limited within the allowable range in STEP9, the decision processing in STEP10-3 may be dispensed with.

If the present value σ(k+d) bar of the switching function σ bar falls within the predetermined range in STEP10-3, then the exhaust-side control unit 7a counts down the timer counter tm for a predetermined time Δtm in STEP10-6. The exhaust-side control unit 7a then decides whether or not the value of the timer counter tm is equal to or smaller than "0", i.e., whether a time corresponding to the initial value $T_M$ has elapsed from the start of the timer counter tm or not, in STEP10-7.

If tm>0, i.e., if the timer counter tm is still measuring time and its set time has not yet elapsed, then since no substantial time has elapsed after the SLD controlled state is judged as unstable in STEP10-2 or STEP10-3, the SLD controlled state tends to become unstable. Therefore, if tm>0 in STEP10-7, then the value of the flag f/sld/stb is set to "0" in STEP10-5.

If tm≦0 in STEP10-7, i.e., if the set time of the timer counter tm has elapsed, then the SLD controlled stage is judged as being stable, and the value of the flag f/sld/stb is set to "1" in STEP10-8.

According to the above processing, if the SLD controlled state is judged as being unstable, then the value of the flag f/sld/stb is set to "0", and if the SLD controlled state is judged as being stable, then the value of the flag f/sld/stb is set to "1".

The above process of determining the stability of the SLD controlled state is by way of illustrative example only. The stability of the SLD controlled state may be determined by any of various other processes. For example, in each given period longer than the control cycle, the frequency with which the value of the stability determining parameter Pstb in the period is greater than the predetermined value ε is counted. If the frequency is in excess of a predetermined value, then the SLD controlled state is judged as unstable. Otherwise, the SLD controlled state is judged as stable.

Referring back to FIG. 13, after a value of the flag f/sld/stb indicative of the stability of the SLD controlled state has been set, the exhaust-side control unit 7a determines the value of the flag f/sld/stb in STEP11. If the value of the flag f/sld/stb is "1", i.e., if the SLD controlled state is judged as being stable, then the sliding mode controller 27 limits the SLD manipulating input Usl calculated in STEP 9 in STEP12. Specifically, the sliding mode controller 27 determines whether the present value of the SLD manipulating input Usl calculated in STEP8 falls in a predetermined allowable range or not. If the present value of the SLD manipulating input Usl exceeds the upper or lower limit of the allowable range, then the sliding mode controller 27 forcibly limits the present value Usl(k) of the SLD manipulating input Usl to the upper or lower limit of the allowable range.

The SLD manipulating input Usl (=the target differential air-fuel ratio kcmd) limited in STEP12 is stored in a memory (not shown) in a time-series fashion, and will be used in the processing operation of the estimator 26.

Then, the deteriorated state evaluating means 13b of the exhaust-side main processor 13 performs the process of evaluating the deteriorated state of the catalytic converter 3 (described later on) in STEP13. The sliding mode controller 27 adds the reference value FLAF/BASE to the SLD manipulating input Usl limited in STEP12, thus calculating the target air-fuel ratio KCMD in STEP15. The processing in the present control cycle is now put to an end.

If f/sld/stb=0 in STEP11, i.e., if the SLD controlled state is judged as unstable, then the exhaust-side control unit 7a forcibly sets the SLD manipulating input Usl in the present control cycle to a predetermined value (the fixed value or the preceding value of the SLD manipulating input Usl) in STEP14. The exhaust-side control unit 7a calculates the target air-fuel ratio KCMD according to the equation (28) in STEP 15. Then, the processing in the present control cycle is finished.

The target air-fuel ratio KCMD finally determined in STEP15 is stored in a memory (not shown) in a time-series fashion in each control cycle. When the general feedback controller 15 is to use the target air-fuel ratio KCMD determined by the exhaust-side control unit 7a (see STEPf in FIG. 11), the latest one of the time-series data of the target air-fuel ratio KCMD thus stored is selected.

The process of evaluating the deteriorated state of the catalytic converter 3 in STEP13 will be described below with reference to FIG. 17.

The deteriorated state evaluating means 13b calculates the value of the deterioration evaluating linear function σ determined according to the equation (15), from the time-series data VO2(k), VO2(k−1) of the differential output VO2 of the $O_2$ sensor 6 which is calculated in STEP4 shown in FIG. 13, i.e., the present value of the differential output VO2 and the past value thereof in the preceding control cycle, in STEP13-1.

The values of the coefficients s1, s2 used to calculate the value of the deterioration evaluating linear function σ are identical to the values of the coefficients s1, s2 used by the sliding mode controller 27 to determine the value of the switching function σ bar.

Then, the deteriorated state evaluating means 13b determines the value of a flag F/DONE in STEP13-2. When the value of the flag F/DONE is "1", then it indicates that the evaluation of the deteriorated state of the catalytic converter 3 is completed during the present operation of the internal combustion engine 1, and when the value of the flag F/DONE is "0", then it indicates that the evaluation of the deteriorated state of the catalytic converter 3 is not completed during the present operation of the internal combustion engine 1. The value of the flag F/DONE is set to "1" in STEP13-5 to be described later on. When the internal combustion engine 1 starts to operate, the value of the flag F/DONE is initialized to "0".

If F/DONE=0, i.e., if the evaluation of the deteriorated state of the catalytic converter 3 is not completed, then the deteriorated state evaluating means 13b performs a process of determining a varying state of the exhaust gas volume (the rate of flow of the exhaust gas through the exhaust pipe 2) in STEP13-3. More specifically, the deteriorated state evaluating means 13b determines whether the exhaust gas volume is kept at a substantially constant level, i.e., in a cruise state, or not, and sets the value of a flag F/CRS. When the value of the flag F/CRS is "1", then it indicates that the exhaust gas volume is in the cruise state, and when the value of the flag F/CRS is "0", then it indicates that the exhaust gas volume is not in the cruise state. The process of determining a varying state of the exhaust gas volume is carried out in a period of 1 second, for example (hereinafter referred to as "exhaust gas volume variation determining period") longer than the period (30–100 ms) of the control cycles of the exhaust-side control unit 7a, and is shown in detail in FIG. 18.

Figure 18:
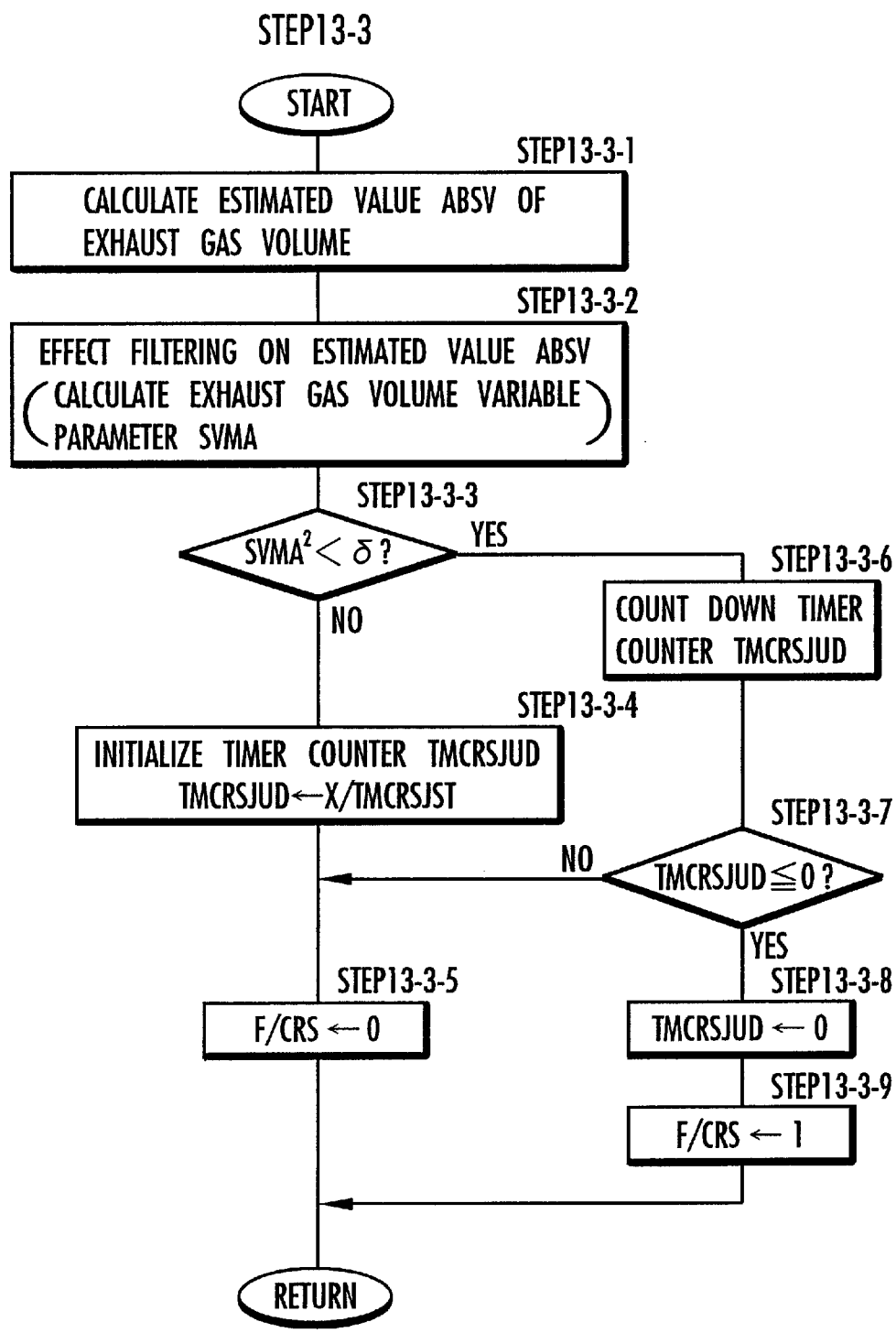
FIG. 18 is a flowchart of a subroutine of the subroutine shown in FIG. 17
Figure 19:
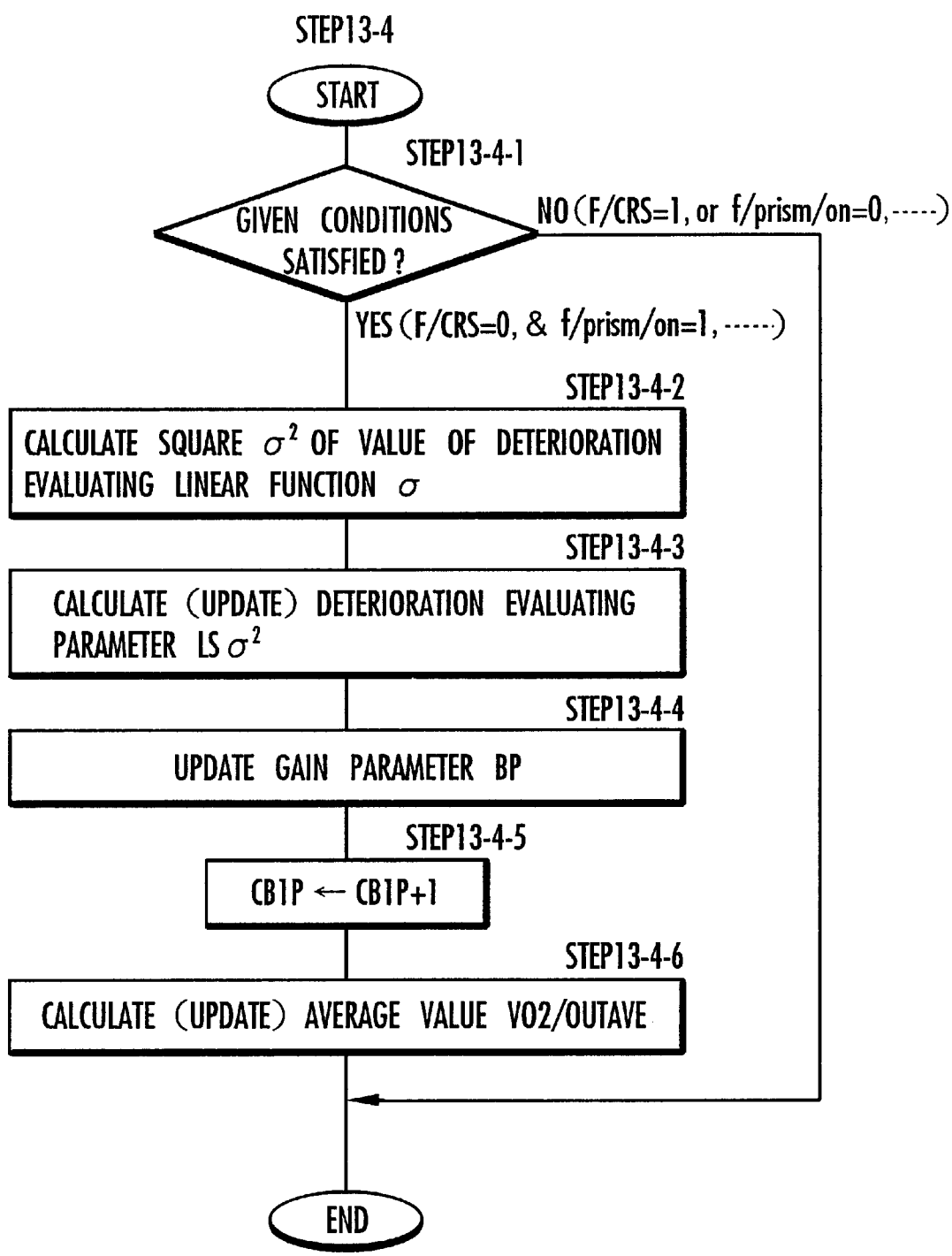
FIG. 19 is a flowchart of a subroutine of the subroutine shown in FIG. 17
Figure 20:
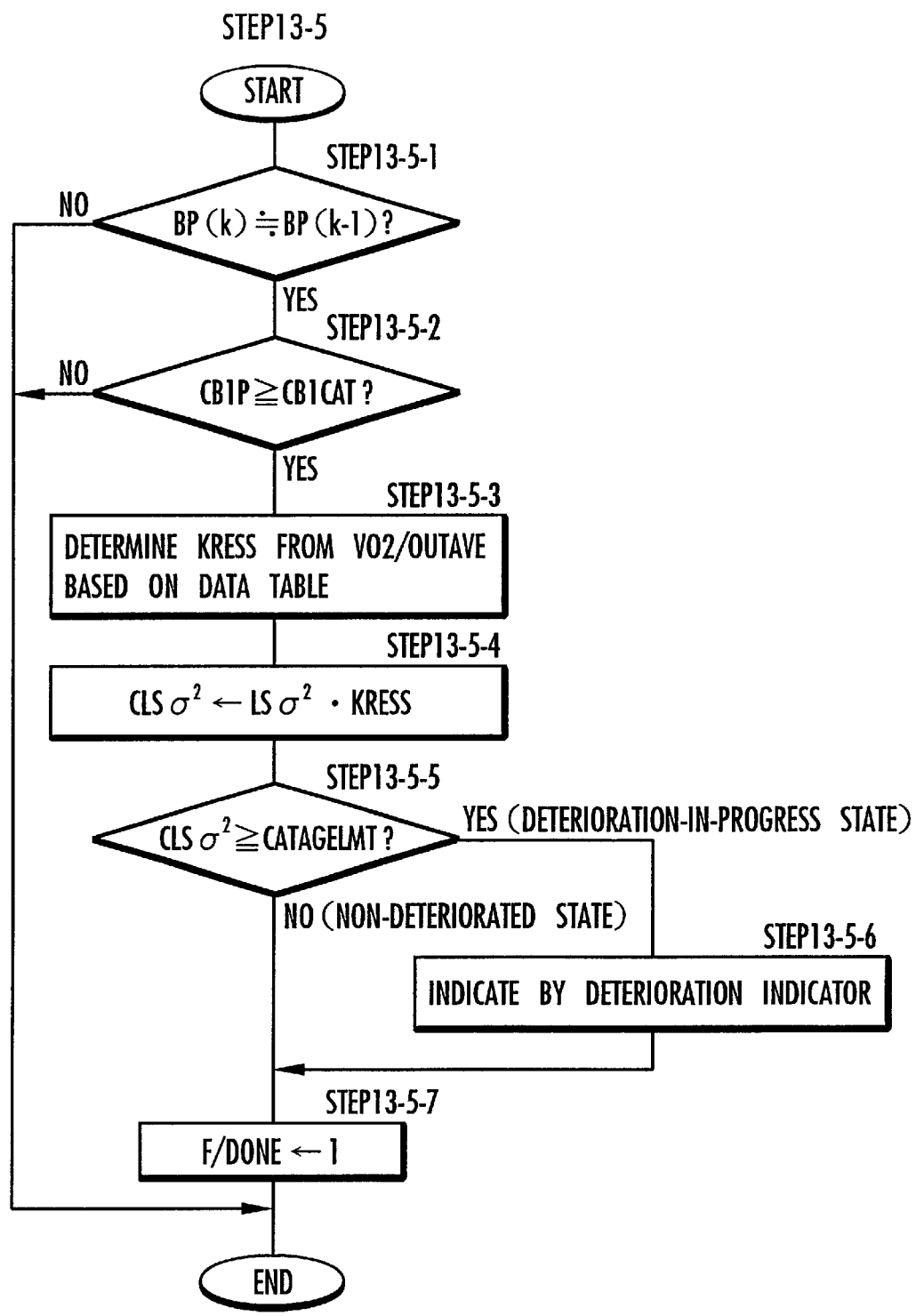
FIG. 20 is a flowchart of a subroutine of the subroutine shown in FIG. 17

As shown in FIG. 18, the deteriorated state evaluating means 13b calculates an estimated value ABSV of the present exhaust gas volume (hereinafter referred to as "estimated exhaust gas volume") from the detected data of the present rotational speed NE and intake pressure PB of the internal combustion engine 1 according to the following equation (42) in STEP13-3-1:

$$ABSV = \frac{NE}{1500} \cdot PB \cdot SVPRA \tag{42}$$

In the present embodiment, the exhaust gas volume when the rotational speed of the internal combustion engine 1 is 1500 rpm is used as a reference. Therefore, the detected value of the rotational speed NE is divided by "1500" in the above equation (42). In the equation (42), SVPRA represents a predetermined constant depending on the displacement of the internal combustion engine 1.

Instead of estimating the exhaust gas volume as described above, the exhaust gas volume may be estimated from the fuel supply quantity and intake air quantity of the internal combustion engine 1 or may be directly detected using flow sensor.

Then, the deteriorated state evaluating means 13b effects a predetermined filtering process on the estimated exhaust gas volume calculated in STEP13-3-1 in each exhaust gas volume variation determining period for thereby determining an exhaust gas volume variation parameter SVMA that represents the varying state of the exhaust gas volume in STEP13-3-2.

The above filtering process is expressed by the following equation (43):

$$SVMA=(ABSV(n)-ABSV(n-1))+(ABSV(n-2)-ABSV(n-3))+ \\ (ABSV(n-4)-ABSV(n-5)) \tag{43}$$

Specifically, the exhaust gas volume variation parameter SVMA is calculated by determining a moving average of changes of the estimated exhaust gas volume ABSV over a plurality of exhaust gas volume variation determining periods (three exhaust gas volume variation determining periods in the present embodiment). In the equation (43), "n" represents the ordinal number of the cycle of the exhaust gas volume variation determining period.

The exhaust gas volume variation parameter SVMA thus calculated represents a rate of change in the estimated exhaust gas volume ABSV. Consequently, as the value of the exhaust gas volume variation parameter SVMA is closer to "0", the time-dependent change of the estimated exhaust gas volume ABSV is smaller, i.e., the estimated exhaust gas volume ABSV is substantially constant.

Then, the deteriorated state evaluating means 13b compares the square of the exhaust gas volume variation parameter SVMA, i.e., the square $SVMA^2$, with a predetermined value δ in STEP13-3-3. The predetermined value δ is a positive value near "0".

If $SVMA^2 \geq \delta$, i.e., if the present exhaust gas volume suffers a relatively large variation, then the deteriorated state evaluating means 13b sets the value of a timer counter (count-down timer) TMCRSJUD to a predetermined initial value X/TMCRSJST in STEP13-3-4. As the exhaust gas volume is not in the cruise state, i.e., the exhaust gas volume is not kept at a substantially constant level, the deteriorated state evaluating means 13b sets the flag F/CRS to "0" in STEP13-3-5, after which control returns to the main routine shown in FIG. 17.

If $SVMA^2 < \delta$ in STEP13-3-3, i.e., if the present exhaust gas volume suffers a relatively small variation, then the deteriorated state evaluating means 13b counts down the value of the timer counter TMCRSJUD by a predetermined value in each exhaust gas volume variation determining period as long as the present exhaust gas volume suffers a relatively small variation, in STEP13-3-6. Then, the deteriorated state evaluating means 13b determines whether or not the value of the timer counter TMCRSJUD becomes "0" or smaller, i.e., whether the set time of timer counter TMCRSJUD has elapsed or not, in STEP13-3-7.

If TMCRSJUD≦0, i.e., if the set time of the timer counter TMCRSJUD has elapsed, then the deteriorated state evaluating means 13b decides that the exhaust gas volume is in the cruise state, and holds the value of the timer counter TMCRSJUD to "0" in STEP13-3-8. Then, the deteriorated state evaluating means 13b sets the value of the flag F/CRS to "1" in STEP13-3-9, after which control returns to the main routine shown in FIG. 17.

Figure 17:
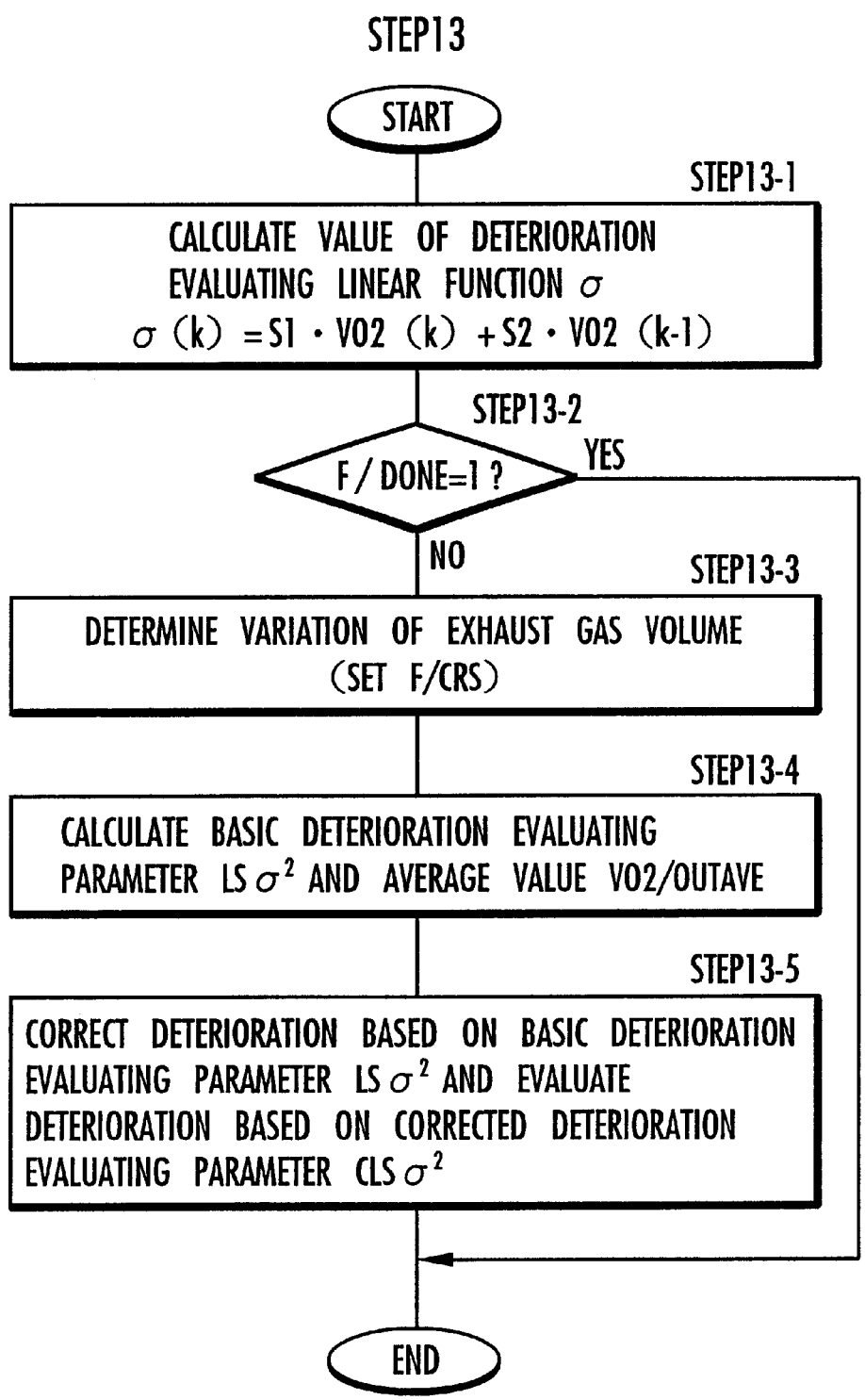
FIG. 17 is a flowchart of a subroutine of the main routine shown in FIG. 13.

If TMCRSJUD>0 in STEP13-3-7, i.e., if the set time of the timer counter TMCRSJUD has not elapsed, then the deteriorated state evaluating means 13b sets the value of the flag F/CRS to "0" in STEP13-3-5, after which control returns to the main routine shown in FIG. 17.

The processing sequence described above with reference to FIG. 17 represents the processing in STEP13-3 shown in FIG. 17. According to the processing in STEP13-3, if the square $SVMA^2$ of the exhaust gas volume variation parameter SVMA is $SVMA^2<\delta$, i.e., the variation of the exhaust gas volume is small, continuously for a time, e.g., 10 to 15 seconds, corresponding to the initial value X/TMCRSJST of the timer counter TMCRSJUD, the deteriorated state evaluating means 13b decides that the exhaust gas volume is in the cruise state, and sets the value of the flag F/CRS to "1". Otherwise, the deteriorated state evaluating means 13b decides that the exhaust gas volume is not in the cruise state, and sets the value of the flag F/CRS to "0".

The processing in STEP13-3 allows a proper recognition of the state in which the exhaust gas volume is maintained at a substantially constant level. In each control cycle of the exhaust-side control unit 7a in one exhaust gas volume variation determining period, the value of the flag F/CRS is kept constant.

Referring back to FIG. 17, the deteriorated state evaluating means 13b performs a process of calculating the deterioration evaluating parameter $LS\sigma^2$ and an average value VO2/OUTAVE of the output VO2/OUT of the $O_2$ sensor 6 in STEP13-4. The process of calculating the deterioration evaluating parameter $LS\sigma^2$ and an average value VO2/OUTAVE of the output VO2/OUT of the $O_2$ sensor 6 will be described below with reference to FIG. 19.

The deteriorated state evaluating means 13b determines whether certain conditions for calculating the deterioration evaluating parameter $LS\sigma^2$ are satisfied or not in STEP13-4-1. The conditions include the value of the flag F/CRS set in STEP13-3 and the value of the flag f/prism/on set by the engine-side control unit 7b in STEPd shown in FIG. 11.

If F/CRS=1, i.e., if the exhaust gas volume is in the cruise state, then the deteriorated state evaluating means 13b decides that the condition for calculating the basic deterioration evaluating parameter $LS\sigma^2$ (hereinafter referred to as "deterioration evaluating condition") is not satisfied. Therefore, without calculating the deterioration evaluating parameter $LS\sigma^2$ and an average value VO2/OUTAVE of the output VO2/OUT of the $O_2$ sensor 6, control goes back to the main routine shown in FIG. 17.

While the exhaust gas volume is in the cruise state, i.e., while exhaust gas volume is maintained at a substantially constant level, the basic deterioration evaluating parameter $LS\sigma^2$ is not calculated for the following reason: In the cruise state, the output VO2/OUT of the $O_2$ sensor 6 is likely to be held stably to the target value VO2/TARGET, and hence the value of the deterioration evaluating linear function σ is less apt to change even when the deterioration of the catalytic converter 3 has progressed. In the cruise state, therefore, the value of the deterioration evaluating linear function σ does not tend to have a tendency depending on the deteriorated state of the catalytic converter 3 described above with reference to FIGS. 5 through 7. In the present embodiment, therefore, the basic deterioration evaluating parameter $LS\sigma^2$ is not calculated in the cruise state, and hence an average value VO2/OUTAVE of the output VO2/OUT of the $O_2$ sensor 6 is not calculated either.

If f/prism/on=0 in STEP13-4-1, i.e., if the operation mode of the internal combustion engine 1 is other than the normal operation mode in which the fuel supply of the internal combustion engine 1 is controlled depending on the target air-fuel ratio KCMD that is determined by the sliding mode controller 27 of the exhaust-side control unit 7a, then the deteriorated state evaluating means 13b also decides that the deterioration evaluating condition is not satisfied, and does not calculate the basic deterioration evaluating parameter $LS\sigma^2$ and an average value VO2/OUTAVE of the output VO2/OUT of the $O_2$ sensor 6, and control returns to the main routine shown in FIG. 17. This is because for appropriately evaluating the deteriorated state of the catalytic converter 3 with the basic deterioration evaluating parameter $LS\sigma^2$, it is preferable to determine the basic deterioration evaluating parameter $LS\sigma^2$ using the data of the differential output VO2 of the $O_2$ sensor 6 that is obtained while the air-fuel ratio of the internal combustion engine 1 is being controlled depending on the target air-fuel ratio KCMD generated by the sliding mode controller 27 according to the adaptive sliding mode control process.

In STEP13-4-1, the deteriorated state evaluating means 13b also determines whether the speed of the vehicle with the internal combustion engine 1 mounted thereon is in a predetermined range or not, whether a certain time has elapsed after the startup of the internal combustion engine 1 or not, and whether the catalytic converter 3 has been activated or not. If these conditions are not satisfied, then the deteriorated state evaluating means 13b determines that the deterioration evaluating condition is not satisfied. Therefore, without calculating the basic deterioration evaluating parameter $LS\sigma^2$ and an average value VO2/OUTAVE of the output VO2/OUT of the $O_2$ sensor 6, control goes back to the main routine shown in FIG. 17.

If the deterioration evaluating condition is satisfied in STEP13-4-1 (at this time, F/CRS=0 and f/prism/on=1), then the deteriorated state evaluating means 13b calculates the square $\sigma^2$ of the deterioration evaluating linear function σ determined in each control cycle of the exhaust-side control unit 7a in STEP13-1 shown in FIG. 17 in STEP13-4-2.

The deteriorated state evaluating means 13b calculates a new basic deterioration evaluating parameter $LS\sigma^2(k)$ from the present value $\sigma^2(k)$ of the square $\sigma^2$, the present value $LS\sigma^2(k-1)$ of the basic deterioration evaluating parameter $LS\sigma^2$, and the present value BP(k-1) of the gain parameter BP determined by the recursive formula expressed by the equation (30), according to the equation (29) in STEP13-4-3.

After updating the value of the gain parameter BP according to the equation (30) in STEP13-4-4, the deteriorated state evaluating means 13b increments, by "1", the value of a counter CB1P which counts the number of times that the basic deterioration evaluating parameter $LS\sigma^2$ and the gain parameter BP are updated, which number corresponds to the number of values of the deterioration evaluating linear function σ used to determine the basic deterioration evaluating parameter $LS\sigma^2$, in STEP13-4-5. The value of the counter CB1P is initialized to "0" at the time of the startup of the internal combustion engine 1.

After the deteriorated state evaluating means 13b calculates (updates) an average value VO2/OUTAVE of the output VO2/OUT of the $O_2$ sensor 6 in STEP13-4-6, control returns to the main routine shown in FIG. 17. The deteriorated state evaluating means 13b calculates an average value VO2/OUTAVE by accumulatively adding the present value of the output VO2/OUT of the $O_2$ sensor 6 each time the processing in STEP13-4-6 is carried out and dividing the accumulated sum by the number of times that the present value of the output VO2/OUT of the $O_2$ sensor 6 is accumulatively added. Therefore, the average value VO2/OUTAVE represents an average value of the output VO2/OUT of the $O_2$ sensor 6 in relation to the calculation of the basic deterioration evaluating parameter $LS\sigma^2$.

The values of the basic deterioration evaluating parameter $LS\sigma^2$ and the gain parameter BP which are determined respectively in STEP13-4-3 and STEP13-4-4, and the accumulated sum of the output VO2/OUT of the $O_2$ sensor 6 and the number of times that the present value of the output VO2/OUT of the $O_2$ sensor 6 is accumulatively added, which are used to calculate the average value of the output VO2/OUT of the $O_2$ sensor 6 in STEP13-4-6, are stored in a nonvolatile memory such as an EEPROM or the like (not shown) when the internal combustion engine 1 is shut off, so that those values will not be lost when the internal combustion engine 1 is not operating. When the internal combustion engine 1 operates next time, the stored values of the deterioration evaluating parameter $LS\sigma^2$, the gain parameter BP, the accumulated sum, and the number of times that the accumulatively addition is made, are used as their initial values. The initial values of the deterioration evaluating parameter $LS\sigma^2$ and the gain parameter BP at the time the internal combustion engine 1 operates for the first time are "0" and "1", respectively. The initial values of the accumulated sum and the number of times that the accumulatively addition is made are "0". The value of the counter CB1P is initialized to "0" at the time of the startup of the internal combustion engine 1.

In FIG. 17, after calculating (updating) the values of the basic deterioration evaluating parameter $LS\sigma^2$ and the average value VO2/OUTAVE as described above, the deteriorated state evaluating means 13b corrects the basic deterioration evaluating parameter $LS\sigma^2$ and evaluates the deteriorated state of the catalytic converter 3 based on the corrected deterioration evaluating parameter $CLS\sigma^2$ in STEP13-5. The process of evaluating the deteriorated state of the catalytic converter 3 will be described below with reference to FIG. 20.

The deteriorated state evaluating means 13b determines whether the present value BP(k) of the gain parameter BP and the preceding value BP(k−1) thereof are substantially equal to each other or not, i.e., whether the gain parameter BP has substantially been converged or not, in STEP12-5-1, and then determines whether or not the value of the counter CB1P is equal to or greater than a predetermined value CB1CAT, i.e., whether the number of values of the deterioration evaluating linear function σ used to determine the deterioration evaluating parameter $LS\sigma^2$ has reached the predetermined value CB1CAT or not, in STEP13-5-2.

In the present embodiment, if the data of the deterioration evaluating parameter LSσ2 and the gain parameter BP from the preceding operation are not held, i.e., if the values thereof are initialized to "0", as when the battery of the vehicle (not shown) is temporarily removed before the internal combustion engine 1 is started or as when the internal combustion engine 1 operates for the first time, then the predetermined value to be compared with the value of the counter CB1P in STEP12-5-2 is set to a value greater than if the data of the deterioration evaluating parameter $LS\sigma^2$ and the gain parameter BP are held.

If either of the conditions in STEP13-5-1 and STEP13-5-2 is not satisfied, then the basic deterioration evaluating parameter $LS\sigma^2$ determined in STEP13-4 in the present control cycle is considered to be not sufficiently converged to the central value of the square $\sigma^2$ of the deterioration evaluating linear function σ. Therefore, the processing in STEP13-5 is finished without evaluating the deteriorated state of the catalytic converter 3.

If either of the conditions in STEP13-5-1 and STEP13-5-2 is satisfied, then the basic deterioration evaluating parameter $LS\sigma^2$ determined in STEP13-4 in the present control cycle is representative of the central value of the square $\sigma^2$ of the deterioration evaluating linear function σ. The deteriorated state evaluating means 13b determines a corrective coefficient KRESS from the present value (calculated in STEP13-4-6) of the average value of the output VO2/OUT of the $O_2$ sensor 6 based on the data table shown in FIG. 9 in STEP13-5-3. The deteriorated state evaluating means 13b multiplies the present value of the basic deterioration evaluating parameter $LS\sigma^2$ by the corrective coefficient KRESS, thus correcting the basic deterioration evaluating parameter $LS\sigma^2$ into the corrected deterioration evaluating parameter $CLS\sigma^2$ in STEP13-5-4.

The deteriorated state evaluating means 13b then compares the corrected deterioration evaluating parameter $CLS\sigma^2$ with the threshold CATAGELMT shown in FIG. 9 in STEP13-5-5.

If $CLS\sigma^2 \geq CATAGELMT$, then the deteriorated state evaluating means 13b decides that the deteriorated state of the catalytic converter 3 is in the deterioration-in-progress state in which it needs to be replaced immediately or soon. The deteriorated state evaluating means 13b controls the deterioration indicator 29 to indicate the deteriorated state of the catalytic converter 3 in STEP13-5-6. After setting the value of the flag F/DONE to "1", indicating that the evaluation of the deteriorated state of the catalytic converter 3 is completed in STEP13-5-7, the processing in STEP13-5 is finished.

If $CLS\sigma^2 < CATAGELMT$ in STEP13-5-5, since the catalytic converter 3 is in the non-deteriorated state, the deteriorated state evaluating means 13b does not control the deterioration indicator 29, but sets the value of the flag F/DONE to "1" in STEP13-5-7. The processing in STEP13-5 is now finished.

The above processing represents the process that is carried out by the deteriorated state evaluating means 13b in STEP13 shown in FIG. 13.

In the apparatus according to the above embodiment, the target air-fuel ratio calculating means 13a of the exhaust-side main processor 13 sequentially determines a target air-fuel ratio for the internal combustion engine 1, i.e., a target value for the air-fuel ratio of the exhaust gas entering the catalytic converter 3, according to the adaptive sliding mode control process in order to converge (settle) the output VO2/OUT from the $O_2$ sensor 6 downstream of the catalytic converter 3 to the target value VO2/TARGET which is established depending on the operating state (the rotational speed NE and the intake pressure PB) of the internal combustion engine 1. The target air-fuel ratio calculating means 13a adjusts the amount of fuel injected into the internal combustion engine 1 in order to converge the output KACT of the LAF sensor 5 to the target air-fuel ratio KCMD, for thereby feedback-controlling the air-fuel ratio of the internal combustion engine 1 at the target air-fuel ratio KCMD. In this manner, the output signal VO2/OUT of the $O_2$ sensor 6 is converged to the target value VO2/TARGET, and the catalytic converter 3 can maintain its optimum exhaust gas purifying performance.

Concurrent with the above control of the air-fuel ratio of the internal combustion engine 1, the deteriorated state evaluating means 13b of the exhaust-side main processor 13 sequentially determines a deterioration evaluating linear function σ from the time-series data of the differential output VO2 of the $O_2$ sensor 6. The deteriorated state evaluating means 13b determines a basic deterioration evaluating parameter $LS\sigma^2$ as the central value (the central value of the minimum square in the present embodiment) of the square $\sigma^2$ of the deterioration evaluating linear function σ, according to the sequential statistic processing algorithm (the algorithm of the method of weighted least squares in the present embodiment). The deteriorated state evaluating means 13b then corrects the basic deterioration evaluating parameter $LS\sigma^2$ depending on the average value VO2/OUTAVE of the output VO2/OUT of the $O_2$ sensor 6, thus determining a corrected deterioration evaluating parameter $CLS\sigma^2$. The deteriorated state evaluating means 13b compares the corrected deterioration evaluating parameter $CLS\sigma^2$ with the predetermined threshold CATAGELMT thereby to evaluate the deteriorated state of the catalytic converter 3.

In this fashion, it is possible to evaluate the deteriorated state of the catalytic converter 3 while maintaining the optimum purifying performance of the catalytic converter 3. Because the corrected deterioration evaluating parameter CLS$\sigma^2$ is produced by correcting the basic deterioration evaluating parameter LS$\sigma^2$ as the central value of the square $\sigma^2$ of the deterioration evaluating linear function $\sigma$, with the average value VO2/OUTAVE of the output VO2/OUT of the O$_2$ sensor 6, or stated otherwise, depending on what average level of the target value VO2/TARGET for the output VO2/OUT of the O$_2$ sensor 6 has been controlled about, its correlation to the deteriorated state of the catalytic converter 3 is high, independently of the target value VO2/TARGET for controlling the output VO2/OUT of the O$_2$ sensor 6. As a result, the deteriorated state of the catalytic converter 3 can appropriately be evaluated based on the corrected deterioration evaluating parameter CLS$\sigma^2$.

In the present embodiment, in situations where the exhaust gas volume is maintained at a substantially constant level, i.e., in the cruise state, i.e., variations of the exhaust gas volume are small and the value of the deterioration evaluating linear function $\sigma$ is unlikely to change, the deterioration evaluating parameter LS$\sigma^2$ and the average value VO2/OUTAVE of the output VO2/OUT of the O$_2$ sensor 6 are not calculated. In other situations, the deterioration evaluating parameter LS$\sigma^2$ and the average value VO2/OUTAVE are calculated, and the deteriorated state of the catalytic converter 3 is evaluated based on the corrected deterioration evaluating parameter CLS$\sigma^2$ which is determined from the deterioration evaluating parameter LS$\sigma^2$ and the average value VO2/OUTAVE. Therefore, the corrected deterioration evaluating parameter CLS$\sigma^2$ representing the deteriorated state of the catalytic converter 3 is highly reliable, allowing the deteriorated state of the catalytic converter 3 to be evaluated accurately.

In the apparatus according to the present embodiment, therefore, the deteriorated state of the catalytic converter 3 can be evaluated highly reliably while the desired purifying performance of the catalytic converter 3 is reliably maintained.

In the above embodiment, the basic deterioration evaluating parameter LS$\sigma^2$ is corrected depending on the average value VO2/OUTAVE of the output VO2/OUT of the O$^2$ sensor 6. Since the air-fuel ratio of the internal combustion engine 1 is controlled to converge the output VO2/OUT of the O$_2$ sensor 6 to the target value VO2/TARGET, the average value VO2/OUTAVE of the output VO2/OUT of the O$^2$ sensor 6 is substantially equivalent to the average value of the target value VO2/TARGET. Consequently, the basic deterioration evaluating parameter LS$\sigma^2$ may be corrected depending on the average value of the target value VO2/TARGET, rather than the average value VO2/OUTAVE of the output VO2/OUT of the O$_2$ sensor 6. According to such a modification, in STEP13-4-6 (see FIG. 19) in the first embodiment, the average value of the target value VO2/TARGET, rather than the average value VO2/OUTAVE of the output VO2/OUT of the O$_2$ sensor 6, is determined, and in STEP13-5-3, the corrective coefficient KRESS is determined from the average value of the target value VO2/TARGET based on a data table similar to the data table shown in FIG. 9. Other processing details are identical to those of the first embodiment.

An apparatus for controlling the air-fuel ratio of an internal combustion engine according to a second embodiment of the present invention will be described below with reference to FIGS. 21 through 23. The apparatus according to the second embodiment differs from the apparatus according to the first embodiment as to a portion of the process of evaluating the deteriorated state of the catalytic converter 3. Those parts of the apparatus and the processing sequence thereof according to the second embodiment which are identical to those of the apparatus and the processing sequence thereof according to the first embodiment are shown in identical figures and represented by identical reference characters, and will not be described in detail below.

Figure 21:
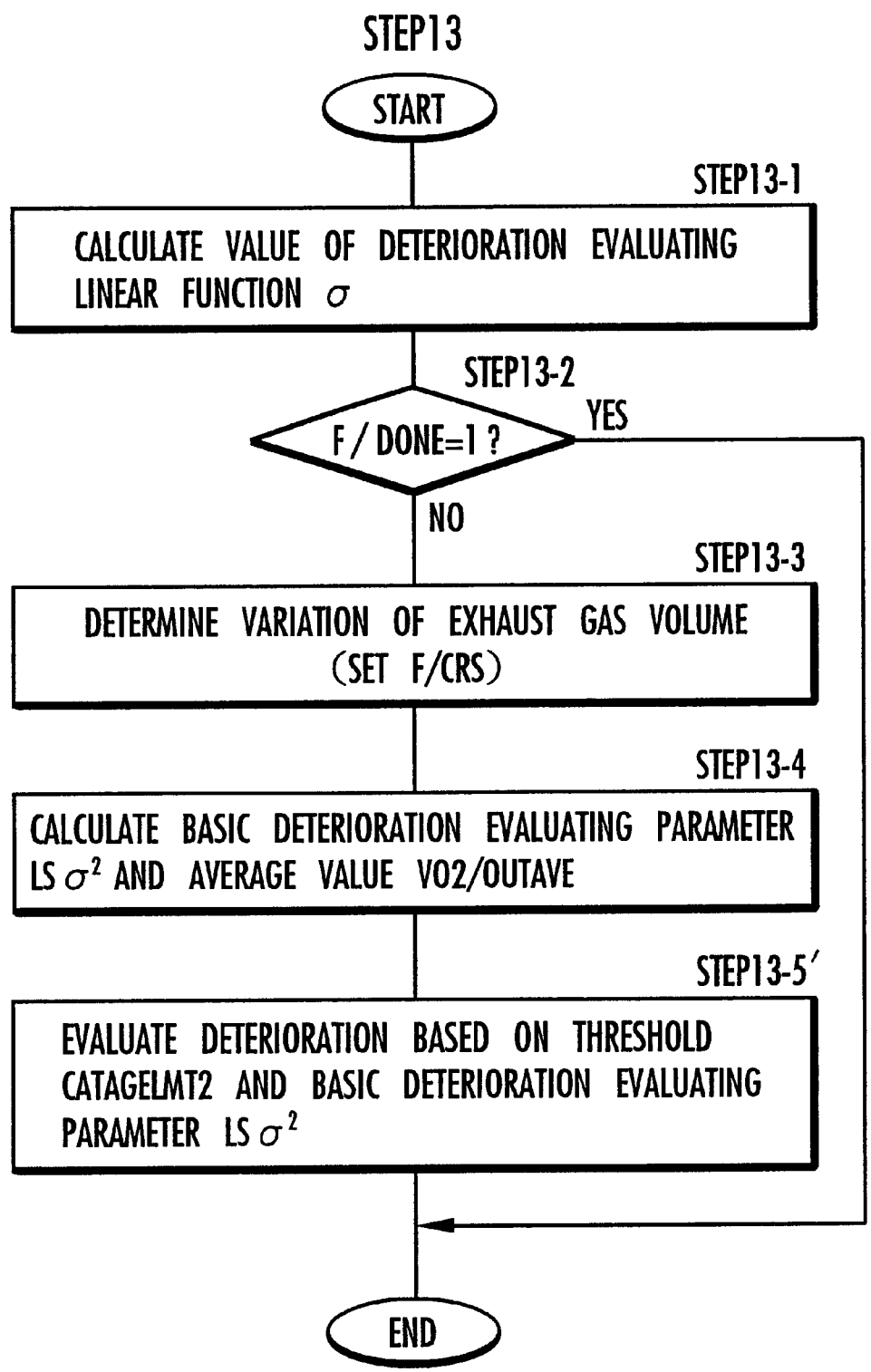
FIG. 21 is a flowchart of a processing sequence of an apparatus for controlling the air-fuel ratio of an internal combustion engine according to a second embodiment of the present invention.

In the second embodiment, the deteriorated state evaluating means 13*b* of the exhaust-side main processor 13 performs the process of evaluating the deteriorated state of the catalytic converter 3 in STEP13 as follows:

In FIG. 21, after having carried out STEP13-1 through STEP13-4 in the same manner as with the first embodiment, the deteriorated state evaluating means 13*b* establishes a threshold CATAGELMT2 for determining the deteriorated state of the catalytic converter 3 and evaluating the deteriorated state of the catalytic converter 3 based on the basic deterioration evaluating parameter LS$\sigma^2$ in STEP13-5'. The subroutine of STEP13-5' is shown in FIG. 22.

Figure 22:
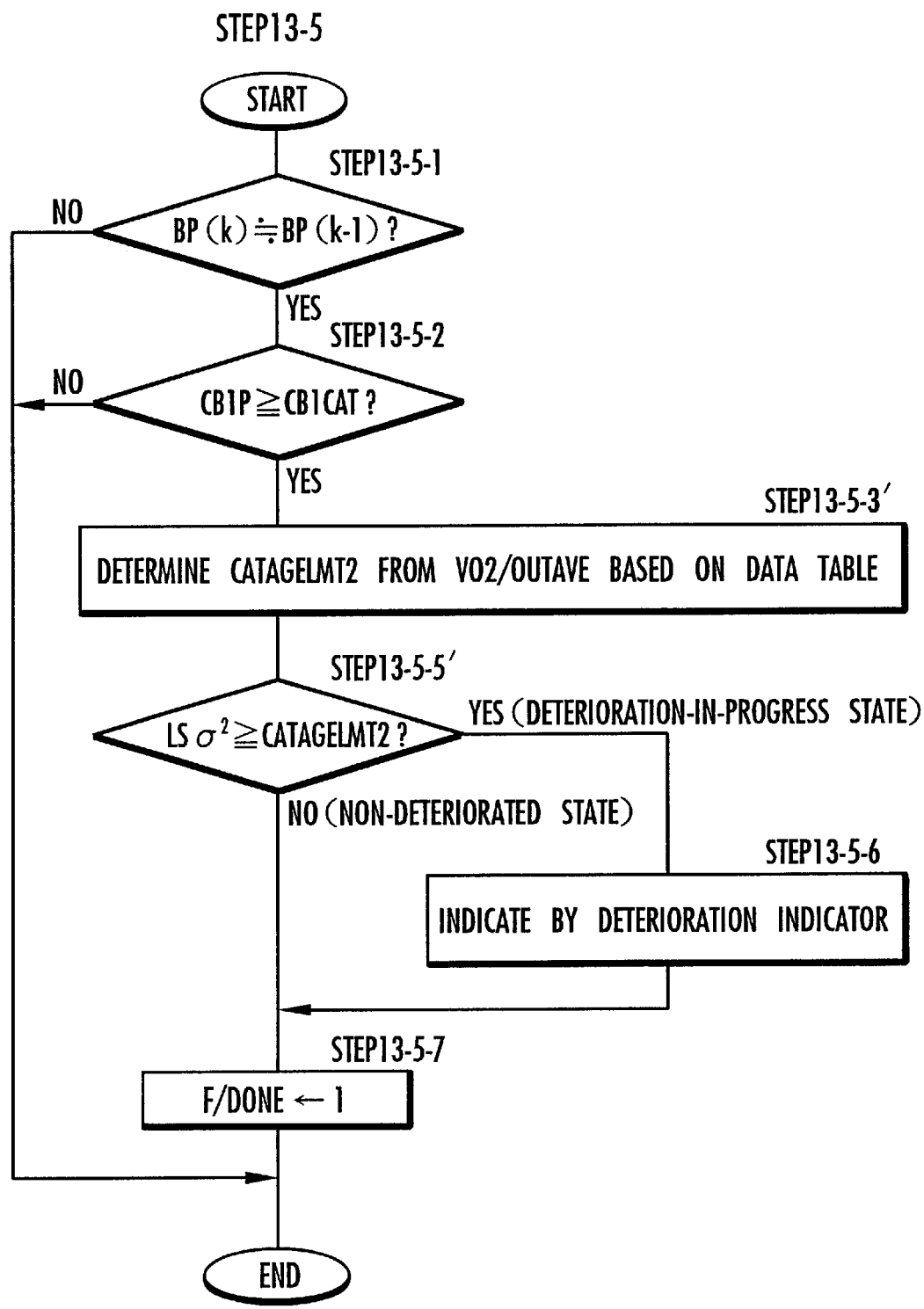
FIG. 22 is a flowchart of a subroutine of the processing sequence shown in FIG. 21.
Figure 23:
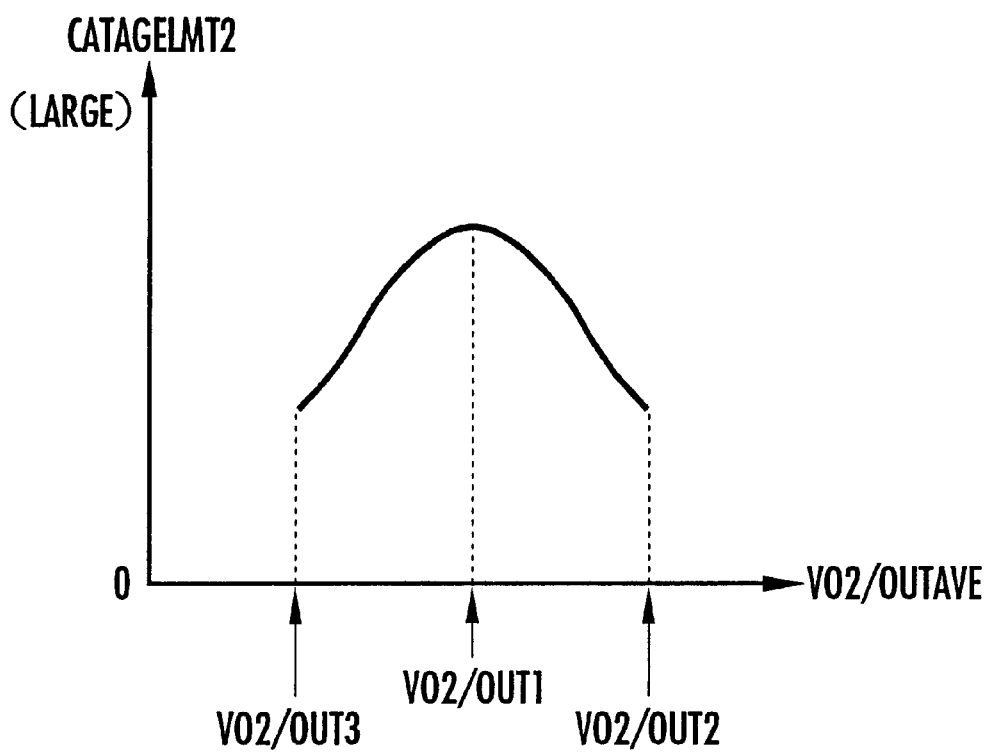
FIG. 23 is a diagram showing a data table used in the subroutine shown in FIG. 22.

According to the subroutine shown in FIG. 22, after having made the decisions in STEP13-5-1 and STEP13-5-2 in the same manner as with the first embodiment, the deteriorated state evaluating means 13*b* determines the threshold CATAGELMT2 from the present value (latest value) of the average value VO2/OUTAVE of the output VO2/OUT of the O$_2$ sensor 6 determined in STEP13-4 (see FIG. 1) based on a data table shown in FIG. 23 in STEP13-5-3'.

The threshold CATAGELMT2 is a threshold to be compared with the basic deterioration evaluating parameter LS$\sigma^2$ to determine whether the catalytic converter 3 is in the non-deteriorated state or the deterioration-in-progress state. In view of the fact that the basic deterioration evaluating parameter LS$\sigma^2$ is affected by a change in the target value VO2/TARGET for the output VO2/OUT of the O$_2$ sensor 6, the data table shown in FIG. 23 for setting the threshold CATAGELMT2 is established such that the threshold CATAGELMT2 is of a maximum value when the average value VO2/OUTAVE of the output VO2/OUT of the O$_2$ sensor 6 is a value substantially maximizing the sensitivity of the output VO2/OUT of the O$_2$ sensor 6, i.e., the level VO2/OUT1 shown in FIG. 2, and is progressively smaller as the difference |VO2/OUTAVE−VO2OUT1| between the average value VO2/OUTAVE and the level VO2/OUT1 is greater. Specifically, as the target value VO2/TARGET is closer to the level VO2/OUT1 shown in FIG. 2, the output VO2/OUT of the O$_2$ sensor 6 and hence value of the deterioration evaluating linear function $\sigma$ are more likely to vary. The threshold CATAGELMT2 is established so as to increase and decrease in accordance with such a tendency.

The deteriorated state evaluating means 13*b* then compares the basic deterioration evaluating parameter LS$\sigma^2$ with the threshold CATAGELMT2 in STEP13-5-5'. If LS$\sigma^2 \geq$ CATAGELMT, then the deteriorated state evaluating means 13*b* decides that the deteriorated state of the catalytic converter 3 is in the deterioration-in-progress state, and controls the deterioration indicator 29 to indicate the deteriorated state of the catalytic converter 3 in STEP13-5-6. After setting the value of the flag F/DONE to "1" in STEP13-5-7, control returns to the main routine shown in FIG. 13. If LS$\sigma^2$<CATAGELMT in STEP13-5-5', since the catalytic converter 3 is in the non-deteriorated state, the deteriorated state evaluating means 13*b* does not control the deterioration indicator 29, but sets the value of the flag F/DONE to "1" in STEP13-5-7, and control returns to the main routine shown in FIG. 13.

Other structural and processing details of the apparatus according to the second embodiment are identical to those of the apparatus according to the first embodiment.

In the second embodiment, the basic deterioration evaluating parameter $LS\sigma^2$ is affected by not only the deteriorated state of the catalytic converter 3, but also a change in the target value VO2/TARGET for the output VO2/OUT of the $O_2$ sensor 6. By establishing the threshold CATAGELMT2 in accordance with the effect of a change in the target value VO2/TARGET on the basic deterioration evaluating parameter $LS\sigma^2$, it is possible to evaluate the deteriorated state of the catalytic converter 3 appropriately irrespective of the effect of a change in the target value VO2/TARGET, as with the first embodiment. According to the second embodiment, therefore, the deteriorated state of the catalytic converter 3 can be evaluated highly reliably while the desired purifying performance of the catalytic converter 3 is reliably maintained.

In the second embodiment, the average value VO2/OUTAVE of the output VO2/OUT of the $O_2$ sensor 6 is used to establish the threshold CATAGELMT2. However, the average value of the target value VO2/TARGET for the output VO2/OUT of the $O_2$ sensor 6, rather than the average value VO2/OUTAVE, may be used to establish the threshold CATAGELMT2. According to such a modification, in STEP13-4 shown in FIG. 21, the average value of the target value VO2/TARGET is determined, and in STEP13-5-3' shown in FIG. 22, the threshold CATAGELMT2 is determined from the average value of the target value VO2/TARGET based on a data table similar to the data table shown in FIG. 23.

The present invention is not limited to the first and second embodiments described above, but may be modified as follows:

In the first and second embodiments, the central value of the minimum square $\sigma^2$ of the deterioration evaluating linear function $\sigma$ is used as the basic deterioration evaluating parameter $LS\sigma^2$. However, the central value of the minimum square of the absolute value of the deterioration evaluating linear function $\sigma$ may be determined as the basic deterioration evaluating parameter. According to such a modification, in STEP12-4 shown in FIG. 17 or FIG. 21, the absolute value of the deterioration evaluating linear function $\sigma$ is determined instead of the square $\sigma^2$ of the deterioration evaluating linear function $\sigma$, and $|\sigma^2|$ in the equation (29) is replaced with the determined absolute value to obtain a basic deterioration evaluating parameter that exhibits the same tendency as the basic deterioration evaluating parameter $LS\sigma^2$ with respect to the deteriorated state of the catalytic converter 3. By comparing the deterioration evaluating parameter which has been produced by correcting the basic deterioration evaluating parameter depending on the output VO2/OUT of the $O_2$ sensor 6 or the average value of the target value VO2/TARGET with a predetermined value, or comparing the basic deterioration evaluating parameter with a threshold established depending on the output VO2/OUT of the $O_2$ sensor 6 or the average value of the target value VO2/TARGET, the deteriorated state of the catalytic converter 3 can be evaluated in the same manner as with the first and embodiments.

Rather than the square $\sigma^2$ of the deterioration evaluating linear function $\sigma$ or the central value of the minimum square of the absolute value, the central value of an average value of the square $\sigma^2$ or the absolute value may be determined as the basic deterioration evaluating parameter. Alternatively, a variance of the value of the deterioration evaluating linear function $\sigma$, or more accurately a variation with respect to "0" and an average value of the square $\sigma^2$ of the value of the deterioration evaluating linear function $\sigma$, or a standard deviation (the square root of a variance) may be determined as the basic deterioration evaluating parameter. The basic deterioration evaluating parameter thus determined exhibits the same tendency as the basic deterioration evaluating parameter $LS\sigma^2$ with respect to the deteriorated state of the catalytic converter 3.

In the first and second embodiments, the deterioration evaluating linear function $\sigma$ is determined according to the equation (15) whose variable components are represented by two time-series data of the differential output VO2 of the $O_2$ sensor 6. However, the deterioration evaluating linear function may be defined by a linear function whose variable components are represented by more time-series data of the differential output VO2. According to such a modification, the switching function of the sliding mode control process is preferably defined by a linear function where the time-series data of the differential output VO2 included in the deterioration evaluating linear function is replaced with the time-series data of the estimated differential output VO2 bar.

The deterioration evaluating linear function may alternatively be determined by an equation similar to the equation (15) where the differential outputs VO2($k$), VO2($k-1$) of the equation (15) are replaced with the outputs VO2/OUT(k), VO2/OUT(k-1) of the $O_2$ sensor 6. According to this modification, the central value of the deterioration evaluating linear function is basically represented by "(s1+s2)·VO2/TARGET". If a parameter representing the degree to which the value of the deterioration evaluating linear function varies with respect to the central value (s1+s2)·VO2/TARGET, such as the square of the difference between the central value (s1+s2)·VO2/TARGET and the value of the deterioration evaluating linear function, or the central value of the minimum square of the absolute value, is determined as the basic deterioration evaluating parameter, then the deteriorated state of the catalytic converter 3 can be evaluated in the same manner as with the first and second embodiments.

Furthermore, a linear function whose variable components are represented by time-series data of the switching function $\sigma$ bar according to the equation (6), i.e., time-series data of the estimated differential output VO2 bar of the $O_2$ sensor 6, may be used as the deterioration evaluating linear function. It is preferable for the purpose of increasing the reliability of the evaluated result to use the deterioration evaluating linear function $\sigma$ according to the equation (15) which employs the actual differential output VO2 of the $O_2$ sensor 6 as a variable component, rather than the switching function $\sigma$ bar which employs the estimated differential output VO2 bar that is an estimated value after the total dead time d of the differential output VO2 of the $O_2$ sensor 6, because the deterioration evaluating linear function $\sigma$ better reflects the actual state of the catalytic converter 3.

In the first embodiment, the square $\sigma^2$ of the deterioration evaluating linear function $\sigma$ is used to evaluate the deteriorated state of the catalytic converter 3. However, it is possible to use the product of the value of the linear function $\sigma$ and its rate of change, which represents the stability determining parameter Pstb used in STEP10 to determine the stability of the SLD controlled state, for evaluating the deteriorated state of the catalytic converter 3. In such a modification, if a variance of the product, or more generally a value representing the degree to which the value of the product varies, is determined as the deterioration evaluating parameter, then it is possible to evaluate the deteriorated state of the catalytic converter 3 based on the deterioration evaluating parameter thus determined.

In the first embodiment, the deteriorated state of the catalytic converter 3 is evaluated as one of the two states, i.e., the deterioration-in-progress state and the non-deteriorated state. However, if an increased number of thresholds are used for comparison with the corrected deterioration evaluating parameter $CLS\sigma^2$ or the basic deterioration evaluating parameter $LS\sigma^2$, then the deteriorated state of the catalytic converter 3 may be evaluated as three or more deteriorated states. In this case, different evaluations may be indicated depending on those three or more deteriorated states.

In the first and second embodiments, the adaptive sliding mode control process is employed to calculate the target air-fuel ratio KCMD. However, the sliding mode control process which does not use the adaptive control law (adaptive algorithm) may be employed. In this modification, the target air-fuel ratio KCMD may be determined according to an equation that is similar to the equation (28) except that the term of the adaptive control law input Uadp is removed therefrom.

In the first and second embodiments, the effect of the total dead time d is compensated for by the estimator 26 in calculating the target air-fuel ratio KCMD. If the dead time of the air-fuel ratio manipulating system is negligibly small, then only the dead time d1 of the object exhaust system E may be compensated for. In this modification, the estimator 26 sequentially determines in each control cycle the estimated value VO2($k+d1$) after the dead time d1 of the differential output VO2 of the $O_2$ sensor 6, according to the following equation (44) which is similar to the equation (12) except that "kcmd" and "d" are replaced respectively with "kact" and "d1":

$$\overline{VO2}(k+d1) = \alpha 1 \cdot VO2(k) + \alpha 2 \cdot VO2(k-1) + \sum_{j=1}^{d} \beta j \cdot kact(k-j) \quad (44)$$

where $\alpha_1 =$ the first-row, first-column element of $A^{d1}$, $\alpha 2 =$ the first-row, second-column element of $A^{d1}$, $\beta_j =$ the first-row elements of $A^{j-1} \cdot B$ $A = \begin{bmatrix} a1 & a2 \\ 1 & 0 \end{bmatrix}$ $B = \begin{bmatrix} b1 \\ 0 \end{bmatrix}$ $B = \begin{bmatrix} b1 \\ 0 \end{bmatrix}$ In this modification, the sliding mode controller 27 determines in each control cycle the equivalent control input Ueq, the reaching control law input Urch, and the adaptive control law input Uadp according to equations which are similar to the equations (24)–(27) except that "d" is replaced with "d1", and adds the equivalent control input Ueq, the reaching control law input Urch, and the adaptive control law input Uadp to determine the target differential air-fuel ratio kcmd for thereby determining the target air-fuel ratio KCMD which has been compensated for the effect of the dead time d1 of the object exhaust system E.

According to the above modification, the processing of the identifier 25, the deteriorated state evaluating means 13b, and the engine-side control unit 7b may be the same as the processing thereof in the first and second embodiments.

If the dead time d1 of the object exhaust system E as well as the dead time d1 of the air-fuel ratio manipulating system is negligibly small, then the estimator 26 may be dispensed with. In this modification, the processing operation of the sliding mode controller 27 and the identifier 25 may be performed with d=d1.

In the first and second embodiments, the identifier 25 is employed. However, the gain coefficients a1, a2, b1 of the exhaust system model may be of predetermined fixed values, or may be set to suitable values from the rotational speed and intake pressure of the internal combustion engine 1 using a map.

In the first and second embodiments, the sliding mode control process is employed as the feedback control process for converging the output VO2/OUT of the $O_2$ sensor 6 to the target value VO2/TARGET. However, it is possible to employ another feedback control process to evaluate the deteriorated state of the catalytic converter 3 while converging the output VO2/OUT of the $O_2$ sensor 6 to the target value VO2/TARGET.

Although certain preferred embodiments of the present invention have been shown and described in detail, it should be understood that various changes and modifications may be made therein without departing from the scope of the appended claims.

What is claimed is:

1. An apparatus for controlling the air-fuel ratio of an internal combustion engine, comprising:

an oxygen concentration sensor disposed downstream of a catalytic converter which is disposed in an exhaust passage of an internal combustion engine;

air-fuel ratio manipulating means for manipulating the air-fuel ratio of an air-fuel mixture to be combusted in said internal combustion engine to converge an output of said oxygen concentration sensor to a target value established depending on an operating state of the internal combustion engine;

parameter generating means for generating a deterioration evaluating parameter for evaluating a deteriorated state of the catalytic converter according to an algorithm predetermined from data of the output of said oxygen concentration sensor while said air-fuel ratio manipulating means is manipulating the air-fuel ratio of the air-fuel mixture; and deteriorated state evaluating means for correcting said deterioration evaluating parameter depending on an average value of said target value or the output of said oxygen concentration sensor, and evaluating the deteriorated state of said catalytic converter based on the corrected deterioration evaluating parameter.

2. An apparatus according to claim 1, wherein said deterioration evaluating parameter comprises data representing a variation of a deterioration evaluating linear function whose variable components are represented by time-series data of the output of said oxygen concentration sensor.

3. An apparatus according to claim 2, wherein said parameter generating means comprises means for generating said deterioration evaluating parameter by effecting low-pass filtering on the square value or absolute value of the difference between values of the time-series data of the output of said oxygen concentration sensor and a predetermined value as a central value of said deterioration evaluating linear function.

4. An apparatus according to claim 2, wherein said air-fuel ratio manipulating means comprises means for sequentially generating a manipulated variable for manipulating said air-fuel ratio according to a sliding mode control process to converge the output of said oxygen concentration sensor to said target value, and manipulating said air-fuel ratio depending on said manipulated variable, said deterioration evaluating linear function comprising a linear function determined depending on a switching function used in said sliding mode control process.

5. An apparatus for controlling the air-fuel ratio of an internal combustion engine, comprising:
   an oxygen concentration sensor disposed downstream of a catalytic converter which is disposed in an exhaust passage of an internal combustion engine;
   air-fuel ratio manipulating means for manipulating the air-fuel ratio of an air-fuel mixture to be combusted in said internal combustion engine to converge an output of said oxygen concentration sensor to a target value established depending on an operating state of the internal combustion engine;
   parameter generating means for generating a deterioration evaluating parameter for evaluating a deteriorated state of the catalytic converter according to an algorithm predetermined from data of the output of said oxygen concentration sensor while said air-fuel ratio manipulating means is manipulating the air-fuel ratio of the air-fuel mixture; and
   deteriorated state evaluating means for evaluating the deteriorated state of said catalytic converter by comparing the deterioration evaluating parameter with a predetermined decision value;
   said deteriorated state evaluating means comprising:
      means for establishing said decision value depending on an average value of said target value or the output of said oxygen concentration sensor; and
      means for evaluating the deteriorated state of said catalytic converter by comparing the established decision value with said deterioration evaluating parameter.

6. An apparatus according to claim 5, wherein said deterioration evaluating parameter comprises data representing a variation of a deterioration evaluating linear function whose variable components are represented by time-series data of the output of said oxygen concentration sensor.

7. An apparatus according to claim 6, wherein said parameter generating means comprises means for generating said deterioration evaluating parameter by effecting low-pass filtering on the square value or absolute value of the difference between values of the time-series data of the output of said oxygen concentration sensor and a predetermined value as a central value of said deterioration evaluating linear function.

8. An apparatus according to claim 6, wherein said air-fuel ratio manipulating means comprises means for sequentially generating a manipulated variable for manipulating said air-fuel ratio according to a sliding mode control process to converge the output of said oxygen concentration sensor to said target value, and manipulating said air-fuel ratio depending on said manipulated variable, said deterioration evaluating linear function comprising a linear function determined depending on a switching function used in said sliding mode control process.

* * * * *